(12) United States Patent
Weber et al.

(10) Patent No.: US 8,740,442 B2
(45) Date of Patent: Jun. 3, 2014

(54) BACKLIGHT AND DISPLAY SYSTEM USING SAME

(71) Applicant: 3M Innovative Properties Company, St. Paul, MN (US)

(72) Inventors: Michael F. Weber, Shoreview, MN (US); Timothy J. Hebrink, Scandia, MN (US); Timothy J. Nevitt, Red Wing, MN (US); John A. Wheatley, Lake Elmo, MN (US); Craig R. Schardt, Woodbury, MN (US); Rolf W. Biernath, Wyoming, MN (US); William J. Bryan, Mahtomedi, MN (US); Andrew J. Ouderkirk, St. Paul, MN (US); David G. Freier, St. Paul, MN (US); Myron K. Jordan, Apple Valley, MN (US); Kristopher J. Derks, Woodbury, MN (US); Zhaohui Yang, North Oaks, MN (US); Edward J. Kivel, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/741,716

(22) Filed: Jan. 15, 2013

(65) Prior Publication Data

US 2013/0128549 A1    May 23, 2013

Related U.S. Application Data

(63) Continuation of application No. 12/600,914, filed as application No. PCT/US2008/064133 on May 19, 2008.

(60) Provisional application No. 60/939,079, filed on May 20, 2007.

(51) Int. Cl.
*F21V 7/04* (2006.01)

(52) U.S. Cl.
USPC ........... 362/623; 362/624; 362/625; 362/627; 362/609

(58) Field of Classification Search
USPC .................................................. 362/600–634
See application file for complete search history.

(56) References Cited

U.S. PATENT DOCUMENTS

| 3,610,729 A | 10/1971 | Rogers |
| 3,711,176 A | 1/1973 | Alfrey, Jr. |

(Continued)

FOREIGN PATENT DOCUMENTS

| DE | 199 61 491 | 12/2000 |
| EP | 0 426 397 | 5/1991 |

(Continued)

OTHER PUBLICATIONS

3M Diffusing Film Alternative (DFA), Maximum uniformity and efficiency in flat panel displays, Brochure, 2 pages, 1996.

(Continued)

*Primary Examiner* — William Carter
(74) *Attorney, Agent, or Firm* — Kristofor L. Storvick; Lisa P. Fulton

(57) ABSTRACT

A backlight that includes a front reflector and a back reflector that form a hollow light recycling cavity including an output surface is disclosed. The backlight further includes one or more light sources disposed to emit light into the light recycling cavity. The front reflector includes an on-axis average reflectivity of at least 90% for visible light polarized in a first plane, and an on-axis average reflectivity of at least 25% but less than 90% for visible light polarized in a second plane perpendicular to the first plane.

13 Claims, 22 Drawing Sheets

(56) References Cited

U.S. PATENT DOCUMENTS

| | | | |
|---|---|---|---|
| 3,773,882 A | 11/1973 | Schrenk |
| 3,884,606 A | 5/1975 | Schrenk |
| 4,040,727 A | 8/1977 | Ketchpel |
| 4,446,305 A | 5/1984 | Rogers |
| 4,456,336 A | 6/1984 | Chung |
| 4,540,623 A | 9/1985 | Im |
| 4,791,540 A | 12/1988 | Dreyer |
| 5,103,337 A | 4/1992 | Schrenk |
| 5,126,880 A | 6/1992 | Wheatley |
| 5,136,479 A | 8/1992 | Ruffner |
| 5,337,068 A | 8/1994 | Stewart |
| 5,360,659 A | 11/1994 | Arends |
| 5,381,309 A | 1/1995 | Borchardt |
| 5,440,197 A | 8/1995 | Gleckman |
| 5,448,404 A | 9/1995 | Schrenk |
| 5,453,855 A | 9/1995 | Nakamura |
| 5,568,316 A | 10/1996 | Schrenk |
| 5,594,830 A | 1/1997 | Winston |
| 5,751,388 A | 5/1998 | Larson |
| 5,771,328 A | 6/1998 | Wortman |
| 5,793,456 A | 8/1998 | Broer |
| 5,816,677 A | 10/1998 | Kurematsu |
| 5,825,543 A | 10/1998 | Ouderkirk |
| 5,828,488 A | 10/1998 | Ouderkirk |
| 5,845,038 A | 12/1998 | Lundin |
| 5,867,316 A | 2/1999 | Carlson |
| 5,882,774 A | 3/1999 | Jonza |
| 5,965,247 A | 10/1999 | Jonza |
| 5,971,551 A | 10/1999 | Winston |
| 5,976,686 A | 11/1999 | Kaytor |
| 6,019,485 A | 2/2000 | Winston |
| 6,036,328 A | 3/2000 | Ohtsuki |
| 6,080,467 A | 6/2000 | Weber |
| 6,122,103 A | 9/2000 | Perkins |
| 6,157,486 A | 12/2000 | Benson, Jr. |
| 6,157,490 A | 12/2000 | Wheatley |
| 6,210,785 B1 | 4/2001 | Weber |
| 6,262,842 B1 | 7/2001 | Ouderkirk |
| 6,267,492 B1 | 7/2001 | Reid |
| 6,276,803 B1 | 8/2001 | Aoyama |
| 6,280,063 B1 | 8/2001 | Fong |
| 6,282,821 B1 | 9/2001 | Freier |
| 6,354,709 B1 | 3/2002 | Campbell |
| 6,367,941 B2 | 4/2002 | Lea |
| 6,368,699 B1 | 4/2002 | Gilbert |
| 6,454,452 B1 | 9/2002 | Sasagawa |
| 6,531,230 B1 | 3/2003 | Weber |
| 6,566,689 B2 | 5/2003 | Hoelen |
| 6,600,175 B1 | 7/2003 | Baretz et al. |
| 6,636,283 B2 | 10/2003 | Sasagawa |
| 6,663,262 B2 | 12/2003 | Boyd et al. |
| 6,673,425 B1 | 1/2004 | Hebrink |
| 6,738,349 B1 | 5/2004 | Cen |
| 6,762,743 B2 | 7/2004 | Yoshihara |
| 6,783,349 B2 | 8/2004 | Neavin |
| 6,788,358 B1 | 9/2004 | Kim |
| 6,809,892 B2 | 10/2004 | Toyooka |
| 6,814,456 B1 | 11/2004 | Huang |
| 6,846,089 B2 | 1/2005 | Stevenson |
| 6,893,135 B2 | 5/2005 | Wright |
| 6,895,164 B2 | 5/2005 | Saccomanno |
| 6,905,212 B2 | 6/2005 | Pate |
| 6,905,220 B2 | 6/2005 | Wortman |
| 6,917,399 B2 | 7/2005 | Pokorny |
| 6,937,303 B2 | 8/2005 | Jang |
| 6,974,229 B2 | 12/2005 | West |
| 6,975,455 B1 | 12/2005 | Kotchick |
| 7,009,343 B2 | 3/2006 | Lim |
| 7,052,168 B2 | 5/2006 | Epstein |
| 7,072,096 B2 | 7/2006 | Holman |
| 7,164,836 B2 | 1/2007 | Wright |
| 7,178,965 B2 | 2/2007 | Parker |
| 7,220,026 B2 | 5/2007 | Ko |
| 7,220,036 B2 | 5/2007 | Yi |
| 7,223,005 B2 | 5/2007 | Lamb |
| 7,229,198 B2 | 6/2007 | Sakai |
| 7,277,609 B2 | 10/2007 | Cassarly |
| 7,285,802 B2 | 10/2007 | Ouderkirk |
| 7,296,916 B2 | 11/2007 | Ouderkirk |
| 7,317,182 B2 | 1/2008 | Schultz |
| 7,320,538 B2 | 1/2008 | Ko |
| 7,329,982 B2 | 2/2008 | Conner |
| 7,364,342 B2 | 4/2008 | Parker et al. |
| 7,416,309 B2 | 8/2008 | Ko |
| 7,436,469 B2 | 10/2008 | Gehlsen |
| 7,436,996 B2 | 10/2008 | Ben-Chorin |
| 7,446,827 B2 | 11/2008 | Ko |
| 7,481,563 B2 | 1/2009 | David |
| 7,513,634 B2 | 4/2009 | Chen |
| 7,525,126 B2 | 4/2009 | Leatherdale |
| 7,604,381 B2 | 10/2009 | Hebrink et al. |
| 7,607,814 B2 | 10/2009 | Destain |
| 7,660,509 B2 | 2/2010 | Bryan |
| 7,695,180 B2 | 4/2010 | Schardt |
| 7,740,387 B2 | 6/2010 | Schultz |
| 7,773,834 B2 | 8/2010 | Ouderkirk |
| 8,523,419 B2 | 9/2013 | Nevitt |
| 2001/0030857 A1 | 10/2001 | Futhey et al. |
| 2002/0060907 A1 | 5/2002 | Saccomanno |
| 2002/0070914 A1 | 6/2002 | Bruning et al. |
| 2002/0141194 A1 | 10/2002 | Wortman |
| 2002/0159019 A1 | 10/2002 | Pokorny |
| 2002/0175632 A1 | 11/2002 | Takeguchi |
| 2003/0043567 A1 | 3/2003 | Hoelen |
| 2003/0086680 A1 | 5/2003 | Saccomanno |
| 2003/0202363 A1 | 10/2003 | Adachi |
| 2004/0061814 A1 | 4/2004 | Kim |
| 2004/0066651 A1 | 4/2004 | Harumoto |
| 2004/0119908 A1 | 6/2004 | Sakai |
| 2004/0196667 A1 | 10/2004 | Lea |
| 2004/0219338 A1 | 11/2004 | Hebrink |
| 2005/0007756 A1 | 1/2005 | Yu |
| 2005/0007758 A1 | 1/2005 | Lee |
| 2005/0063195 A1 | 3/2005 | Kawakami |
| 2005/0073825 A1 | 4/2005 | Kuo |
| 2005/0078375 A1* | 4/2005 | Hall et al. ............... 359/581 |
| 2005/0135115 A1 | 6/2005 | Lamb |
| 2005/0135117 A1 | 6/2005 | Lamb |
| 2005/0200295 A1 | 9/2005 | Lim |
| 2005/0243576 A1 | 11/2005 | Park |
| 2005/0265029 A1 | 12/2005 | Epstein et al. |
| 2005/0265042 A1 | 12/2005 | Kim |
| 2005/0265046 A1 | 12/2005 | Liu |
| 2005/0280756 A1 | 12/2005 | Kim |
| 2005/0285133 A1 | 12/2005 | Hung |
| 2005/0286264 A1 | 12/2005 | Kim |
| 2006/0002141 A1 | 1/2006 | Ouderkirk |
| 2006/0005620 A1 | 1/2006 | Koike |
| 2006/0028817 A1 | 2/2006 | Parker |
| 2006/0082700 A1 | 4/2006 | Gehlsen |
| 2006/0083025 A1 | 4/2006 | Ono |
| 2006/0103777 A1 | 5/2006 | Ko |
| 2006/0124918 A1 | 6/2006 | Miller |
| 2006/0131601 A1 | 6/2006 | Ouderkirk |
| 2006/0146562 A1 | 7/2006 | Ko |
| 2006/0146566 A1 | 7/2006 | Ko |
| 2006/0152943 A1 | 7/2006 | Ko |
| 2006/0187650 A1 | 8/2006 | Epstein |
| 2006/0193577 A1 | 8/2006 | Ouderkirk |
| 2006/0210726 A1 | 9/2006 | Jones |
| 2006/0220040 A1 | 10/2006 | Suzuki |
| 2006/0221610 A1 | 10/2006 | Chew |
| 2006/0250707 A1 | 11/2006 | Whitney |
| 2006/0257678 A1 | 11/2006 | Benson |
| 2006/0262564 A1 | 11/2006 | Baba |
| 2006/0268554 A1 | 11/2006 | Whitehead |
| 2006/0284569 A1 | 12/2006 | Wey |
| 2006/0290842 A1 | 12/2006 | Epstein |
| 2006/0290844 A1 | 12/2006 | Epstein |
| 2007/0002452 A1* | 1/2007 | Munro ..................... 359/627 |
| 2007/0008722 A1 | 1/2007 | Fujino |
| 2007/0024994 A1 | 2/2007 | Whitney |
| 2007/0047228 A1 | 3/2007 | Thompson |
| 2007/0047254 A1* | 3/2007 | Schardt et al. ............ 362/607 |

(56) References Cited

U.S. PATENT DOCUMENTS

| | | |
|---|---|---|
| 2007/0047262 A1 | 3/2007 | Schardt |
| 2007/0081330 A1 | 4/2007 | Lee |
| 2007/0091641 A1 | 4/2007 | Lin |
| 2007/0092728 A1 | 4/2007 | Ouderkirk |
| 2007/0147037 A1 | 6/2007 | Wang |
| 2007/0153162 A1 | 7/2007 | Wright |
| 2007/0153384 A1 | 7/2007 | Ouderkirk |
| 2007/0153548 A1 | 7/2007 | Hamada |
| 2007/0171676 A1 | 7/2007 | Chang |
| 2007/0189032 A1 | 8/2007 | Chang |
| 2007/0223245 A1 | 9/2007 | Lee |
| 2007/0257266 A1 | 11/2007 | Leatherdale |
| 2007/0257270 A1 | 11/2007 | Lu |
| 2007/0258241 A1 | 11/2007 | Leatherdale |
| 2007/0258246 A1 | 11/2007 | Leatherdale |
| 2007/0285000 A1* | 12/2007 | Lim et al. ............... 313/501 |
| 2008/0002256 A1 | 1/2008 | Sasagawa |
| 2008/0025045 A1 | 1/2008 | Mii |
| 2008/0049419 A1 | 2/2008 | Ma |
| 2008/0057277 A1 | 3/2008 | Bluem |
| 2008/0306719 A1* | 12/2008 | Freier .................... 703/13 |
| 2010/0156953 A1 | 6/2010 | Nevitt |
| 2010/0165001 A1 | 7/2010 | Savvateev |
| 2010/0165621 A1 | 7/2010 | Hoffend |
| 2010/0238686 A1 | 9/2010 | Weber |
| 2010/0283074 A1 | 11/2010 | Kelley |
| 2010/0302479 A1 | 12/2010 | Aronson |
| 2010/0315832 A1 | 12/2010 | Pijlman |
| 2011/0051047 A1 | 3/2011 | O'Neill |
| 2011/0075398 A1 | 3/2011 | Wheatley |
| 2011/0096529 A1 | 4/2011 | Wheatley |
| 2011/0134659 A1 | 6/2011 | Aastuen |
| 2013/0009054 A1 | 1/2013 | Venditti |

FOREIGN PATENT DOCUMENTS

| | | |
|---|---|---|
| EP | 0 650 010 | 4/1995 |
| EP | 1 070 913 | 1/2001 |
| EP | 1 376 708 | 1/2004 |
| EP | 1 333 705 | 8/2004 |
| EP | 1 640 756 | 3/2006 |
| EP | 1 837 701 | 9/2007 |
| EP | 1 942 302 | 9/2008 |
| JP | 09-005737 | 1/1997 |
| JP | 11-72625 | 3/1999 |
| JP | 2004-031180 | 1/2004 |
| JP | 2004-055430 | 2/2004 |
| JP | 2004-071576 | 3/2004 |
| JP | 2004-087973 | 3/2004 |
| JP | 2004-158336 | 6/2004 |
| JP | 2004-171947 | 6/2004 |
| JP | 2004-342429 | 12/2004 |
| JP | 2005-093147 | 4/2005 |
| JP | 2005-173546 | 6/2005 |
| JP | 2005-292546 | 10/2005 |
| JP | 2005-327682 | 11/2005 |
| JP | 2006-221922 | 8/2006 |
| JP | 2006-269364 | 10/2006 |
| JP | 2006-269365 | 10/2006 |
| JP | 2008-060061 | 3/2008 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01726 | 1/1997 |
| WO | WO 99/36248 | 7/1999 |
| WO | WO 99/36262 | 7/1999 |
| WO | WO 99/39224 | 8/1999 |
| WO | WO 00/43815 | 7/2000 |
| WO | WO 02/097324 | 12/2002 |
| WO | WO 2004/031818 | 4/2004 |
| WO | WO 2006/010249 | 2/2006 |
| WO | WO 2006/043344 | 4/2006 |
| WO | WO 2006/125174 | 11/2006 |
| WO | WO 2008/144636 | 11/2008 |
| WO | WO 2008/144644 | 11/2008 |
| WO | WO 2008/144650 | 11/2008 |
| WO | WO 2008/146229 | 12/2008 |
| WO | WO 2008/147753 | 12/2008 |
| WO | WO 2009/100307 | 8/2009 |
| WO | WO 2009/105450 | 8/2009 |

OTHER PUBLICATIONS

Baker et al., *Daylighting in Architecture: A European Reference Book*, pp. 4.3-4.5 1993. Blanco et al., "Asymmetric CPC Solar Collectors with Tubular Receiver: Geometric Characteristics and Optimal Configurations", Solar Energy, vol. 37, No. 1, pp. 49-54, 1986.

Blanco et al., "Asymmetric CPC Solar Collectors with Tubular Receiver: Geometric Characteristics and Optimal Configurations", Solar Energy, vol. 37, No. 1, pp. 49-54, 1986.

Cai et al., "Reflectors for Efficient and Uniform Distribution of Radiation for Lighting and Infrared Based on Non-Imaging Optics", SPIE, vol. 1528, pp. 118-128, 1991.

Collares-Pereira et al., "High Concentration Two-Stage Optics for Parabolic Trough Solar Collectors with Tubular Absorber and Large Rim Angle", Solar Energy, vol. 47, No. 6, pp. 457-466, 1991.

Denker et al., 45.1: Invited Paper: Advanced Polarizer Film for Improved Performance of Liquid Crystal Displays, 3 pages, SID 2006.

Freyssinier et al., "Evaluation of light emitting diodes for signage applications", Third International Conference of Solid State Lighting, Proceedings of SPIE, 5187, 309-317, 2004.

Hung et al., Novel Design for LED Lens and Backlight System, pp. 476-479, IDMC 2007 Taipei, Taiwan.

Kalantar and Okada, "RGB-LED Backlighting Monitor/TV for Reproduction of Images in Standard and Extended Color Spaces", FMC10-3, pp. 683-686, International Display Workshop, 2004.

Macleod, H.A., Thin-film optical filters, Second Edition, Title Page and Table of Contents, MacMillan Publishing Co., New York, 1986.

Stover, Carl PhD, Advanced Polarizer Film for Improved Performance of Liquid Crystal Displays, 10 pages, Presented at the Society for Information Displays International Conference, San Francisco, CA, Jun. 4-9, 2006.

TCO 05 (The Swedish Confederation of Professional Employees, version 2.0, Sep. 21, 2005, p. 9.

Thelan, Design of Optical Interference Coatings, McGraw Hill, Inc., Title Page, Table of Contents, and Preface, 5 pages, 1989.

Tripanagnostopoulos, Y. and Souliotis, M., "Intergrated collector storage solar systems with asymmetric CPC reflectors", Renewable Energy, vol. 29, pp. 223-248, www.sciencedirect.com, 2004.

Video Electronics Standards Association (VESA), Flat Panel Display Measurements Standard, v. 2.0, Jun. 1, 2001.

Vikuiti™ Display Enhancement Brochure, Vikuiti™ Brightness Enhancement Film (BEF) II, 2 pages, Copyright© 3M IPC, 2002.

Vikuiti™ Display Enhancement Brochure, Vikuiti™ Brightness Enhancement Film-Diffuse 400 (DBEF-D400), 2 pages, Copyright©, 2004.

Vikuiti™ Display Enhancement Brochure, Vikuiti™ Dual Brightness Enhancement Film—Diffuse 550 (DBEF-D550), 2 pages, © 3M 2004.

Weber et al., "Giant Birefringent Optics in Multilayer Polymer Mirrors", Science, vol. 287, Mar. 2000.

Winston et al., *Nonimaging Optics*, Title Page & Table of Contents, Elsevier Academic Press, Amsterdam, 2005.

* cited by examiner

BACKLIGHT AND DISPLAY SYSTEM USING SAME

RELATED APPLICATIONS

The following co-owned and copending PCT Patent Applications are incorporated herein by reference: PCT Patent Publication No. WO2008/144636; PCT Publication WO2008/144644; PCT Publication No. WO2008/147753; and PCT Publication No. WO2008/144650.

FIELD

The present disclosure relates to extended area light sources suitable for illuminating a display or other graphic from behind, commonly referred to as backlights. The disclosure is particularly suited, but not necessarily limited, to backlights that emit visible light of substantially only one polarization state.

BACKGROUND

Historically, simple backlight devices included only three main components: light sources or lamps, a back reflector, and a front diffuser. Such systems are still in use for general purpose advertising signs and for indoor lighting applications.

Over recent years, refinements have been made to this basic backlight design by adding other components to increase brightness or reduce power consumption, increase uniformity, and/or reduce thickness. The refinements have been fueled by demands in the high-growth consumer electronics industry for products that incorporate liquid crystal displays (LCDs), such as computer monitors, television monitors, mobile phones, digital cameras, pocket-sized MP3 music players, personal digital assistants (PDAs), and other handheld devices. Some of these refinements, such as the use of solid light guides to allow the design of very thin backlights, and the use of light management films such as linear prismatic films and reflective polarizing films to increase on-axis brightness, are mentioned herein in connection with further background information on LCD devices.

Although some of the above-listed products can use ordinary ambient light to view the display, most include a backlight to make the display visible. In the case of LCD devices, this is because an LCD panel is not self-illuminating, and thus is usually viewed using an illumination assembly or backlight. The backlight is situated on the opposite side of the LCD panel from the viewer, such that light generated by the backlight passes through the LCD to reach the viewer. The backlight incorporates one or more light sources, such as cold cathode fluorescent lamps (CCFLs) or light emitting diodes (LEDs), and distributes light from the sources over an output area that matches the viewable area of the LCD panel. Light emitted by the backlight desirably has sufficient brightness and sufficient spatial uniformity over the output area of the backlight to provide the user with a satisfactory viewing experience of the image produced by the LCD panel.

LCD panels, because of their method of operation, utilize only one polarization state of light, and hence for LCD applications it is important to know the backlight's brightness and uniformity for light of the correct or useable polarization state, rather than simply the brightness and uniformity of light that may be unpolarized. In that regard, with all other factors being equal, a backlight that emits light predominantly or exclusively in the useable polarization state is more efficient in an LCD application than a backlight that emits unpolarized light. Nevertheless, backlights that emit light that is not exclusively in the useable polarization state, even to the extent of emitting randomly polarized light, are still fully useable in LCD applications, since the non-useable polarization state can be easily eliminated by an absorbing polarizer provided at the back of the LCD panel.

LCD devices generally fall within one of three categories, and backlights are used in two of these categories. In a first category, known as "transmission-type," the LCD panel can be viewed only with the aid of an illuminated backlight. That is, the LCD panel is configured to be viewed only "in transmission," with light from the backlight being transmitted through the LCD on its way to the viewer. In a second category, known as "reflective-type," the backlight is eliminated and replaced with a reflective material, and the LCD panel is configured to be viewed only with light sources situated on the viewer-side of the LCD. Light from an external source (e.g., ambient room light) passes from the front to the back of the LCD panel, reflects off of the reflective material, and passes again through the LCD on its way to the viewer. In a third category, known as "transflective-type," both a backlight and a partially reflective material are placed behind the LCD panel, which is configured to be viewed either in transmission if the backlight is turned on, or in reflection if the backlight is turned off and sufficient ambient light is present.

Backlights described in the detailed description below can generally be used both in transmission-type LCD displays and in transflective-type LCD displays.

Besides the three categories of LCD displays discussed above, backlights can also fall into one of two categories depending on where the internal light sources are positioned relative to the output area of the backlight, where the backlight "output area" corresponds to the viewable area or region of the display device. The "output area" of a backlight is sometimes referred to herein as an "output region" or "output surface" to distinguish between the region or surface itself and the area (the numerical quantity having units of square meters, square millimeters, square inches, or the like) of that region or surface.

In "edge-lit" backlights, one or more light sources are disposed—from a plan-view perspective—along an outer border or periphery of the backlight construction, generally outside the area or zone corresponding to the output area. Often, the light source(s) are shielded from view by a frame or bezel that borders the output area of the backlight. The light source(s) typically emit light into a component referred to as a "light guide," particularly in cases where a very thin profile backlight is desired, as in laptop computer displays. The light guide is a clear, solid, and relatively thin plate whose length and width dimensions are on the order of the backlight output area. The light guide uses total internal reflection (TIR) to transport or guide light from the edge-mounted lamps across the entire length or width of the light guide to the opposite edge of the backlight, and a non-uniform pattern of localized extraction structures is provided on a surface of the light guide to redirect some of this guided light out of the light guide toward the output area of the backlight. (Other methods of gradual extraction include using a tapered solid guide, where the sloping top surface causes a gradual extraction of light as the TIR angle is, on average, now reached by greater numbers of light rays as the light propagates away from the light source.) Such backlights typically also include light management films, such as a reflective material disposed behind or below the light guide, and a reflective polarizing film and prismatic Brightness Enhancement Films (BEF) film(s) disposed in front of or above the light guide, to increase on-axis brightness.

In the view of Applicants, drawbacks or limitations of existing edge-lit backlights include the following: the relatively large mass or weight associated with the light guide, particularly for larger backlight sizes; the need to use components that are non-interchangeable from one backlight to another, since light guides must be injection molded or otherwise fabricated for a specific backlight size and for a specific source configuration; the need to use components that require substantial spatial non-uniformities from one position in the backlight to another, as with existing extraction structure patterns; and, as backlight sizes increase, increased difficulty in providing adequate illumination due to limited space or "real estate" along the edge of the display, since the ratio of the circumference to the area of a rectangle decreases linearly (1/L) with the characteristic in-plane dimension L (e.g., length, or width, or diagonal measure of the output region of the backlight, for a given aspect ratio rectangle).

In "direct-lit" backlights, one or more light sources are disposed—from a plan-view perspective—substantially within the area or zone corresponding to the output area, normally in a regular array or pattern within the zone. Alternatively, one can say that the light source(s) in a direct-lit backlight are disposed directly behind the output area of the backlight. Because the light sources are potentially directly viewable through the output area, a strongly diffusing plate is typically mounted above the light sources to spread light over the output area to veil the light sources from direct view. Again, light management films, such as a reflective polarizer film, and prismatic BEF film(s), can also be placed atop the diffuser plate for improved on-axis brightness and efficiency. Large area LCD applications tend to use direct-lit backlights because they are not constrained by the 1/L limitation of edge-lit backlights and because of the weight associated with solid light guides.

In the view of Applicants, drawbacks or limitations of existing direct-lit backlights include the following: inefficiencies associated with the strongly diffusing plate; in the case of LED sources, the need for large numbers of such sources for adequate uniformity and brightness, with associated high component cost and heat generation; and limitations on achievable thinness of the backlight beyond which light sources produce non-uniform and undesirable "punch-through," where a bright spot appears in the output area above each source.

In some cases, a direct-lit backlight may also include one or some light sources at the periphery of the backlight, or an edge-lit backlight may include one or some light sources directly behind the output area. In such cases, the backlight is considered "direct-lit" if most of the light originates from directly behind the output area of the backlight, and "edge-lit" if most of the light originates from the periphery of the output area of the backlight.

SUMMARY

In one aspect, the present disclosure provides a backlight that includes a front reflector and a back reflector that form a hollow light recycling cavity including an output surface. The backlight also includes one or more light sources disposed to emit light into the light recycling cavity. The front reflector includes an on-axis average reflectivity of at least 90% for visible light polarized in a first plane, and an on-axis average reflectivity of at least 25% but less than 90% for visible light polarized in a second plane perpendicular to the first plane.

In another aspect, the present disclosure provides an asymmetric reflective film including alternating polymer layers whose arrangement and refractive indices are tailored to provide an average on-axis reflectivity of at least 90% for visible light polarized in a first plane, and an average on-axis reflectivity of at least 25% but less than 90% for visible light polarized in a second plane perpendicular to the first plane.

In another aspect, the present disclosure provides a display system that includes a display panel, and a backlight disposed to provide light to the display panel. The backlight includes a front reflector and a back reflector that form a hollow light recycling cavity including an output surface. The backlight further includes one or more light sources disposed to emit light into the light recycling cavity. The front reflector includes an on-axis average reflectivity of at least 90% for visible light polarized in a first plane, and an on-axis average reflectivity of at least 25% but less than 90% for visible light polarized in a second plane perpendicular to the first plane.

In another aspect, the present disclosure provides a backlight that includes a front reflector and a back reflector that form a hollow light recycling cavity including an output surface. The front reflector is configured to reflect substantially all light within the cavity that has a first angular distribution and to partially reflect and partially transmit light within the cavity having a second angular distribution that is different than the first angular distribution. The backlight further includes one or more light sources disposed to emit light into the cavity, and a conversion structure positioned within the cavity to convert at least a portion of light in the cavity having the first angular distribution into light having the second angular distribution and at least a portion of light in the cavity having the second angular distribution into light having the first angular distribution.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
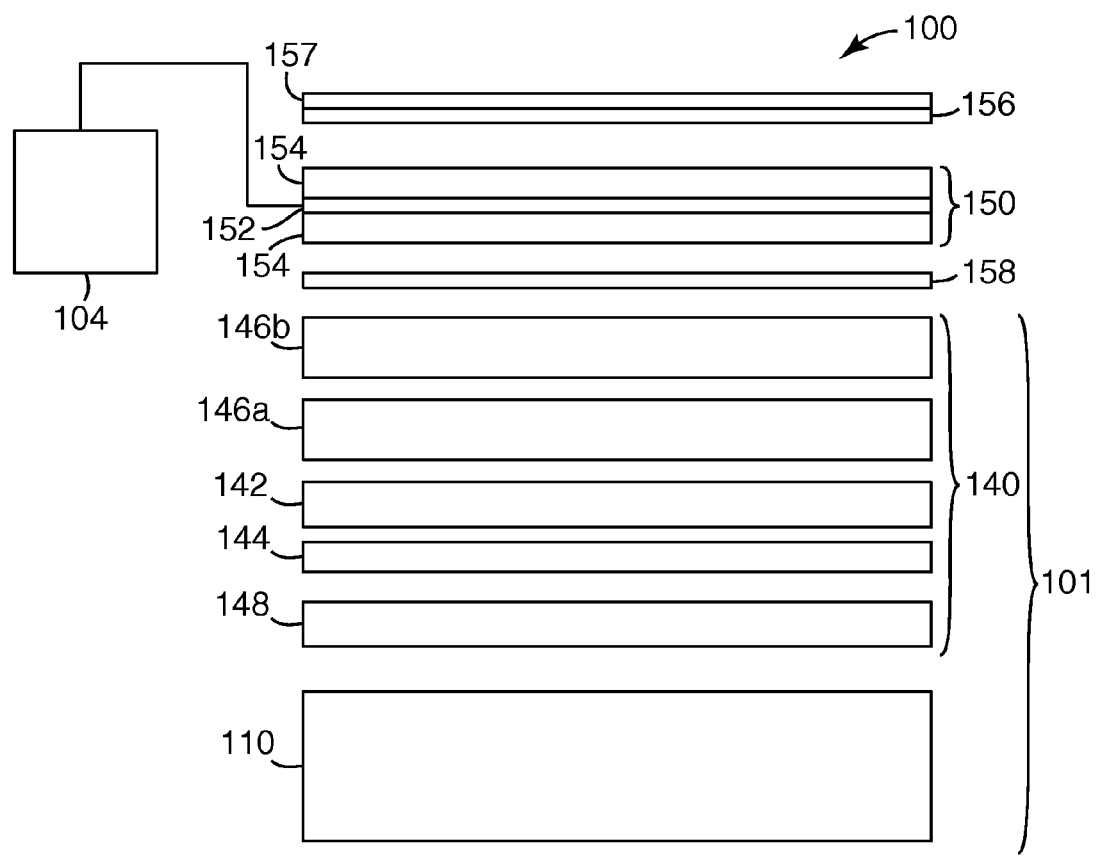
FIG. 1 is a schematic cross-section view of one embodiment of a direct-lit display system.

In general, the present disclosure describes backlights that provide brightness and spatial uniformity that are adequate for the intended application. Such backlights can be used for any suitable lighting application, e.g., displays, signs, general lighting, etc. In some embodiments, the described backlights include a hollow light guide formed by a front reflector and a back reflector. The front reflector can be partially transmissive, thereby allowing emission of light having a desired optical characteristic or combination of optical characteristics. In some embodiments, the desired optical characteristic can include a selected polarization state; in other embodiments, the desired optical characteristic can include emitted light having selected viewing angles.

In exemplary embodiments, the disclosed backlights balance the following characteristics: 1) the amount of recycling of a desired polarization state; 2) the degree of scattering of light within the cavity; and 3) the angular and spatial distribution of light directed into the cavity. This balancing/tailoring can provide substantial filling of the cavity with light (both spatially and angularly) using recycling and optionally a controlled amount of diffusion. The amount of recycling is sufficient to achieve the desired backlight uniformity with minimum degradation of backlight efficiency and brightness. This balancing can also provide backlights whose brightness and uniformity are compatible with high performance display applications, but where the backlights also have previously unachievable physical proportions (e.g., low profile design) or optical properties (e.g., large output area for given light source emission area).

In some embodiments, this balancing is attained by using front reflectors that have an intermediate on-axis average reflectivity in the pass state. In exemplary embodiments, the front reflector has an on-axis average reflectivity of at least 90% for visible light polarized in a first plane, and an on-axis average reflectivity of at least 25% but less than 90% for visible light polarized in a second plane perpendicular to the first plane.

In conventional backlights, the bulb-to-diffuser spacing, the bulb-to-bulb spacing, and the diffuser transmission are significant factors to be considered in designing the backlight for a given value of brightness and illumination uniformity. Generally, a strong diffuser, i.e., a diffuser that diffuses a greater fraction of the incident light, improves the uniformity but results in reduced brightness because the high diffusing level is accompanied by strong back diffusion, i.e., reflection. Such strong diffusers can also increase the overall thickness profile of the backlight.

According to some embodiments of the present disclosure, the partially transmissive front reflector may provide greater illuminance uniformity and/or color mixing without the need for a strong diffuser, thereby decreasing the thickness profile of the backlight.

In embodiments where the backlight includes light sources capable of producing light having different peak wavelengths or colors (e.g., an array of red, green, and blue LEDs), the high-recycling cavity is operable to distribute the light such that the light directed out of the device is more uniform in color and intensity. For example, when white illumination light is desired, the disclosed cavities can mix light from individually colored light sources such that the appearance at the LC panel is of a more uniform white light. Such recycling cavities can be significantly thinner than standard backlights used, e.g., in LC displays.

The backlights of the present disclosure can be utilized as backlights for display systems, e.g., LC displays; however, the backlights as described herein are not restricted to use for illuminating a liquid crystal display panel. The disclosed backlights may also be used wherever discrete light sources are utilized to generate light, and it is desirable to have uniform illumination out of a panel that includes one or more of the discrete light sources. Thus, the described backlights may be useful in solid state space lighting applications, signs, illuminated panels, and the like.

In general, it would be beneficial for next generation backlights to combine some or all of the following characteristics while providing a brightness and spatial uniformity that is acceptable for the intended application: thin profile; design simplicity, such as a minimal number of film components and a minimal number of sources, and convenient source layout; low weight; no use of or need for film components having substantial spatial non-uniformities from one position in the backlight to another; compatibility with LED sources; insensitivity to problems associated with color variability among LED sources that are all nominally the same color; to the extent possible, insensitivity to the burnout or other failure of a subset of LED sources; and the elimination or reduction of at least some of the limitations and drawbacks mentioned in the Background section above.

Whether these characteristics can be successfully incorporated into a backlight depends in part on the type of light source used for illuminating the backlight. CCFLs, for example, provide white light emission over their long narrow emissive areas, and those emissive areas can also operate to scatter some light impinging on the CCFL, such as would occur in a recycling cavity. The typical emission from a CCFL, however, has an angular distribution that is substantially Lambertian, which may be inefficient or otherwise undesirable in a given backlight design. Also, the emissive surface of a CCFL, although somewhat diffusely reflective, also typically has an absorptive loss that Applicants have found to be significant if a highly recycling cavity is desired.

An LED die emits light in a near-Lambertian manner, but because of its much smaller size relative to CCFLs, the LED light distribution can be readily modified, e.g., with an integral encapsulant lens, reflector, or extractor to make the resulting packaged LED a forward-emitter, a side-emitter, or other non-Lambertian profile. Such profiles can provide important advantages for the disclosed backlights. However, the smaller size and higher intensity of LED sources relative to CCFLs can also make it more difficult to produce a spatially uniform backlight output using LEDs. This is particularly true in cases where individually colored LEDs, such as arrangements of red/green/blue (RGB) LEDs, are used to produce white light, since failure to provide adequate lateral transport or mixing of such light can result in undesirable colored bands or areas. White light emitting LEDs, in which a phosphor is excited by a blue or UV-emitting LED die to produce intense white light from a small area or volume on the order of an LED die, can be used to reduce such color non-uniformity. But white LEDs currently are unable to provide LCD color gamuts as wide as those achievable with individual colored LED arrangements and thus may not be desirable for all end-use applications.

Applicants have discovered combinations of backlight design features that are compatible with LED source illumination, and that can produce backlight designs that outperform backlights found in state-of-the-art commercially available LCD devices in at least some respects. These backlight design features include some or all of the following:

A. a recycling optical cavity in which a large proportion of the light undergoes multiple reflections between substantially coextensive front and back reflectors before emerging from the front reflector, which is partially transmissive and partially reflective;

B. overall losses for light propagating in the recycling cavity are kept extraordinarily low, for example, both by providing a substantially enclosed cavity of low absorptive loss, including low loss front and back reflectors as well as side reflectors, and by keeping losses associated with the light sources very low, for example, by ensuring the cumulative emitting area of all the light sources is a small fraction of the backlight output area;

C. a recycling optical cavity that is hollow, i.e., the lateral transport of light within the cavity occurs predominantly in air, vacuum, or the like rather than in an optically dense medium such as acrylic or glass;

D. in the case of a backlight designed to emit only light in a particular (useable) polarization state, the front reflector has a high enough reflectivity for such useable light to support lateral transport or spreading, and for light ray angle randomization to achieve acceptable spatial uniformity of the backlight output, but a high enough transmission into the appropriate application-usable angles to ensure application brightness of the backlight is acceptably high;

E. the recycling optical cavity contains a component or components that provide the cavity with a balance of specular and diffuse characteristics, the component having sufficient specularity to support significant lateral light transport or mixing within the cavity, but also having sufficient diffusivity to substantially homogenize the angular distribution of steady state light within the cavity, even when injecting light into the cavity only over a narrow range of propagation angles. Additionally, recycling within the cavity can result in a degree of randomization of reflected light polarization relative to the incident light polarization state. This allows for a mechanism by which unusable polarization light can be converted by recycling into usable polarization light;

F. the front reflector of the recycling cavity has a reflectivity that generally increases with angle of incidence, and a transmission that generally decreases with angle of incidence, where the reflectivity and transmission are for unpolarized visible light and for any plane of incidence, and/or for light of a useable polarization state incident in a plane for which oblique light of the useable polarization state is p-polarized. Additionally, the front reflector has a high value of hemispheric reflectivity, and simultaneously, a sufficiently high value of transmission of application usable light;

G. light injection optics that partially collimates or confines light initially injected into the recycling cavity to propagation directions close to a transverse plane (the transverse plane being parallel to the output area of the backlight), e.g., an injection beam having a full angle-width (about the transverse plane) at half maximum power (FWHM) in a range from 0 to 90 degrees, or 0 to 60 degrees, or 0 to 30 degrees. In some instances it may be desirable for the maximum power of the injection light to have a downward projection, below the transverse plane, at an angle with the transverse plane of no greater than 40 degrees, and in other instances, to have the maximum power of the injected light to have an upwards projection, above the transverse plane towards the front reflector, at an angle with the transverse plane of no greater than 40 degrees.

Backlights for LCD panels, in their simplest form, consist of light generation surfaces such as the active emitting surfaces of LED dies or the outer layers of phosphor in a CCFL bulb, and a geometric and optical arrangement of distributing or spreading this light in such a way as to produce an extended- or large-area illumination surface or region, referred to as the backlight output area, which, at least in some embodiments, is spatially uniform in its emitted brightness. Generally, this process of transforming very high brightness local sources of light into a large-area uniform output surface results in a loss of light because of interactions with the backlight cavity surfaces and interaction with the light-generation surfaces. Other approaches such as using direct-lit source architectures with specified LED lenses to level the incident first bounce flux on the front reflector can result in efficient, uniform brightness through the backlight output surface, but these approaches are very sensitive to the exact geometrical configuration of all of the backlight components. To a first approximation, any light that is not delivered by this process through the output area or surface associated with a front reflector—optionally into a desired application viewer-cone (if any), and with a particular filtered state (e.g., LCD-useable polarization or color)—is "lost" light. A technique for characterizing any backlight containing a recycling cavity by two essential parameters is described in PCT Publication No. WO2008/144636.

This characterization is particularly straightforward for planar backlight cavities, in which the back reflector (sometimes referred to herein as a backplane) of the backlight and the output area of the backlight are both planar, parallel to each other, of approximately equal area, and approximately coextensive. Our two-parameter characterization, however, is by no means restricted to plane parallel backlight geometries and may be generalized for any backlight geometry having the basic elements of an output surface associated with a front reflector, a back reflector that forms a light recycling cavity with the front reflector, and a grouping of one or more light sources disposed within, or optically connected to the cavity.

As used herein, the term "acceptable spatial uniformity" refers to both acceptable uniformity of both overall intensity and color. What is considered acceptable brightness and spatial uniformity depends upon the particular application for which the backlight will be used. For example, a common reference standard for LCD uniformity is TCO 05 (The Swedish Confederation of Professional Employees, version 2.0, 2005-09-21, p. 9), which specifies an acceptance threshold luminance ratio of greater than 66%. In the early commercialization of a particular technology, uniformity standards may be lower; for example, when notebook computers were first introduced, acceptable uniformity was in the range of 50-60%. Further, for example, internally illuminated channel letters are another application where luminance uniformity is an important performance metric. Here, human factor studies have shown that most people judge channel letter uniformity as being acceptable if the luminance ratio is greater than 50%. See, e.g., Freyssinier et al., *Evaluation of light emitting diodes for signage applications*, Third International Conference of Solid State Lighting, Proceedings of SPIE 5187:309-317 (2004). Emergency signage is yet another ubiquitous application for light emitting panels. An example specification for uniformity is the Energy Star program for Exit Signs. See Energy Star Program Requirements for Exit Signs Draft 1, Eligibility Criteria Version 3.0. For an exit sign to qualify for Energy Star designation, the sign should have a luminance nonuniformity of less than 20:1 (i.e., greater than 5%).

One measurement for spatial uniformity that is referred to herein is the luminance and color uniformity as determined according to the Video Electronics Standards Association's *Flat Panel Display Measurements Standard*, v. 2.0 (published Jun. 1, 2001) standard 306-1 Sampled Uniformity and Color of White (herein referred to as the VESA 9pt Uniformity Standard). The VESA 9pt luminance uniformity reported herein is determined from 9 specified circular regions referred to as "sample points" with locations as defined by the Standard on the output surface of the backlight as $$VESA\ 9pt\ \text{Luminance Uniformity} = \frac{L_{min}}{L_{max}}$$

where $L_{min}$ is the minimum value of the luminance of the 9 points and $L_{max}$ is the maximum value of the luminance of the 9 points. Higher values of VESA 9pt luminance uniformity indicate systems that are more uniform.

The VESA 9pt color nonuniformity is determined as the largest value of the color difference between any two pairs of the 9 sampled points. The color difference $\Delta u'v'$ is $$\Delta u'v' = \sqrt{(u_1' - u_2')^2 + (v_1' - v_2')^2}$$

where the subscripts 1 and 2 denote the two regions being compared. Lower values of VESA 9pt color nonuniformity indicate systems that are more uniform.

As mentioned herein, the backlights of the present disclosure can be utilized as backlights for display systems. A schematic cross-sectional view of one embodiment of a direct-lit display system 100 is illustrated in FIG. 1. Such a display system 100 may be used, for example, in an LCD monitor or LCD-TV. The display system 100 includes a display panel 150 and an illumination assembly 101 positioned to provide light to the panel 150. The display panel 150 can include any suitable type of display. In the illustrated embodiment, the display panel 150 includes an LC panel (hereafter referred to as LC panel 150). The LC panel 150 typically includes a layer of LC 152 disposed between panel plates 154. The plates 154 are often formed of glass and can include electrode structures and alignment layers on their inner surfaces for controlling the orientation of the liquid crystals in the LC layer 152. These electrode structures are commonly arranged so as to define LC panel pixels, i.e., areas of the LC layer where the orientation of the liquid crystals can be controlled independently of adjacent areas. A color filter may also be included with one or more of the plates 152 for imposing color on the image displayed by the LC panel 150.

The LC panel 150 is positioned between an upper absorbing polarizer 156 and a lower absorbing polarizer 158. In the illustrated embodiment, the upper and lower absorbing polarizers 156, 158 are located outside the LC panel 150. The absorbing polarizers 156, 158 and the LC panel 150 in combination control the transmission of light from a backlight 110 through the display system 100 to the viewer. For example, the absorbing polarizers 156, 158 may be arranged with their transmission axes perpendicular to each other. In an unactivated state, a pixel of the LC layer 152 may not change the polarization of light passing therethrough. Accordingly, light that passes through the lower absorbing polarizer 158 is absorbed by the upper absorbing polarizer 156. When the pixel is activated, the polarization of the light passing therethrough is rotated so that at least some of the light that is transmitted through the lower absorbing polarizer 158 is also transmitted through the upper absorbing polarizer 156. Selective activation of the different pixels of the LC layer 152, for example, by a controller 104, results in the light passing out of the display system 100 at certain desired locations, thus forming an image seen by the viewer. The controller 104 may include, for example, a computer or a television controller that receives and displays television images.

One or more optional layers 157 may be provided proximate the upper absorbing polarizer 156, for example, to provide mechanical and/or environmental protection to the display surface. In one exemplary embodiment, the layer 157 may include a hardcoat over the upper absorbing polarizer 156.

It will be appreciated that some types of LC displays may operate in a manner different from that described above. For example, the absorbing polarizers 156, 158 may be aligned parallel and the LC panel may rotate the polarization of the light when in an unactivated state. Regardless, the basic structure of such displays remains similar to that described herein.

The illumination assembly 101 includes a backlight 110 and optionally one or more light management films 140 positioned between the backlight 110 and the LC panel 150. The backlight 110 can include any backlight described herein, e.g., backlight 200 of FIG. 2.

An arrangement 140 of light management films, which may also be referred to as a light management unit, is positioned between the backlight 110 and the LC panel 150. The light management films 140 affect the illumination light propagating from the backlight 110. For example, the arrangement 140 of light management films may include a diffuser 148. The diffuser 148 is used to diffuse the light received from the backlight 110.

The diffuser layer 148 may be any suitable diffuser film or plate. For example, the diffuser layer 148 can include any suitable diffusing material or materials. In some embodiments, the diffuser layer 148 may include a polymeric matrix of polymethyl methacrylate (PMMA) with a variety of dispersed phases that include glass, polystyrene beads, and $CaCO_3$ particles. Exemplary diffusers can include 3M™ Scotchcal™ Diffuser Film, types 3635-30, 3635-70, and 3635-100, available from 3M Company, St. Paul, Minn.

The optional light management unit 140 may also include a reflective polarizer 142. Any suitable type of reflective polarizer may be used for the reflective polarizer 142, e.g., multilayer optical film (MOF) reflective polarizers; diffusely reflective polarizing film (DRPF), such as continuous/disperse phase polarizers; wire grid reflective polarizers; or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774 (Jonza et al.). Commercially available examples of MOF reflective polarizers include Vikuiti™ DBEF-D200 and DBEF-D440 multilayer reflective polarizers that include diffusive surfaces, available from 3M Company.

Examples of DRPF useful in connection with the present disclosure include continuous/disperse phase reflective polarizers as described, e.g., in co-owned U.S. Pat. No. 5,825,543 (Ouderkirk et al.), and diffusely reflecting multilayer polarizers as described, e.g., in co-owned U.S. Pat. No. 5,867,316 (Carlson et al.). Other suitable types of DRPF are described in U.S. Pat. No. 5,751,388 (Larson).

Some examples of wire grid polarizers useful in connection with the present disclosure include those described, e.g., in U.S. Pat. No. 6,122,103 (Perkins et al.). Wire grid polarizers are commercially available, inter alia, from Moxtek Inc., Orem, Utah.

Some examples of cholesteric polarizers useful in connection with the present disclosure include those described, e.g., in U.S. Pat. No. 5,793,456 (Broer et al.), and U.S. Patent Publication No. 2002/0159019 (Pokorny et al.). Cholesteric polarizers are often provided along with a quarter wave retarding layer on the output side so that the light transmitted through the cholesteric polarizer is converted to linearly polarized light.

In some embodiments, a polarization control layer 144 may be provided between the diffuser plate 148 and the reflective polarizer 142. Examples of polarization control layers 144 include a quarter wave retarding layer and a polarization rotating layer such as a liquid crystal polarization rotating layer. The polarization control layer 144 may be used to change the polarization of light that is reflected from the reflective polarizer 142 so that an increased fraction of the recycled light is transmitted through the reflective polarizer 142.

The optional arrangement 140 of light management films may also include one or more brightness enhancing layers. A brightness enhancing layer can redirect off-axis light in a direction closer to the axis of the display. This increases the amount of light propagating on-axis through the LC layer 152, thus increasing the brightness of the image seen by the viewer. One example of a brightness enhancing layer is a prismatic brightness enhancing layer, which has a number of prismatic ridges that redirect the illumination light through refraction and reflection. Examples of prismatic brightness enhancing layers that may be used in the display system 100 include the Vikuiti™ BEF II and BEF III family of prismatic films available from 3M Company, including BEF II 90/24, BEF II 90/50, BEF IIIM 90/50, and BEF IIIT. Brightness enhancement may also be provided by some of the embodiments of front reflectors as is further described herein.

The exemplary embodiment illustrated in FIG. 1 shows a first brightness enhancing layer 146a disposed between the reflective polarizer 142 and the LC panel 150. A prismatic brightness enhancing layer typically provides optical gain in one dimension. An optional second brightness enhancing layer 146b may also be included in the arrangement 140 of light management layers, having its prismatic structure oriented orthogonally to the prismatic structure of the first brightness enhancing layer 146a. Such a configuration provides an increase in the optical gain of the display system 100 in two dimensions. In other exemplary embodiments, the brightness enhancing layers 146a, 146b may be positioned between the backlight 110 and the reflective polarizer 142.

The different layers in the optional light management unit 140 may be free standing. In other embodiments, two or more of the layers in the light management unit 140 may be laminated together, for example as discussed in co-owned U.S. patent application Ser. No. 10/966,610 (Ko et al.). In other exemplary embodiments, the optional light management unit 140 may include two subassemblies separated by a gap, for example, as described in co-owned U.S. patent application Ser. No. 10/965,937 (Gehlsen et al.).

Figure 2:
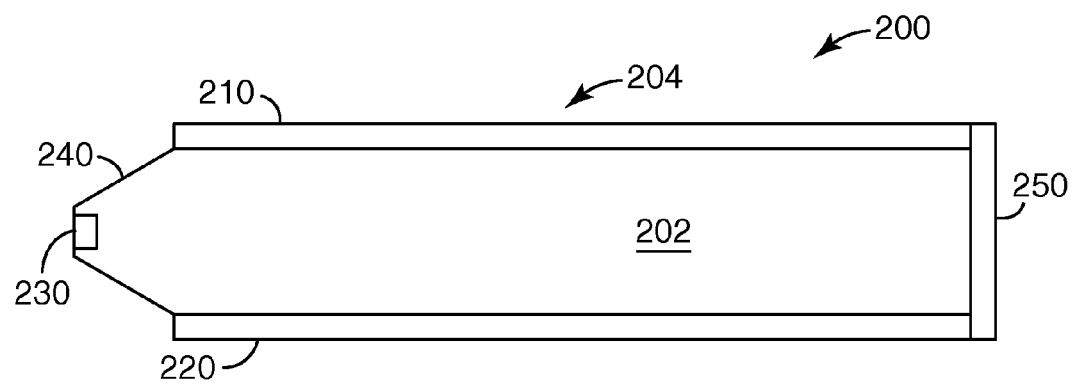
FIG. 2 is a schematic cross-section view of one embodiment of an edge-lit backlight.

The display system 100 of the embodiment illustrated in FIG. 1 can include any suitable backlight described herein. For example, FIG. 2 is a schematic cross-section view of one embodiment of an edge-lit backlight 200. Unless otherwise indicated, references to "backlights" are also intended to apply to other extended area lighting devices that provide nominally uniform illumination in their intended application. The backlight 200 includes a front reflector 210 and a back reflector 220 that form a hollow light recycling cavity 202. The cavity 202 includes an output surface 204. The backlight 200 also includes one or more light sources 230 disposed to emit light into the cavity 202. The backlight 200 can optionally include side surfaces or reflectors 250 surrounding the periphery of the light recycling cavity 200 on sides that do not include light sources.

As illustrated, backlight 200 includes an injector 240 that helps to direct light from the one or more light sources 230 into the light recycling cavity 202. Any suitable injector can be used with the backlight 200, e.g., those injectors described in PCT Publication No. WO2008/144650.

Although depicted as having one or more light sources 230 positioned along one side of the backlight 200, light sources can be positioned along two, three, four, or more sides of the backlight 200. For example, for a rectangularly shaped backlight, one or more light sources can be positioned along each of the four sides of the backlight.

In some embodiments, hybrid configurations are possible where light sources are positioned both along one or more edges and also across the back reflector. In such instances it can be beneficial to position RGB light sources along the edge and white light sources along the back reflector. White light sources can be more efficient and do not require color mixing to provide white light. RGB light sources have higher color gamut can be less efficient than white sources. This has the advantage of reducing power consumption requirements via the use of high efficiency white light sources, while increasing color gamut with the addition of RGB sources. By injecting the RGB light along the edge, color mixing is done laterally, which can provide a thinner backlight.

The front reflector 210 is partially transmissive and partially reflective for at least visible light. The partial transmissivity of the front reflector 210 allows at least a portion of light within the cavity 202 to be emitted through the output surface 204 of the cavity 202. The front reflector 210 can include any suitable film(s) and/or layer(s) that provide partial transmission and reflection to light incident upon the front reflector 210 from inside the cavity 202. In some embodiments, the front reflector 210 includes an on-axis average reflectivity of at least 65%. In other embodiments, the front reflector 210 includes a total hemispherical reflectivity of at least 75%. Still in other embodiments, the front reflector 210 includes an on-axis average reflectivity of at least 65% and a total hemispherical reflectivity of at least 75%. As used herein, the term "on-axis average reflectivity" refers to the average reflectivity of light incident on a reflector in a direction that is substantially normal to such surface. Further, the term "total hemispherical reflectivity," i.e., $R_{hemi}$, refers to the total reflectivity of a reflector for light (over a wavelength range of interest) incident on the reflector from all directions within a hemisphere centered around a normal to the reflector.

The front reflector 210 is operable to emit polarized light. In such embodiments, the front reflector 210 includes an on-axis average reflectivity of at least 90% for visible light polarized in a first plane, and an on-axis average reflectivity of at least 25% but less than 90% for visible light polarized in a second plane parallel to the first plane. Those skilled in the art would consider light polarized in the second plane to be in a useable polarization state, i.e., such polarized light would pass through the lower absorbing polarizer of an LC panel (e.g., lower absorbing polarizer 158 of FIG. 1) and be incident on the LC panel. Further, those skilled in the art would consider the first plane to be parallel to the block axis and the second plane to be parallel to the pass axis of the polarizing front reflector 210. Backlights of the present disclosure that provide polarized light exhibit high enough reflectivities for useable light to provide sufficient lateral transport or spreading for acceptable spatial uniformity of the emitted light, but a low enough reflectivity of usable light to keep the overall loss of the usable polarization state in the cavity to manageable levels, thereby providing an acceptably high brightness of the emitted light.

Further, in some embodiments, it may be desirable that the average on-axis transmission of the useable polarization state is several times greater than the transmission of non-useable polarization state to ensure that the output from the cavity 202 is substantially the desired polarization state. This also helps to reduce the total loss of useable light from the cavity. In some embodiments, the front reflector includes a first on-axis average transmissivity for visible light polarized in the first plane, and a second on-axis average transmissivity for visible light polarized in the second plane, where a ratio of the second on-axis transmissivity to the first on-axis transmissivity is at least 7. In other embodiments, this ratio is at least 10, 20, or any suitable ratio.

The front reflector 210 can include any suitable film(s) and/or layer(s) such that the front reflector provides emitted light having the desired optical characteristic or characteristics. In one exemplary embodiment, the front reflector 210 can include one or more birefringent multilayer optical films. See, e.g., U.S. Pat. No. 5,882,774 (Jonza et al.) entitled OPTICAL FILM; U.S. Pat. No. 6,905,220 (Wortman et al.) entitled BACKLIGHT SYSTEM WITH MULTILAYER OPTICAL FILM REFLECTOR; U.S. Pat. No. 6,210,785 (Weber et al.) entitled HIGHT EFFICIENCY OPTICAL DEVICES; and U.S. Pat. No. 6,783,349 (Neavin et al.) entitled APPARATUS FOR MAKING MULTILAYER OPTICAL FILMS.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in H. A. Macleod, Thin-Film Optical Filters, 2nd Ed., Macmillan Publishing Co. (1986); and A. Thelan, Design of Optical Interference Filters, McGraw-Hill, Inc. (1989).

More recently, multilayer optical films have been demonstrated by coextrusion of alternating polymer layers. See, e.g., U.S. Pat. No. 3,610,724 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

Polymeric multilayer optical films for use in optical filters are described, for example, in PCT Publication Nos. WO95/17303; WO95/17691; WO95/17692; WO95/17699; WO96/19347; and WO99/36262. One commercially available form of a multilayer reflective polarizer is marketed as Dual Brightness Enhanced Film (DBEF) by 3M Company, St. Paul, Minn. Polymeric multilayer optical films are generally formed using alternating layers of polymer materials with different indices of refraction. Typically, any polymer can be used as long as the polymer is relatively transparent over the wavelength range of transmission. For polarizing applications, the first optical layers, the second optical layers, or both are formed using polymers that are or can be made birefringent, in which the polymer's index of refraction has differing values along orthogonal cartesian axes of the polymer. Generally, birefringent polymer microlayers have their orthogonal Cartesian axes defined by the normal to the layer plane (z-axis), with the x-axis and y-axis laying within the layer plane. Birefringent polymers can also be used in non-polarizing applications.

A multilayer optical film typically includes individual microlayers having different refractive index characteristics so that some light is reflected at interfaces between adjacent microlayers. The microlayers are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. However, thicker layers can also be included, such as skin layers at the outer surfaces of the multilayer optical film, or protective boundary layers (PBLs) disposed between the multilayer optical films, that separate the coherent groupings of microlayers. Such a multilayer optical film body can also include one or more thick adhesive layers to bond two or more sheets of multilayer optical film in a laminate.

In a simple embodiment, the microlayers can have thicknesses and refractive index values corresponding to ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. Thickness gradients along a thickness axis of the film (e.g., the z-axis) can be used to provide a widened reflection band. Thickness gradients tailored to sharpen such band edges (at the wavelength transition between high reflection and high transmission) can also be used, as discussed in U.S. Pat. No.

6,157,490 (Wheatley et al.). For polymeric multilayer optical films, reflection bands can be designed to have sharpened band edges as well as "flat top" reflection bands, in which the reflection properties are essentially constant across the wavelength range of application. Other layer arrangements, such as multilayer optical films having 2-microlayer optical repeat units whose f-ratio is different from 50%, or films whose optical repeat units include more than two microlayers, are also contemplated. These alternative optical repeat unit designs can be configured to reduce or to excite certain higher-order reflections. See, e.g., U.S. Pat. No. 5,360,659 (Arends et al.) and U.S. Pat. No. 5,103,337 (Schrenk et al.).

Multilayer optical films can be designed to reflect one or both polarizations of light over at least one bandwidth. Through careful manipulation of these layer thicknesses and indices of refraction along the various film axes, the multilayer optical film can be made to behave as a highly reflective mirror for one axis of polarization, and as a weaker, less reflective mirror for the orthogonal axis of polarization. Thus, for example, multilayer optical films may be tuned to reflect strongly one polarization of light in the visible region of the spectrum while being weakly reflecting (substantially transparent) for an orthogonal polarization axis. With the appropriate choice of birefringence for the polymer microlayers, and the appropriate choice of microlayer thicknesses, a multilayer optical film can be designed to have any variation of reflection magnitude for polarized light along either of its two orthogonal in-plane axes.

Exemplary materials that can be used in the fabrication of polymeric multilayer optical film can be found in PCT Publication WO 99/36248 (Neavin et al.). Exemplary two-polymer combinations that provide both adequate refractive index differences and adequate inter-layer adhesion include (1) for polarizing multilayer optical film made using a process with predominantly uniaxial stretching, PEN/coPEN, PET/coPET, PEN/sPS, PET/sPS, PEN/Eastar,™ PET/Eastar,™, PEN/FN007, where "PEN" refers to polyethylene naphthalate, "coPEN" refers to a copolymer or blend based upon naphthalene dicarboxylic acid, "PET" refers to polyethylene terephthalate, "coPET" refers to a copolymer or blend based upon terephthalic acid, "sPS" refers to syndiotactic polystyrene and its derivatives, Eastar™ is a polyester or copolyester (believed to comprise cyclohexanedimethylene diol units and terephthalate units) commercially available from Eastman Chemical Co., and "FN007" (Neostar) is a copolyester ether that is commercially available from Eastman Chemical Co.; (2) for polarizing multilayer optical film made by manipulating the process conditions of a biaxial stretching process, PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol; (3) for mirror films (including colored mirror films), PEN/PMMA, coPEN/PMMA, PET/PMMA, PEN/Ecdel,™ PET/Ecdel,™ PEN/sPS, PET/sPS, PEN/coPET, PEN/PETG, and PEN/THV,™ where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., and THV™ is a fluoropolymer commercially available from 3M Company.

Further details of suitable multilayer optical films and related designs and constructions can be found in U.S. Pat. No. 5,882,774 (Jonza et al.), U.S. Pat. No. 6,531,230 (Weber et al.), PCT Publication Nos. WO 95/17303 (Ouderkirk et al.), WO 99/39224 (Ouderkirk et al.), and "Giant Birefringent Optics in Multilayer Polymer Mirrors", Science, Vol. 287, March 2000 (Weber et al.).

Multilayer optical films and film bodies can include additional layers and coatings selected for their optical, mechanical, and/or chemical properties. For example, a UV absorbing layer can be added at the incident side of the optical element to protect components from degradation caused by UV light. Additional layers and coatings could also include scratch resistant layers, tear resistant layers, and stiffening agents. See, e.g., U.S. Pat. No. 6,368,699 (Gilbert et al.).

Figure 3:
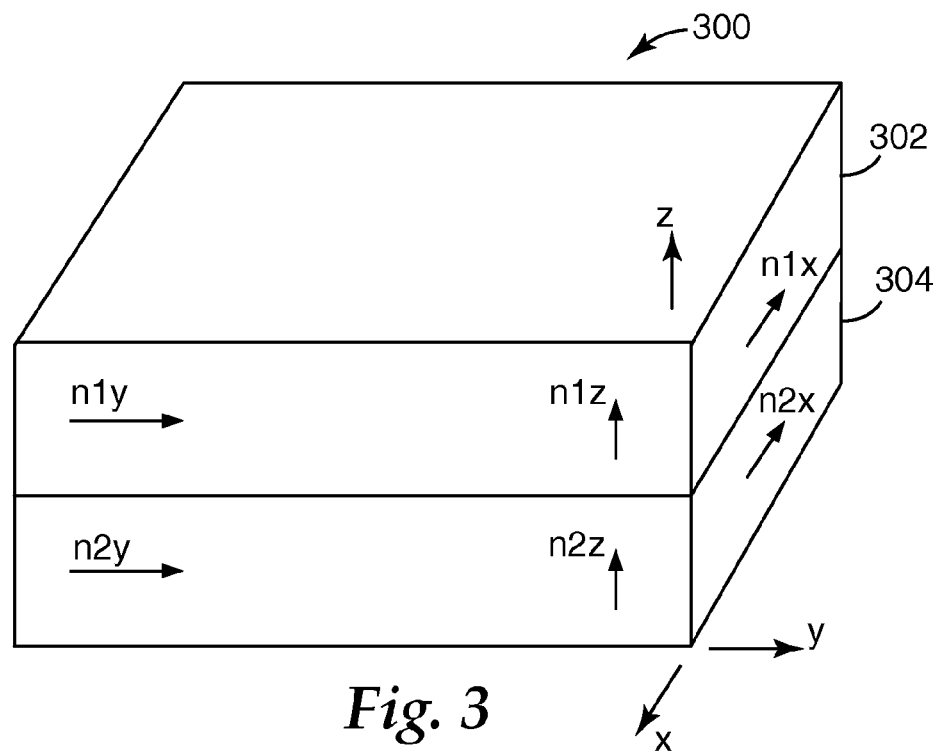
FIG. 3 is a schematic perspective view of one embodiment of a multilayer optical film.

FIG. 3 depicts a conventional multilayer optical film 300. The film 300 includes individual microlayers 302, 304. The microlayers have different refractive index characteristics so that some light is reflected at interfaces between adjacent microlayers. The microlayers are sufficiently thin so that light reflected at a plurality of the interfaces undergoes constructive or destructive interference to give the film the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 µm. Thicker layers can, however, also be included, such as skin layers at the outer surfaces of the film, or protective boundary layers disposed within the film that separate packets of microlayers.

The reflective and transmissive properties of multilayer optical film 300 are a function of the refractive indices of the respective microlayers. Each microlayer can be characterized, at least in localized positions in the film, by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively (see FIG. 3).

In practice, the refractive indices are controlled by judicious materials selection and processing conditions. Film 300 can be made by co-extrusion of typically tens or hundreds of layers of two alternating polymers A, B, followed by optionally passing the multilayer extrudate through one or more multiplication die, and then stretching or otherwise orienting the extrudate to form a final film. The resulting film is composed of typically tens or hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers can exhibit a difference in refractive index ($\Delta n_x$) for light polarized along the x-axis of at least 0.05. If the high reflectivity is desired for two orthogonal polarizations, then the adjacent microlayers also can exhibit a difference in refractive index ($\Delta n_y$) for light polarized along the y-axis of at least 0.05.

If desired, the refractive index difference ($\Delta n_z$) between adjacent microlayers for light polarized along the z-axis can also be tailored to achieve desirable reflectivity properties for the p-polarization component of obliquely incident light. For ease of explanation, at any point of interest on a multilayer optical film, the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z$ 0.5*$\Delta n_x$. More preferably, $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e., $\Delta n_z < 0$. This condition yields interfaces whose reflectivity for p-polarized light increases with increasing angles of incidence, as is the case for s-polarized light.

Alternatively, the multilayer optical film can have a simpler construction in which all of the polymeric microlayers are isotropic in nature, i.e., $n_x = n_y = n_z$ for each layer. Furthermore, known self-assembled periodic structures, such as cholesteric reflecting polarizers and certain block copolymers, can be considered multilayer optical films for purposes of this application. Cholesteric mirrors can be made using a combination of left- and right-handed chiral pitch elements.

In reference to traditional polarizing films, light can be considered to be polarized in two orthogonal planes, where the electric vector of the light, which is transverse to the propagation of the light, lies within a particular plane of polarization. In turn, the polarization state of a given light ray can be resolved into two different polarization states: p-polarized and s-polarized light. P-pol light is light that is polarized in the plane of incidence of the light ray and a given surface, where the plane of incidence is a plane containing both the local surface normal vector and the light ray propagation direction or vector.

Figure 4:
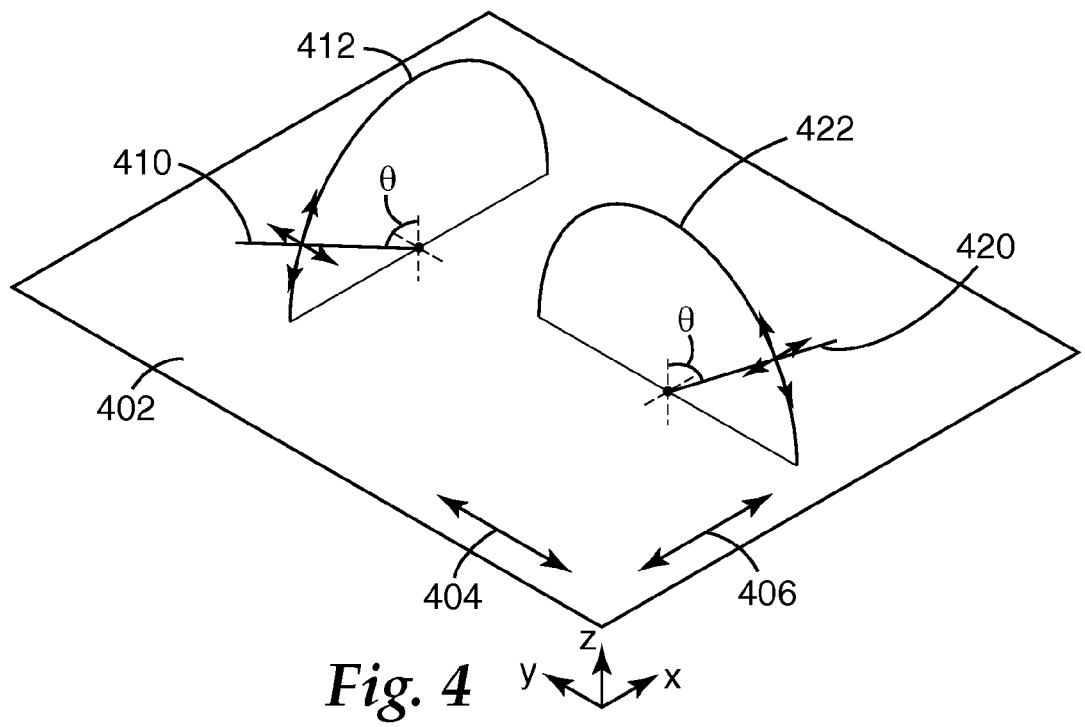
FIG. 4 is a schematic perspective view of a reflective polarizing film.

For example, FIG. 4 illustrates light ray 410 that is incident on a polarizer 402 at an angle of incidence θ, thereby forming a plane of incidence 412. The polarizer 402 includes a pass axis 404 that is parallel to the y-axis, and a block axis 406 that is parallel to the x-axis. The plane of incidence 412 of ray 410 is parallel to the block axis 406. Ray 410 has a p-polarized component that is in the plane of incidence 412, and an s-polarized component that is orthogonal to the plane of incidence 412. The p-pol light of ray 410 is parallel to the block axis 406 of polarizer 402 and will, therefore, be substantially reflected by the polarizer, while the s-pol light of ray 410 is parallel to the pass axis 404 of polarizer 402 and, at least in part, be transmitted.

Further, FIG. 4 illustrates ray 420 that is incident on polarizer 402 in a plane of incidence 422 that is parallel to the pass axis 404 of the polarizer 402. Therefore, the p-pol light of ray 420 is parallel to the pass axis 404 of the polarizer 402, while the s-pol light of ray 420 is parallel to the block axis 406 of polarizer 402 As a result, assuming that the polarizer 402 is a perfect polarizer that has a reflectance of 100% at all angles of incident light for light polarized in the block axis and 0% at all angles of incident light for light polarized in the pass axis, the polarizer transmits s-pol light of ray 410 and the p-pol light of ray 420, while reflecting the p-pol light of ray 410 and the s-pol light of ray 420. In other words, the polarizer 402 will transmit a combination of p- and s-pol light. The amount of transmission and reflection of p- and s-pol light will depend on the characteristics of the polarizer as is further described herein.

In general, various asymmetric reflective films can be provided for use as a front reflector (e.g., front reflector 210 of FIG. 2) by altering the relative degree of index match of an in-plane index of the low index material with the z-index of the adjacent birefringent high index material. In some embodiments, relatively large in-plane index mismatches are required along both in-plane optical axes of the asymmetric reflective film, but the mismatches are significantly different from each other, thus producing asymmetrical normal incidence transmission and reflection properties. This is in contrast to conventional reflective polarizing films where in-plane indices are substantially matched along the pass axis. An example of such films is DBEF (available from 3M Company), which has low reflectivity for light polarized along one in-plane axis at normal incidence.

Figure 5:
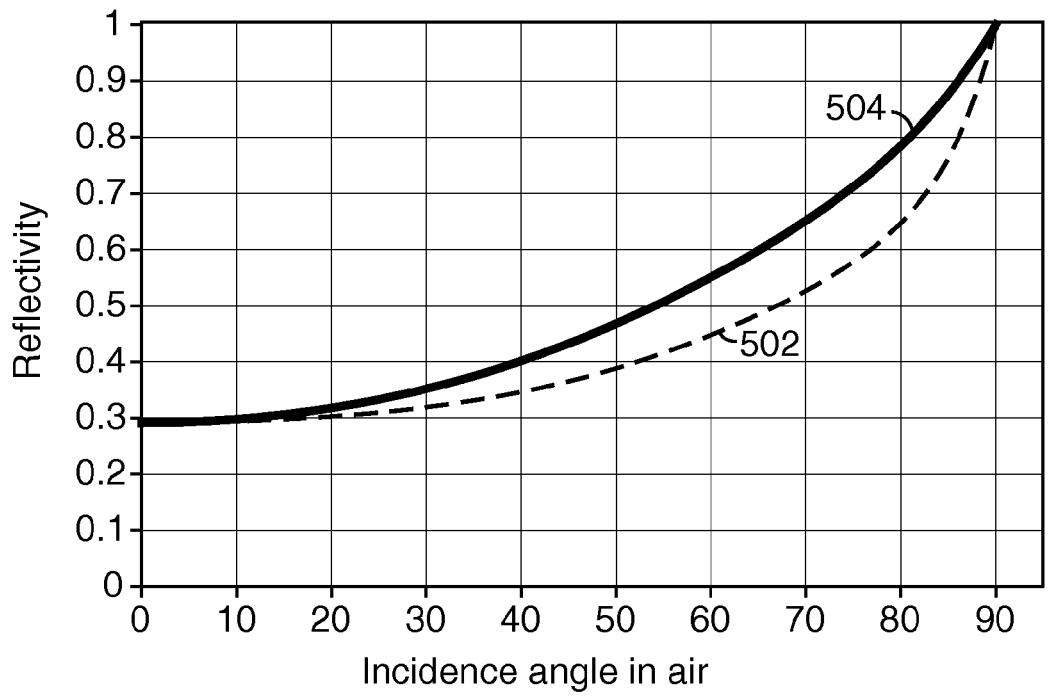
FIG. 5 is a graph of reflectivity versus incidence angle in air for one embodiment of an asymmetric reflective film.

For example, an exemplary asymmetric reflective film that can be used in the front reflector of the present disclosure can have a high index layer (i.e., the layer that includes the highest index of refraction) with in plane index values of nx1=1.82 and ny1=1.62, and a z-axis index of nz1=1.50, and an isotropic low index layer having in-plane indices of nx2=ny2=nz2=1.56. A film having these indices of refraction can be formed using a coPEN/PETG coextruded multilayer film using a constrained uniaxial orientation as in a standard film tenter. Using about 300 layers, the reflectivities shown in FIG. 5 can be achieved for light from 400 to 870 nm with polarization vectors parallel to the y-z plane (the "pass" axis). Due to the large index difference along the x-axis, and the lack of a Brewster angle, about 98% of light with polarization vectors parallel to the x-z plane is reflected. FIG. 5 illustrates the reflectivity of light for the pass axis at various angles of incidence in air for p-pol light (curve 502) and s-pol light (curve 504). As illustrated, such a film can include an average on-axis reflectivity of about 29% for visible light for one polarization while having a much higher reflectivity of about 98% for the block axis.

In general, the use of a high index biaxially birefringent material, such as the one illustrated in FIG. 5, allows for the design of asymmetric reflectors which block most light components polarized parallel to a first (block) axis, and pass controlled amounts of both s-polarized and p-polarized light components that are aligned with the orthogonal (pass) axis. The relative reflectivity for s- and p-pol light along this pass axis can be adjusted by varying the isotropic index n2 of the second material to a value somewhere between ny1 and nz1.

The asymmetric reflective film or films utilized for the front reflector can include a high index material that is highly biaxially birefringent, having indices of $n_{x1} >> n_{y1} >> n_{z1}$. This can be achieved via a constrained uniaxial stretch of some materials, or an asymmetrical orientation of these or other materials. This relationship enables the design of a film that simultaneously meets the following criteria:

The value of $\Delta n_y$ is large enough so that a substantial reflectivity (e.g., 25% to 90%) can be achieved for the pass axis with a useful number of layers. This constraint relates to spectral control needed for low color films as is further described herein. In some embodiments, it may be preferred that $\Delta n_y$ about 0.05.

The value of $\Delta n_x$ can be significantly larger than $\Delta n_y$, to insure that the block axis transmits much less light than the pass axis. In general, it may be preferred that $\Delta n_x \geq 2 \Delta n_y$.

$\Delta n_z$ can be much less than $\Delta n_x$ and, in some embodiments, is of the opposite sign. This can help to prevent light polarized along the block axis from leaking, especially at oblique incidence angles.

Figure 6:
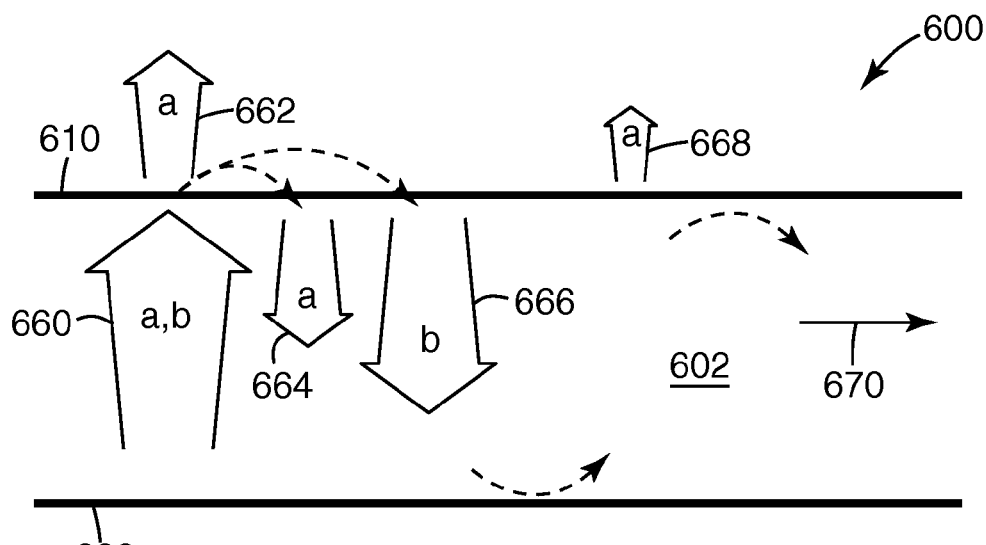
FIG. 6 is a schematic cross-section view of one embodiment of a portion of a hollow light recycling cavity.

Front reflectors that provide a polarized output and reflect at least some light in the pass state can provide acceptable spatial uniformity of emitted light from backlights that include one or more light sources by increased recycling of the light within the light recycling cavity. A schematic representation of a portion of this type of backlight is illustrated in FIG. 6, where backlight 600 includes a front reflector 610 and a back reflector 620 that form a hollow light recycling cavity 602. Light 660 within the cavity 602 represents light that is incident on the front reflector 610 and includes light of a first polarization state (a) and a second orthogonal polarization state (b). The front reflector 610 transmits a portion of light 662 having polarization state (a) while reflecting a second portion 664 of light with state (a) and reflecting substantially all of light 666 having polarization state (b). The reflected light 664, 666 is reflected by back reflector 620 and directed toward front reflector 610 where again a portion 668 of state (a) is transmitted, and a second portion of state (a) and substantially all of state (b) is reflected. As a result of this reflection of light of both polarization states (a) and (b), the light within the cavity 602 is allowed to travel laterally in the cavity in direction 670. In a typical backlight, light of polarization state (a) may be substantially transmitted by the backlight on the first pass, thereby reducing the amount of light that is transported laterally within the cavity. Although depicted in two dimensions, it is understood that the backlights of the present disclosure can provide lateral transport of light in both orthogonal directions within the cavity such that light substantially fills the cavity to provide acceptable spatial uniformity of the light emitted from the cavity.

The front reflectors of the present disclosure not only help to provide acceptable spatial uniformity, some embodiments of front reflectors also provide angularly selective transmission of useable light, e.g., to a display.

Figure 7A:
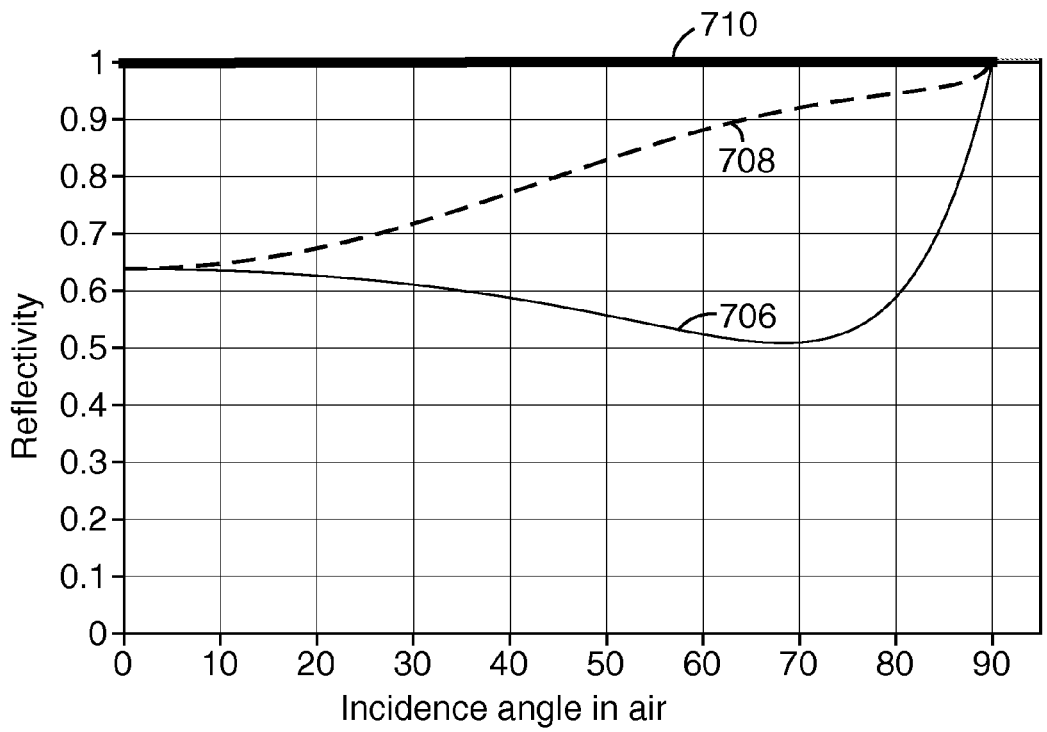
FIG. 7A is a graph of reflectivity versus incidence angle in air for another embodiment of an asymmetric reflective film.
Figure 7B:
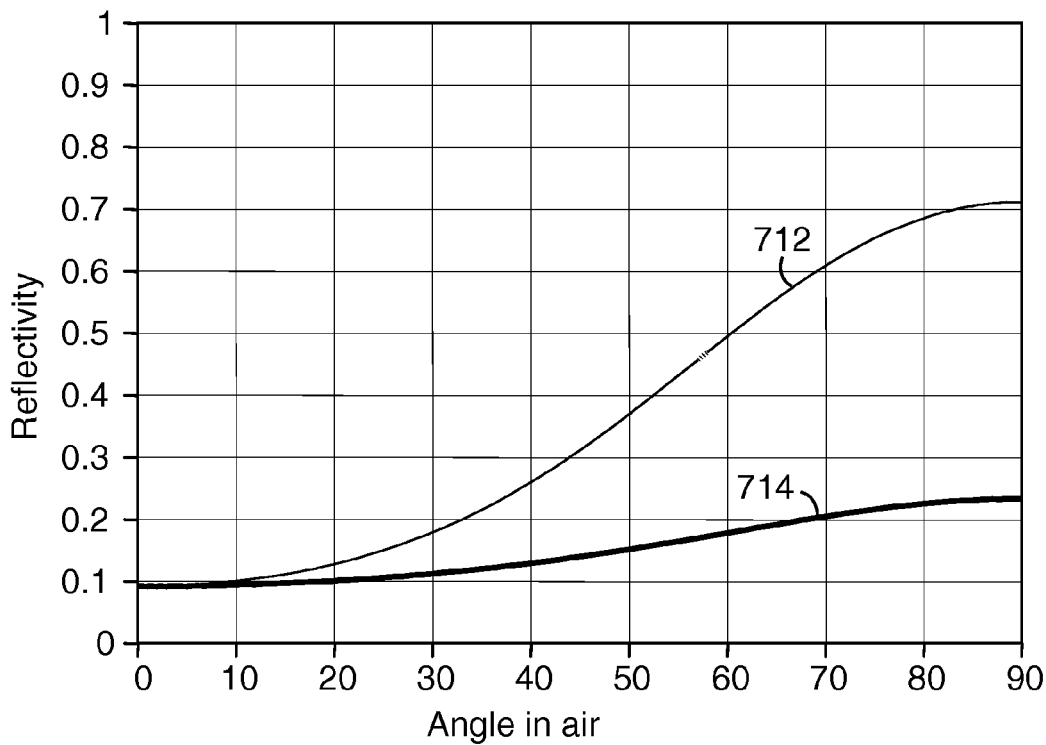
FIG. 7B is a graph of reflectivity versus incidence angle in air for another embodiment of an asymmetric reflective film.

In general, at least some embodiments of the front reflectors exhibit a reflectivity that generally increases with angle of incidence of light, and a transmission that generally decreases with angle of incidence, where the reflectivity and transmission are for unpolarized visible light and for any plane of incidence, and/or for light of a usable polarization state incident in a plane for which oblique light of the usable polarization state is p-polarized. For example, FIGS. 5 and 7A-B illustrate reflectivity in the pass-axis versus angle of incidence for various embodiments of front reflectors of the present disclosure.

FIG. 5 illustrates the pass axis reflectivity versus incident angle for visible light in air for one embodiment of a front reflector as modeled using standard modeling techniques. A front reflector having the reflectivities shown in FIG. 5 can be formed using a coPEN/PETG coextruded multilayer film using a constrained uniaxial orientation as in a standard film tenter. Using about 300 layers, the reflectivities shown in FIG. 5 can be achieved for visible light from 400 to 870 nm with polarization vectors parallel to the y-z plane (i.e., the pass axis).

Curve 502 represents the reflectivity of p-pol light in the pass axis and curve 504 represents the reflectivity of s-pol light in the pass axis. The reflectivity values include the reflections from the multilayer film and surface reflections at the air/film boundary. As can be seen in FIG. 5, the reflectivity for both s-pol and p-pol light increases with increasing angle of incidence. Due to the large index difference along the x-axis, and the lack of a Brewster angle, about 98% of light with polarization vectors parallel to the x-z plane is reflected (i.e., the block axis). This single film can thus perform the task of multiple films to form a front reflector that transmits controlled amounts of light polarized parallel to a pass axis. The calculated average reflectivity for s- and p-polarized light at 60 degrees for the pass axis is about 50%. Further, the reflectivity for all light polarized in a plane parallel to the block axis can be greater than about 99%.

In general, the use of a high index biaxially birefringent material, such as the asymmetric reflective film described regarding FIG. 5, allows for design of asymmetric reflectors that block most light components polarized parallel to one axis, and pass controlled amounts of both s-polarized and p-polarized light components that are aligned with the orthogonal (pass) axis. The relative reflectivity for s- and p-pol light along this pass axis can be adjusted by varying the isotropic refractive index n2 of the second material to a value somewhere between ny1 and nz1.

The index relationships, their numerical values, and the multilayer stack design should all be considered to create a front reflector that, in some embodiments, has an intermediate transmission value along one axis (i.e., the pass axis) and about ≤10× that value of transmission along the other (block) axis at normal incidence. In addition, it may be preferred that the block axis does not leak much light at any angle of incidence and, therefore, such embodiments require either a large Brewster angle or no Brewster angle for the block axis. The pass axis can have a Brewster angle if the system in which it is employed can accept an angular distribution of light that is shifted towards off normal angles.

The "high" index material, defined as the material with the highest in-plane index, can be highly biaxially birefringent in order that $n_{x1} \gg n_{y1} \gg n_{z1}$. This can be achieved via a constrained uniaxial stretch of some materials, or an asymmetrical orientation of these or other materials. This relationship enables the design of a film that simultaneously meets the following three criteria:

1) For reflectivities of at least 25% but less than 90% for visible light polarized in the pass axis, the value of $\Delta n_y$ should be large enough so that such substantial reflectivity can be achieved for the pass axis with a useful number of layers. With practical materials and process systems this leads to the requirement that $\Delta n_y \geq$ about 0.05.

2) To help mitigate transmission of light in the block axis, the value of $\Delta n_x$ should be significantly larger than $\Delta n_y$. In general, it may be preferred that $\Delta n_x \geq 2^* \Delta n_y$. Further, it may be preferred that $\Delta n_z$ is much less than $\Delta n_x$ and of the opposite sign.

As stated herein, the front reflector can provide increasing reflectivity for both s-pol and p-pol light as a function of angle of incidence. This effect will produce an angular "gain" in a backlight display, similar to the effect of prismatic BEF films, or gain diffuser films commonly used in the industry. With the front reflectors, the high reflectivity at oblique angles recycles oblique rays which are converted in the backlight to low angle rays that have a higher probability of transmission. In this manner, more light exits the light recycling cavity near normal incidence than at high angles.

In typical LCD panels, the pass axis of the lower absorbing polarizer (i.e., lower absorbing polarizer 156 of FIG. 1) is often placed horizontally on the LCD panel. With this arrangement, p-pol light is incident in the horizontal plane and s-pol light is incident in the vertical plane. The lateral viewing angle for such panels is typically desired to be much wider than the vertical viewing angle, although it may be desirable to control those relative values. Therefore, the relative amount of s-pol vs. p-pol reflectivity and subsequent angular gain is a parameter that is desirably controlled. In general, the pass axis of the lower absorbing polarizer can be placed in any suitable orientation relative to the viewer, e.g., at any angle to horizontal, vertically, etc.

FIG. 7A illustrates the pass axis reflectivity versus incident angle for light in air for another embodiment of a front reflector as modeled using standard modeling techniques. A front reflector having the reflectivities shown in FIG. 7A can be formed using an coPEN/PMMA coextruded multilayer film using a constrained uniaxial orientation as in a standard film tenter. Using about 300 layers, the reflectivities shown in FIG. 7A can be achieved for light from 400 to 870 nm with polarization vectors parallel to the y-z plane (i.e., the pass axis). The refractive indices for the microlayers of coPEN are nx1=1.82, ny1=1.61, and nz1=1.52. And the indices for the microlayers of PMMA are nx2=ny2=nz2=1.49. Curve 706 represents the reflectivity of p-pol light in the pass axis and curve 708 represents the reflectivity of s-pol light in the pass axis. Curve 710 represents the reflectivity of both p- and s-pol light in the block axis. The reflectivity values include the reflections from the multilayer film and surface reflections at the air/film boundary. The materials and indices of refraction of this embodiment can be used in a multilayer stack design to create angular gain or collimation for s-pol light but not for p-pol light that is transmitted by the pass axis of this front reflector.

Index n2 is slightly less than nz1, and the reflectivity of the pass axis for p-pol light decreases with increasing angle of incidence, as illustrated in FIG. 7A. With a film such as this in the LCD panel with a horizontal pass axis, more light would exit the cavity to either side than at normal incidence, i.e., the panel would be brighter when viewed from the side than at normal incidence. The addition of gain diffuser films or a BEF film with vertically oriented grooves could be used to direct more light to the normal (perpendicular) viewing direction. Alternatively, the low index material can be changed so that it has an index above that of nz1. Light exiting the cavity in the vertical plane is predominantly s-polarized. As shown in FIG. 7A, the reflectivity for s-pol light increases substantially as a function of angle of incidence. This front reflector would thus recycle much of the high angle light incident in the vertical plane, thereby creating substantial angular gain in the vertical direction.

In summary, referring to FIGS. 5 and 7A, by selecting the refractive index value of the low index material, in a range between the high index material values of ny1 and nz1, the relative strengths of s-pol and p-pol reflectivity can be controlled as a function of angle. In this manner, the angular gain or collimation of polarized light from the backlight cavity in each direction can be controlled. Index ny2 can be made lower than nz1, but it may be desirable to not make ny2 so low that the Brewster angle thus created along the pass axis will leak p-pol light incident at high angles of incidence. Such a design will create a negative angular gain. Making ny2 larger than ny1 can cause the same result. Additionally, making ny2 larger than ny1 will lower the reflectivity for the block axis of the reflector, thereby potentially requiring additional layers for the film to prevent leakage of light having an undesirable polarization state.

The relative amounts of s-pol vs. p-pol angular gain can also be adjusted if both the high index and low index materials are birefringent. Such materials for the low index layer can be selected to have the same or opposite birefringence as the high index layer, and the relative values of ny2 and nz2 can be selected to determine the relative magnitudes of s-pol and p-pol reflectivity.

For example, FIG. 7B illustrates the pass axis reflectivity versus incident angle for light in air for another embodiment of a front reflector as modeled using standard modeling techniques. A front reflector having the reflectivities shown in FIG. 7B can be formed using a coPEN high index material and a low index material syndiotactic polystyrene (sPS) or polyvinyl naphthalene (PVN) or other suitable material. The materials can be formed into a coextruded multilayer film using a constrained uniaxial orientation as in a standard film tenter. Using about 275 layers, the reflectivities shown in FIG. 7B can be achieved for light from 400 to 870 nm with polarization vectors parallel to the y-z plane (i.e., the pass axis). The refractive indices for the microlayers of coPEN are nx1=1.82, ny1=1.61, and nz1=1.50. And the indices for the microlayers of sPS (or other suitable material) are nx2=1.52, ny2=1.57, and nz2=1.65. Curve 712 represents the reflectivity of p-pol light in the pass axis and curve 714 represents the reflectivity of s-pol light in the pass axis. The reflectivity values include the reflections from the multilayer film and surface reflections at the air/film boundary.

In general, when both materials are birefringent, if the low index material has the opposite birefringence to the high index material, then $\Delta nz$ can be increased while decreasing, or maintaining, the value of $\Delta ny$. If the low index material has the same sign of birefringence as the high index material, then $\Delta nz$ can be decreased while maintaining or decreasing the value of $\Delta ny$. As illustrated in FIG. 7B, the p-pol light (curve 712) increases as a function of incidence angle at a greater rate than does the s-pol light (curve 714). As a result, the p-pol light exhibits a much greater angular gain or collimation than does the s-polarized light.

Figure 28:
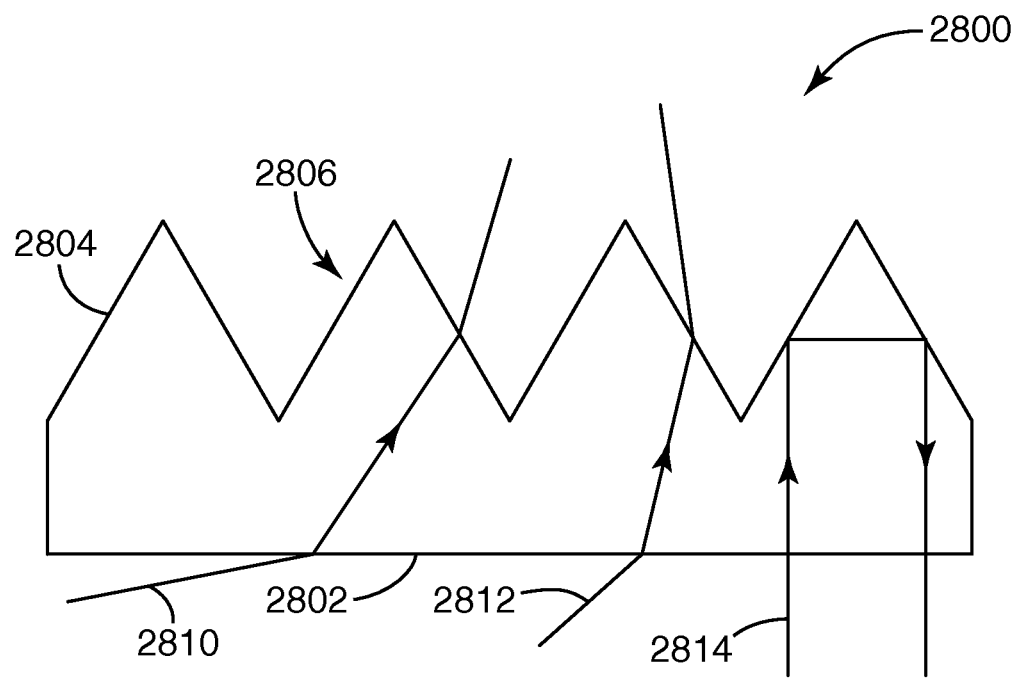
FIG. 28 is a schematic cross-section view of one embodiment of a prismatic brightness enhancing film.

In general, prismatic brightness enhancing films act as partial collimators of light by reflecting on-axis light and refracting off-axis light. For example, FIG. 28 is a schematic cross-section view of a portion of a prismatic brightness enhancing film 2800. Film 2800 has a smooth side 2802 and a structured side 2804. Structured side 2804 includes a plurality of triangular prisms 2806. Light ray 2810 is incident upon smooth surface 2802 at a grazing angle, i.e., an angle to the normal approaching 90 degrees, and is refracted. Upon reaching structured surface 2804, ray 2810 is again refracted. Light ray 2812 approaches smooth surface 2802 at an angle much closer to the normal to smooth surface 2802 than ray 2810. It also is refracted as it passes through both the smooth surface 2802 and the structured surface 2804. Further, light ray 2814 is incident upon smooth surface 2802 at an angle even closer to the normal to smooth surface 2802 than was light ray 2838, and is totally internally reflected twice by structured surface 2804.

As illustrated, light rays that are incident upon the brightness enhancing film 2800 at relatively high angles (i.e., ray 2810) tend to be refracted by the prismatic surfaces towards the normal, while light rays that are incident at relatively low angles (i.e., ray 2814) tend to be reflected (by TIR at the prism surfaces) back towards the incident direction. By this process, light rays from an angle-mixed source, such as a recycling cavity, are concentrated through the structured surface 2804 towards the normal angle. Light that is reflected back into the cavity from the TIR process at the prism faces can be reflected by a back reflector in a typical light recycling cavity. If the back reflector is at least partially diffusely reflective, then that reflected light is again angle mixed, and the recycling process can lead to an increase in brightness about the normal angle viewer cone, compared to the brightness into the viewer cone without the brightness enhancing film 2800.

The angular performance of various front reflectors can be measured using a gain cube. See, e.g., U.S. Patent Publication No. 2006/0082700 (Gehlsen et al.), entitled COMPOSITE DIFFUSER PLATES AND DIRECT-LIT LIQUID CRYSTAL DISPLAYS USING SAME. The gain cube used to measure the following front reflector embodiments included a 5" Teflon® cube that is made of Teflon® (PTFE) walls that were ⅝" thick on the side and ¼" thick on the top. The cube had a Teflon® bottom with an aluminum bottom plate. An LED on a circuit board was mounted on this plate using thermal tape.

2×TIPS (see Examples for description) was used to line the bottom with holes cut out for the LEDs. This recycling cavity configuration resulted in a spatially uniform (across the backplane) diffuse illumination, and a moderately reflective, highly diffuse recycling cavity, thereby providing a simple recycling cavity device that can be used to measure brightness change for a recycling backlight cavity for various front reflector embodiments.

For the following embodiments, a Sanritz, model HLC2-5618S absorbing polarizer was placed atop the gain cube and conoscopic brightness was measured using a Conoscope™ optical measurement system, available from autronic-MELCHERS GmbH, Karlsruhe, Germany. Baseline measurements were performed by placing the absorbing polarizer on top of the gain cube. The various front reflectors were then placed on top of the gain cube, and the absorbing polarizer was placed on top of the front reflector. A measurement of conoscopic brightness made in this configuration then demonstrated the change in simple recycling backlight brightness as a function of viewer (measurement) observation angle. Measured brightness values are shown for various front reflector embodiments, where the brightness is plotted for a range of angles from normal to grazing, for azimuth angle of 0° and 90°. For 0° azimuth angle, light that is aligned with the absorbing polarizer pass axis is s-polarized, and for a 90° azimuth angle, light that is aligned with the absorbing polarizer pass axis is p-polarized.

Figure 29:
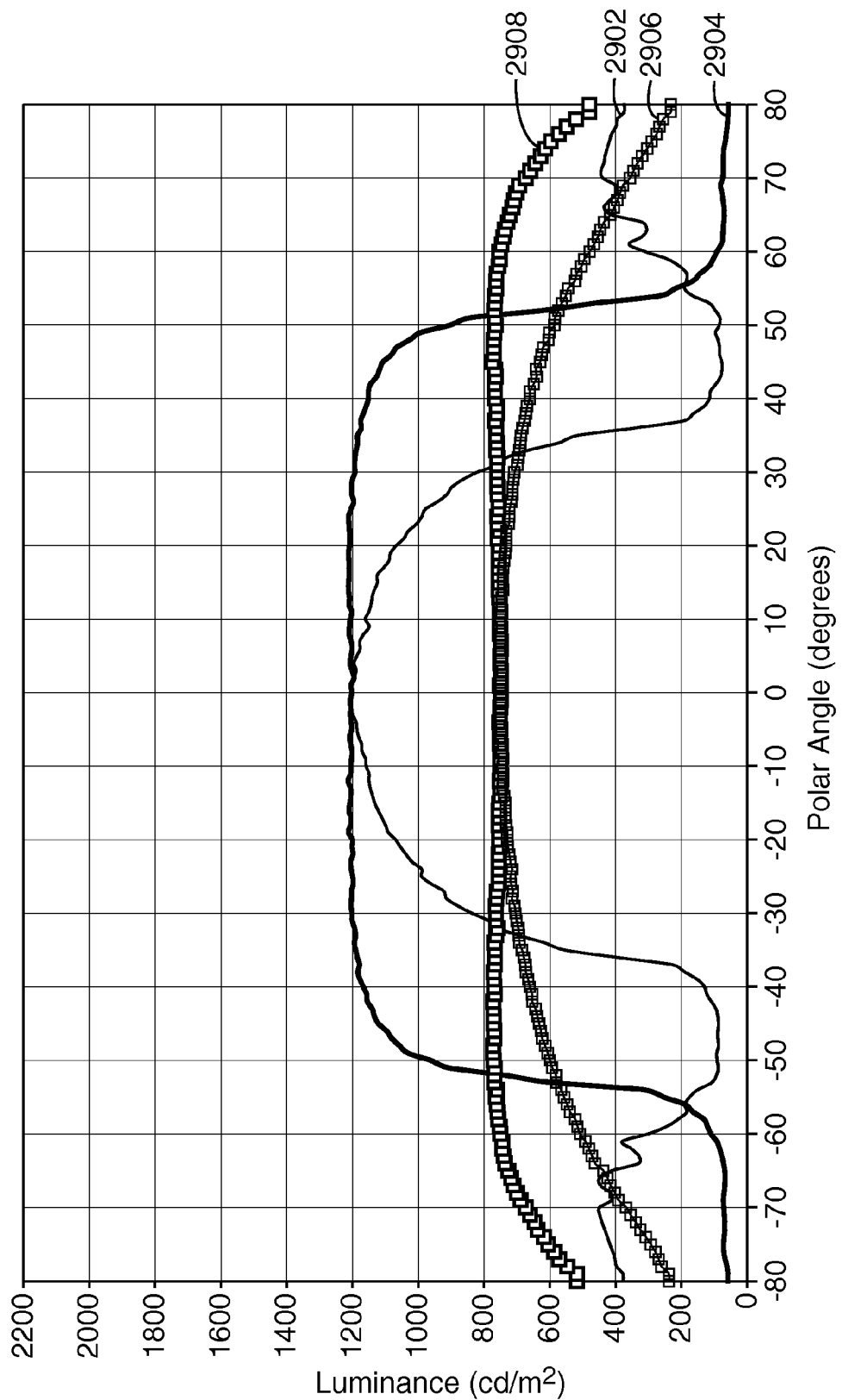
FIGS. 29-35 are graphs of luminance versus viewing angle for several embodiments of front reflectors as measured using a gain cube.

FIG. 29 is a graph of luminance versus polar angle for a single sheet of BEF. Curves 2902 and 2904 represent BEF at 0° and 90° respectively, and curves 2906 and 2908 represent the absorbing polarizer at 0° and 90° respectively without the BEF. The brightness to the normal angle cone was increased by a factor of 1.605, with brightness enhancement extending to a wide range of angles along the 90° azimuth plane (in the direction of the grooves), and to a narrower range of angles along the 0° azimuth plane (in the direction perpendicular to the grooves). In addition, the brightness at high angles was significantly diminished relative to the output of the gain cube having only the absorbing polarizer on the output surface.

Figure 30:
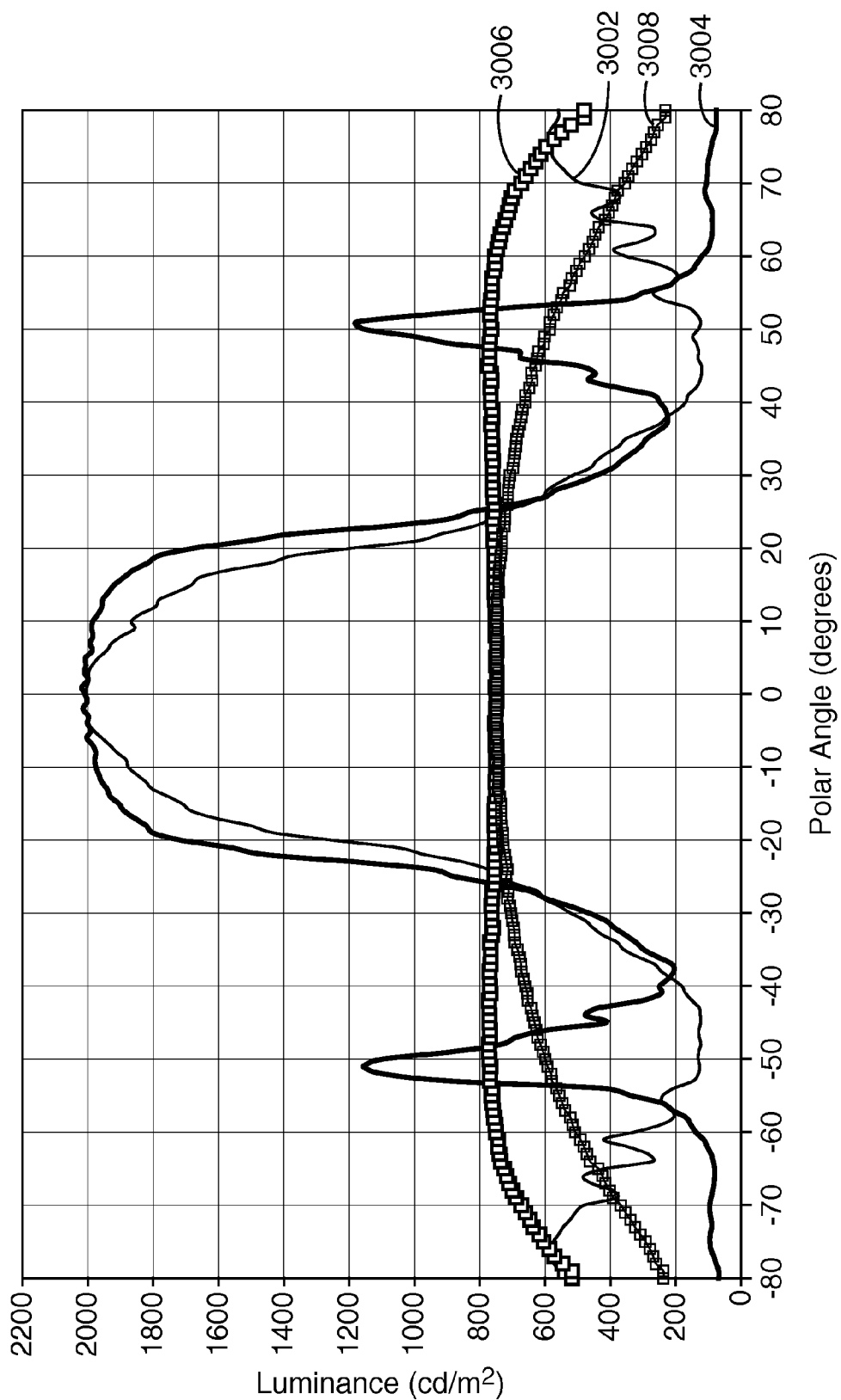

FIG. 30 is a graph of luminance versus polar angle for two sheets of BEF that are crossed. Curves 3002 and 3004 represent the crossed BEF at 0° and 90° respectively, and curves 3006 and 3008 represent the absorbing polarizer at 0° and 90° respectively without the crossed BEF. The brightness to the normal angle cone was increased by a factor of 2.6, with brightness enhancement significantly narrowing along both the 90° azimuth plane and the 0° azimuth plane.

Figure 31:
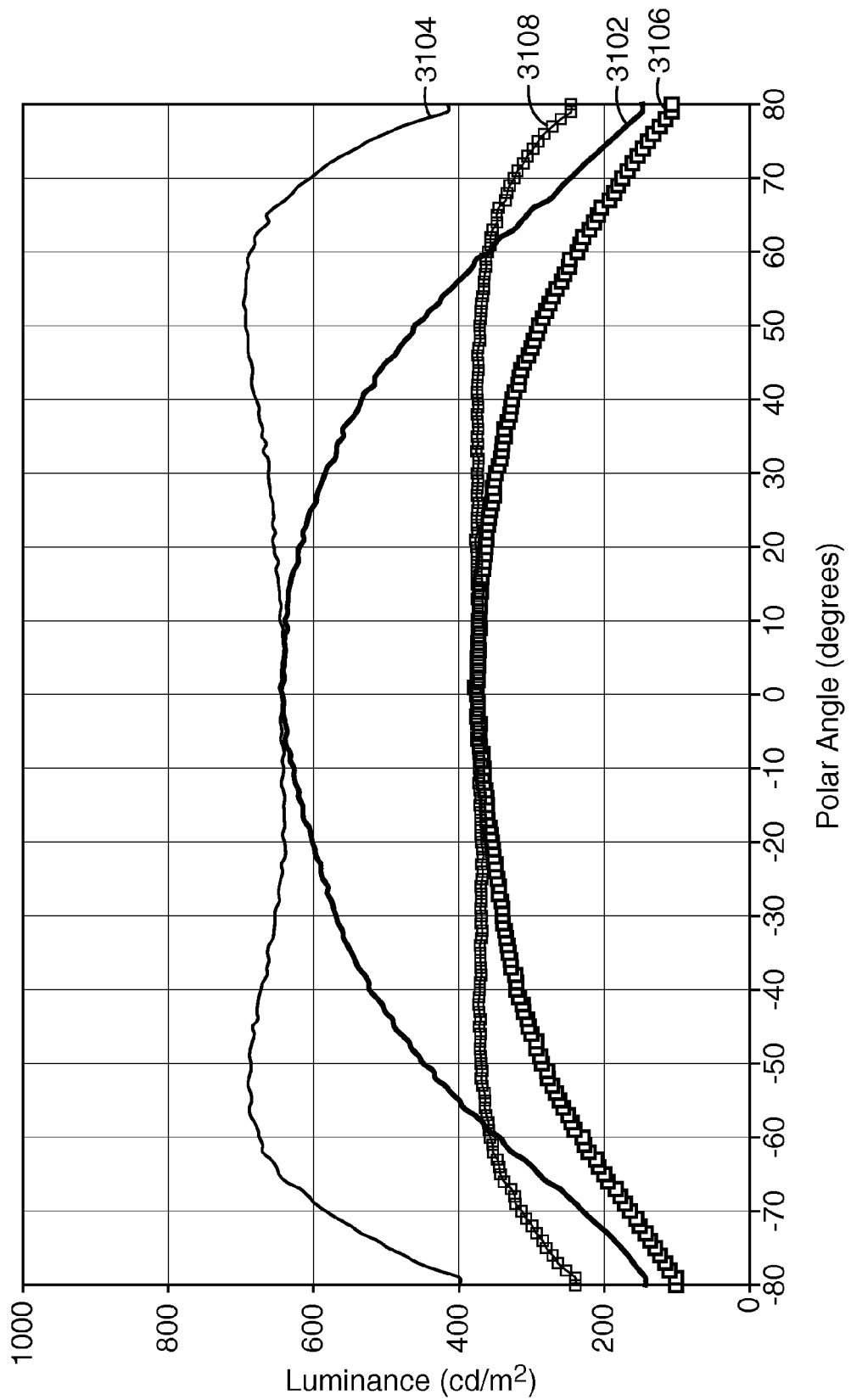

FIG. 31 is a graph of luminance versus polar angle for APF (as further described in the Examples) with its pass axis aligned with the pass axis of the overlaying absorbing polarizer. Curves 3102 and 3104 represent the APF at 0° and 90° respectively, and curves 3106 and 3108 represent the absorbing polarizer at 0° and 90° respectively without the APF. The APF front reflector increases the brightness to the normal angle cone by a factor 1.72, with brightness enhancement remaining very wide to high angles for the 90° azimuth plane, and narrowing along the 0° azimuth.

Figure 32:
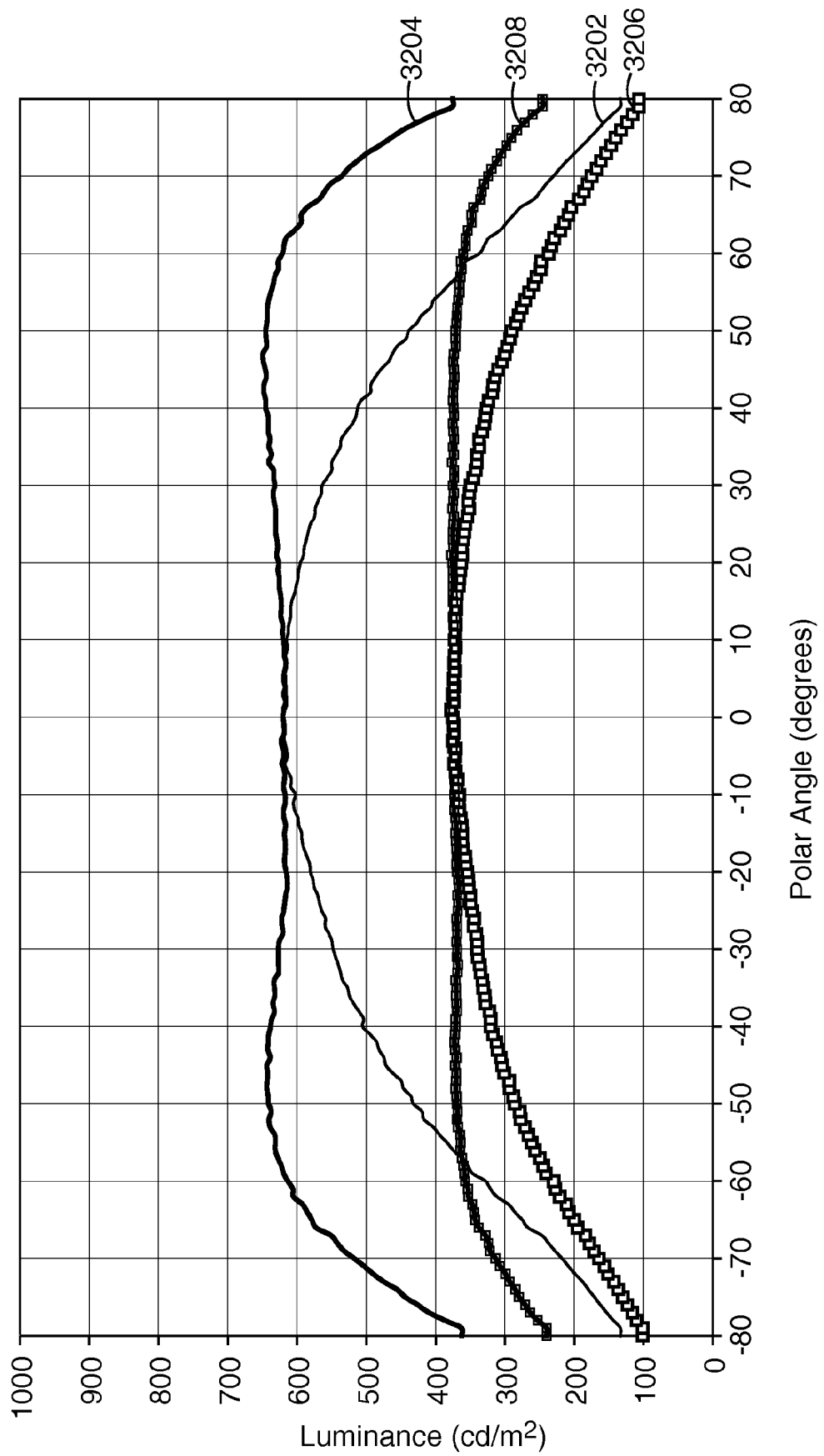

FIG. 32 is a graph of luminance versus polar angle for DBEF with its pass axis aligned with the pass axis of the overlaying absorbing polarizer. Curves 3202 and 3204 represent DBEF at 0° and 90° respectively, and curves 3206 and 3208 represent the absorbing polarizer at 0° and 90° respectively without the DBEF. The DBEF front reflector increased the brightness to the normal angle cone by a factor 1.66, and as with the APF front reflector, the brightness enhancement remained very wide to high angles for the 90° azimuth plane, and narrowing along the 0° azimuth.

Figure 33:
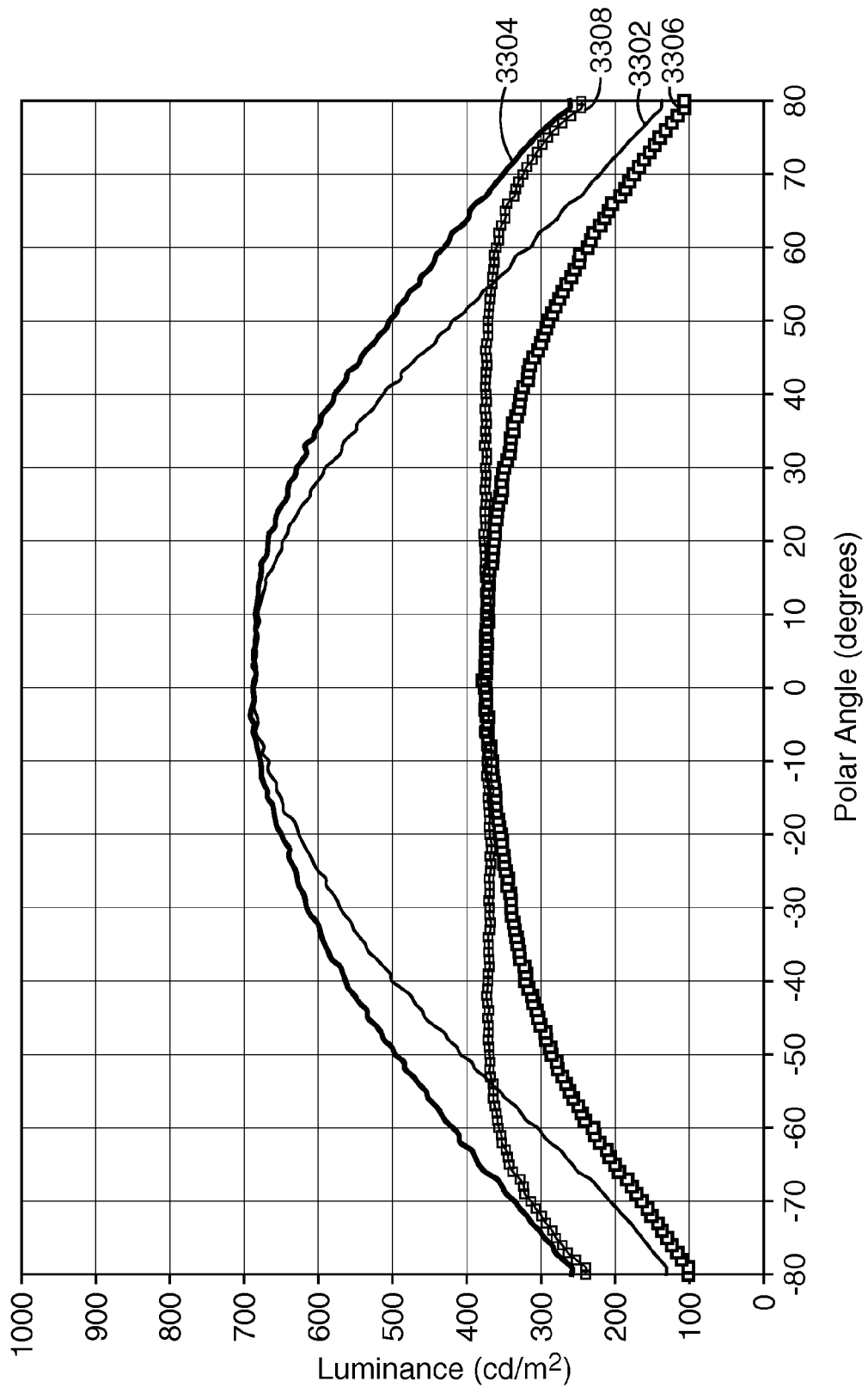

FIG. 33 is a graph of luminance versus polar angle for 3×ARF (see Examples for description) with its pass axis aligned with the pass axis of the overlaying absorbing polarizer. Curves 3302 and 3304 represent 3×ARF at 0° and 90° respectively, and curves 3306 and 3308 represent the absorbing polarizer at 0° and 90° respectively without 3×ARF. The 3×ARF front reflector increases the brightness to the normal angle cone by a factor 1.84, with brightness enhancement narrowing at higher angles for both the 90° azimuth plane and the 0° azimuth plane. This increase in the normal angle brightness is well above the standard reflective polarizer films APF and DBEF, and may be caused by the increased hemispherical reflectivity of the 3×ARF front reflector, as compared with that for APF and DBEF (see Table 1). This normal angle viewer cone brightness increase occurs even with an increase in the on-axis transmission, as the added recycling from the 3×ARF film causes the recycling and angle mixed cavity light rays to have a higher probability of transmitting through the front reflector. In addition, the reduction in high angle brightness through the output surface can be advantageous as additional prismatic or refractive components may not be necessary to keep the LCD panel contrast ratio at required levels.

TABLE 1

| Front Reflector | Hemispherical Reflectivity | On-Axis Transmission |
|---|---|---|
| APF | 51.0% | 89.3% |
| DBEF | 50.8% | 87.5% |
| 3 × ARF | 75.4% | 52.0% |
| Bead-coated ARF-86 | 92.1% | 12.8% |

Figure 34:
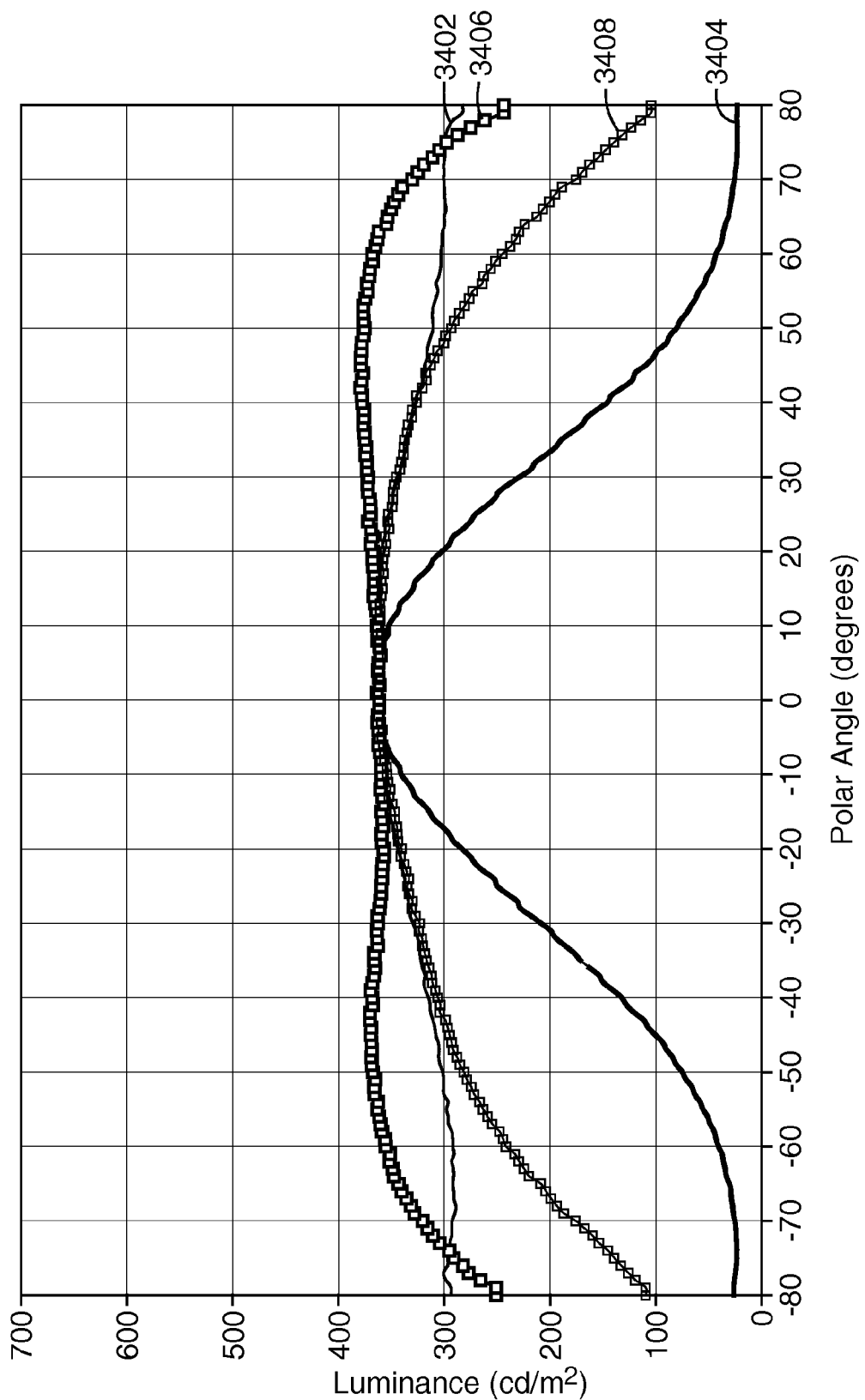

FIG. 34 is a graph of luminance versus polar angle for ARF-86 (same construction as bead-coated ARF-84. See Examples for description) with its pass axis aligned with the pass axis of the overlaying absorbing polarizer. Curves 3402 and 3404 represent ARF-86 at 0° and 90° respectively, and curves 3406 and 3408 represent the absorbing polarizer at 0° and 90° respectively without ARF-86. In FIG. 34 the brightness increase is essentially zero in the normal angle cone, because the front reflector is highly reflecting for light polarized along the pass axis of both the ARF-86 and the absorbing polarizer. Even with a hemispherical reflectivity of 92.1%, the brightness in the normal angle viewer cone is unchanged relative to the absorbing polarizer alone.

Figure 35:
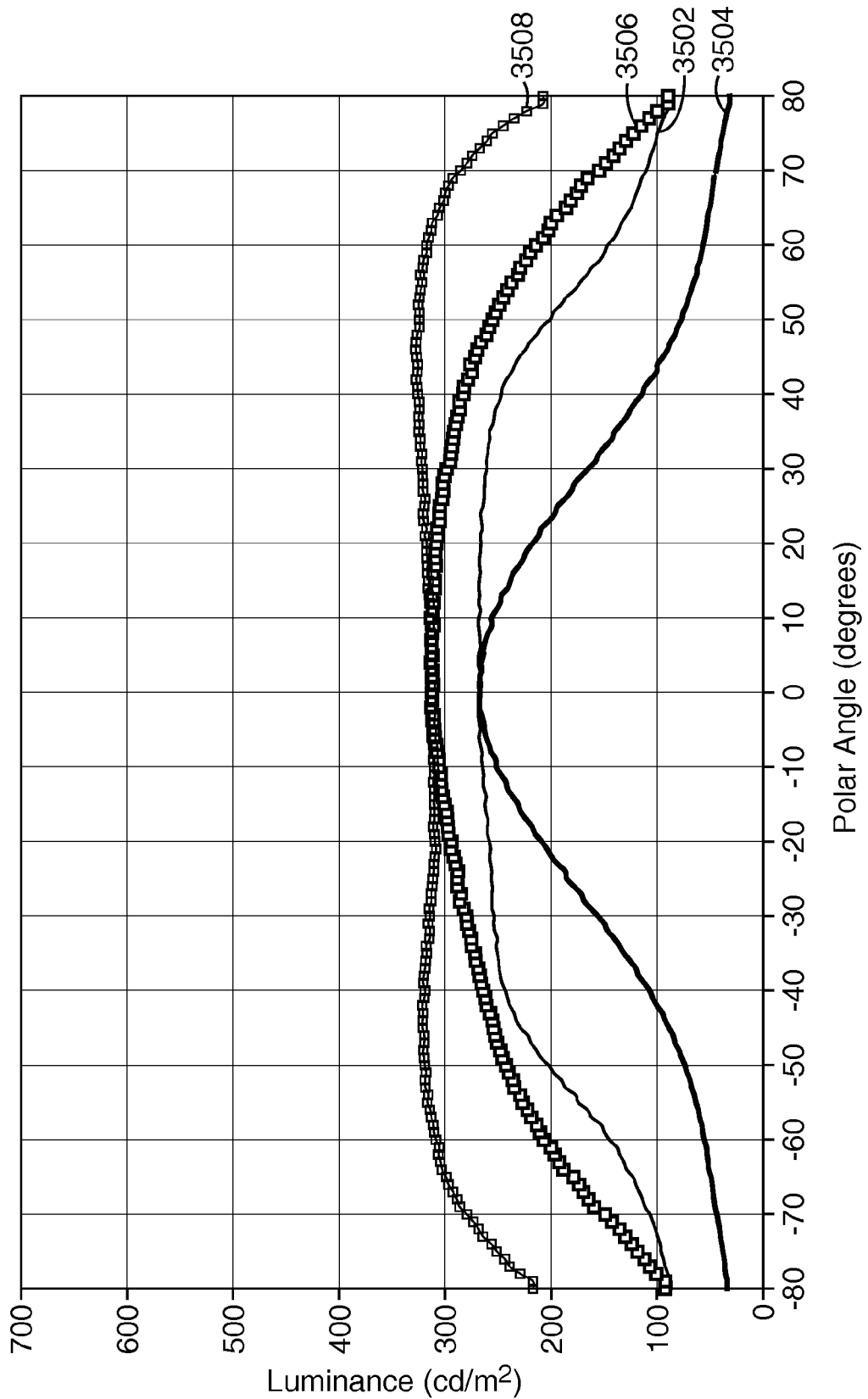

FIG. 35 is a graph of luminance versus polar angle for ARF-86 (see Examples for description) having a bead-coated top surface, with its pass axis aligned with the pass axis of the overlaying absorbing polarizer. Curves 3502 and 3504 represent ARF-86 at 0° and 90° respectively, and curves 3506 and 3508 represent the absorbing polarizer at 0° and 90° respectively without ARF-86. In this instance, the bead-coated diffusing surface is on a surface of the ARF-86 opposite the gain cube cavity. As such, it has a tendency to collimate angle mixed light that encounters the surface structure from below through refractive effects. At the same time, the bead-coated surface tends to impart a degree of polarization randomization to the polarized light rays that emerge from the ARF-86 film, and up through the bead-coated surface as they exit the cavity through the output surface. This effect causes the p-polarized brightness to decrease with increasing angle, compared to ARF-86 without the bead coating.

Figure 8A:
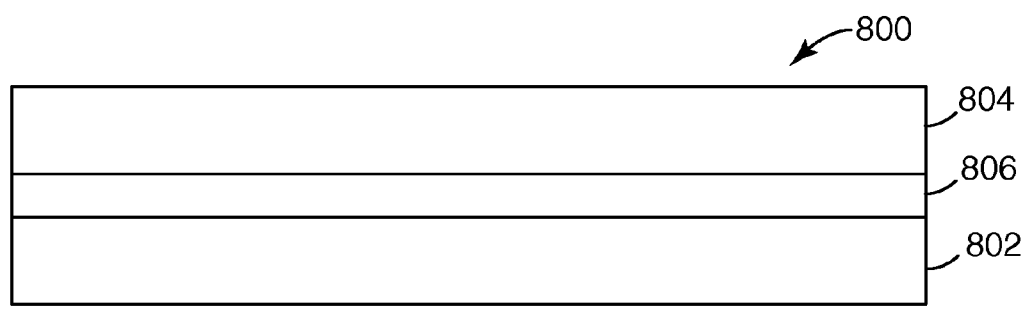
FIGS. 8A-C are schematic cross-section views of various embodiments of front reflectors.

Returning to FIG. 2, the front reflector 210 can include one or more films or layers that provide the desired reflectivity and transmission characteristics. In some embodiments, the front reflector can include two or more films. For example, FIG. 8A is a schematic cross-section view of a portion of a front reflector 800. Reflector 800 includes a first film 802 positioned proximate a second film 804. The films 802, 804 can be spaced apart or in contact with each other. Alternatively, the films 802, 804 can be attached using any suitable technique. For example, the films 802, 804 can be laminated together using optional adhesive layer 806. Any suitable adhesive can be used for layer 806, e.g., pressure sensitive adhesives (such as 3M Optically Clear Adhesives), and UV-curable adhesives (such as UVX-4856). In some embodiments, adhesive layer 806 can be replaced with an index matching fluid, and the films 802, 804 can be held in contact using any suitable techniques known in the art.

Films 802, 804 can include any suitable films described herein in regard to the front reflector. Films 802, 804 can have similar optical characteristics; alternatively, films 802, 804 can be different constructions that provide different optical characteristics. In one exemplary embodiment, film 802 can include an asymmetric reflective film as described herein having a pass axis in one plane, and film 804 can include a second asymmetric reflective film having a pass axis in a second plane that is non-parallel to the pass axis of the first film 802. This non-parallel relationship can form any suitable angle between the two pass axis planes. In some embodiments, the pass axis planes can be nearly orthogonal. Such a relationship would provide a high degree of reflectivity in the pass axis for the front reflector 800.

Further, for example, film 802 may include an asymmetric reflective film, and film 804 may include a prismatic brightness enhancing film such as BEF. In some embodiments, the BEF may be oriented in relation to the asymmetric reflective film such that the BEF collimates transmitted light in a plane that is orthogonal to the collimating plane of the asymmetric film. Alternatively, in other embodiments, the BEF may be oriented such that the BEF collimates transmitted light in the collimating plane of the asymmetric reflective film.

In other embodiments, film 802 can include any suitable film described herein, e.g., an asymmetric reflective film, and film 804 can be any suitable substrate layer. The substrate can include any suitable material or materials, e.g., polycarbonate; acrylic; PET; fiber reinforced optical film as described, e.g., in U.S. Patent Publication No. 2006/0257678 (Benson et al.), entitled FIBER REINFORCED OPTICAL FILMS; U.S. patent application Ser. No. 11/323,726 (Wright et al.), entitled REINFORCED REFLECTIVE POLARIZER FILMS; and U.S. patent application Ser. No. 11/322,324 (Ouderkirk et al.), entitled REINFORCED REFLECTIVE POLARIZER FILMS.

Although the front reflector 800 is depicted as including two films 802, 804, the front reflector 800 can include three or more films. For example, a three layer front reflector can be made using three layers of reflective polarizer (such as DBEF or APF). If the three layers are arranged such that the polarization axis of the second layer is at 45° relative to the polarization axis of the first layer and the polarization axis of the third layer is at 90° relative to the polarization axis of the first layer, the resulting front reflector will reflect approximately 75% of the normal incidence light. Other angles of rotation between the layers could be used to achieve different levels of reflection.

A birefringent (polarization rotating) layer or a scattering layer between two reflective polarizers with nearly orthogonal pass axes can also create reflective films that have a controlled degree of reflectivity to be used as the front reflector. The pass axes of the two reflective polarizers may be aligned, biased, or orthogonal. The layer between the reflective polarizers may be a birefringent plate, prismatic film, diffuser, or other optical films having the property of rotating or scrambling the polarization passing through the first reflective polarizer. The layer between the reflective polarizers may also be a combination of two or more films, such as a support plate and a diffuser. The layers may be unattached to each other, or may be attached by lamination or other attachment processes.

Figure 8B:
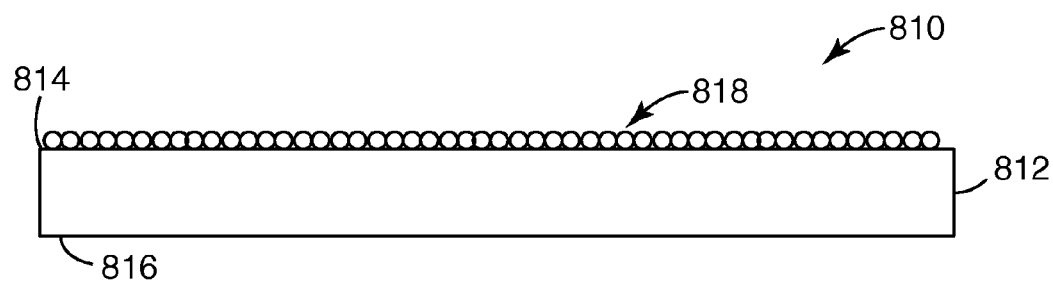

The front reflectors of the present disclosure can also include optical elements positioned in or on one or more surfaces of the reflector. For example, FIG. 8B is a schematic cross-section view of a portion of another embodiment of front reflector 810. The reflector 810 includes a film 812 having a first major surface 814 and a second major surface 816. The film 812 can include any suitable film(s) or layer(s) described herein in regard to a front reflector. A plurality of optical elements 818 are positioned on or in the first major surface 814. Although depicted as positioned only on first major surface 814, optical elements can be positioned on the second major surface 816 or on both first and second major surfaces 814, 816. Any suitable optical elements can be positioned on or in the film 812, e.g., microspheres, prisms, cube-corners, lenses, etc. The optical elements can be refractive elements, diffractive elements, diffusive elements, etc. In this embodiment, the optical elements 818 can collimate light that is transmitted by film 812. In other embodiments, the optical elements 818 can diffuse light either incident on the film 812 or exiting the film 812, depending upon the positioning of the optical elements 812.

The optical elements 818 can be positioned on a major surface of the film 812 or at least partially embedded in the major surface of the film 812. Further, the film 810 can be manufactured using any suitable technique, e.g., those techniques described herein for manufacturing bead-coated ESR.

Figure 8C:
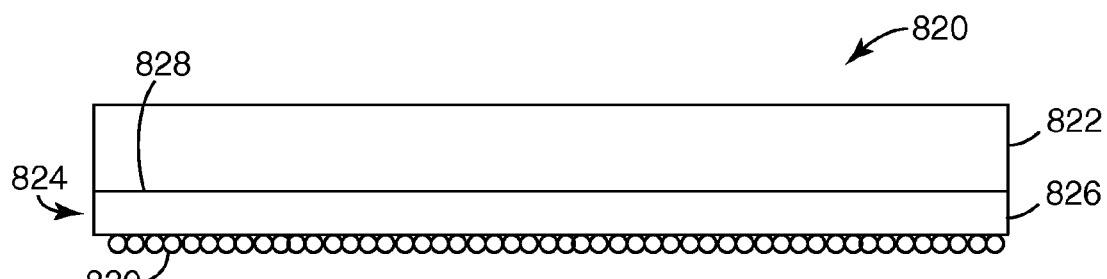

The optical elements 818 can also be positioned on a cover layer or substrate that is positioned proximate the film 810. For example, FIG. 8C is a schematic cross-section view of a portion of another embodiment of a front reflector 820. The reflector 820 includes a film 822 and a gain diffuser 824 positioned proximate the film 822. The film 820 can include any film(s) and/or layer(s) described herein regarding front reflectors. The gain diffuser 824 includes a substrate 826 having a first major surface 828 and a second major surface 830, and a plurality of optical elements 832 positioned on or in the second major surface 830 of the substrate 826. Any suitable optical elements 832 can be used, e.g., optical elements 818 of FIG. 8B. The substrate 826 can include any suitable optically transmissive substrate.

For the embodiment illustrated in FIG. 8C, the first major surface 828 of the gain diffuser 824 is positioned proximate the film 822. The diffuser 824 can be positioned proximate film 822 such that it is spaced apart from the film 822, in contact with the film 822, or attached to the film 822. Any suitable technique can be used to attach the diffuser 824 to the film 822, e.g., the use of optical adhesives. Any suitable gain diffuser can be used for diffuser 824. In some embodiments, the optical elements 832 can be positioned on the first major surface 828 of the substrate 826 such that the elements 832 are between the substrate 826 and the polarizing film 822.

Returning to FIG. 2, the front reflector 210 can also be attached to a supporting layer. The support layer can include any suitable material or materials, e.g., polycarbonate, acrylic, PET, etc. In some embodiments, the front reflector 210 can be supported by a fiber reinforced optical film as described, e.g., in U.S. Patent Publication No. 2006/0257678 (Benson et al.), entitled FIBER REINFORCED OPTICAL FILMS; U.S. patent application Ser. No. 11/323,726 (Wright et al.), entitled REINFORCED REFLECTIVE POLARIZER FILMS; and U.S. patent application Ser. No. 11/322,324 (Ouderkirk et al.), entitled REINFORCED REFLECTIVE POLARIZER FILMS. Further, the front reflector 210 can be attached to the support layer using any suitable technique. In some embodiments, the front reflector 210 can be adhered to the support layer using an optical adhesive. The front reflector 210 and support layer can be attached to the backlight using any suitable technique, e.g., those techniques described in U.S. Patent Application No. 60/947,776 (Thunhorst et al.), entitled OPTICALLY TRANSMISSIVE COMPOSITE FILM FRAME.

In some embodiments, the front reflector 210 can be attached to the LC panel. For example, the front reflector can be attached to lower absorbing polarizer 158 of FIG. 1, which is in turn attached to panel plate 154.

As stated herein, the front reflector 210 can include any suitable film(s) and/or layer(s) that provide a partially reflective and partially transmissive front reflector. In some embodiments, the front reflector 210 can include one or more fiber polarizing films as described, e.g., in U.S. Patent Publication No. 2006/0193577 (Ouderkirk et al.), entitled REFLECTIVE POLARIZERS CONTAINING POLYMER FIBERS; U.S. patent application Ser. No. 11/468,746 (Ouderkirk et al.), entitled MULTILAYER POLARIZING FIBERS AND POLARIZERS USING SAME; and U.S. patent application Ser. No. 11/468,740 (Bluem et al.), entitled POLYMER FIBER POLARIZERS. Other exemplary films that can be used for the front reflector 210 include cholesteric polarizing films, birefringent pile-of-plates films, and birefringent polymer blends (e.g., DRPF, available from 3M Company).

Figure 9A:
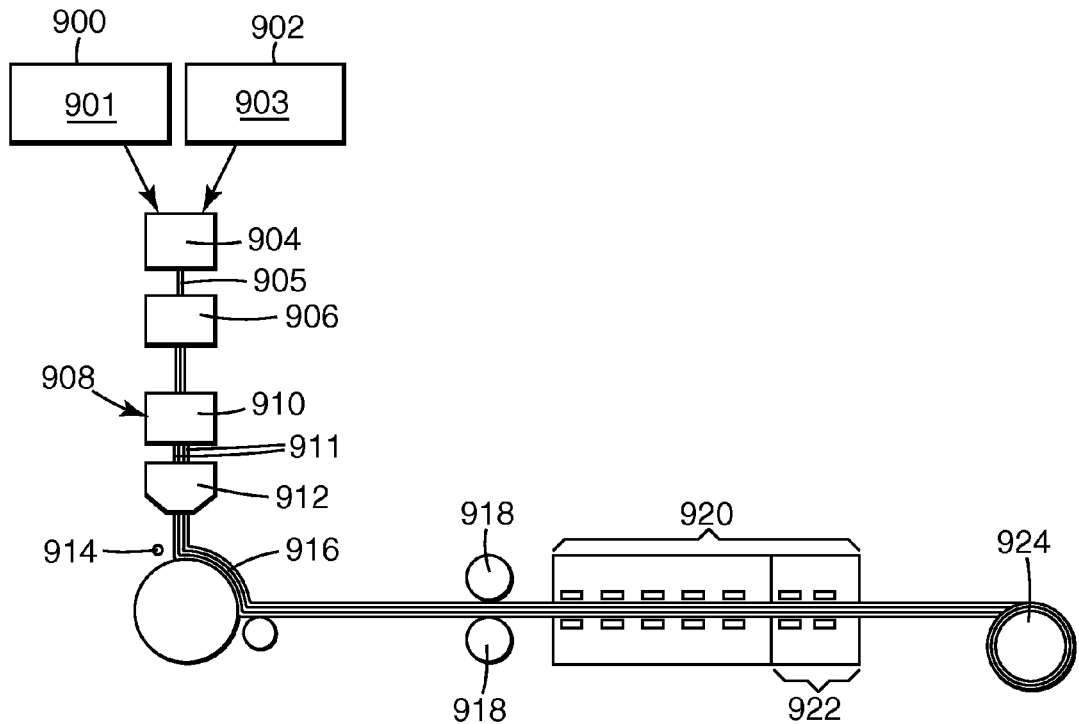
FIG. 9A is a schematic view of a method useful for the coextrusion of asymmetric reflective films.
Figure 9B:
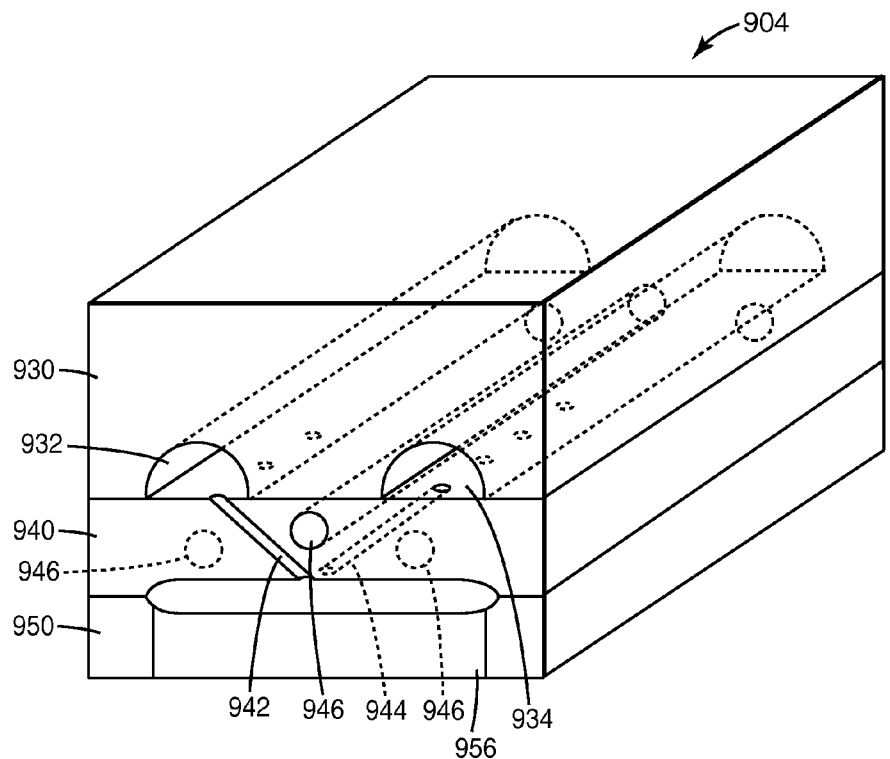
FIG. 9B is a schematic perspective view of one embodiment of a feedblock that can be used in the method illustrated in FIG. 9A.

The asymmetric reflective films of the present disclosure can be manufactured using any suitable technique. See, e.g., U.S. Pat. No. 6,783,349 (Neavin et al.), entitled APPARATUS FOR MAKING MULTILAYER OPTICAL FILMS. For example, FIGS. 9A-B illustrate one embodiment of a method for making asymmetric reflective films of the present disclosure. Materials 900 and 902, selected to have suitably different optical properties, are heated above their melting and/or glass transition temperatures and fed into a multilayer feedblock 904. Typically, melting and initial feeding is accomplished using an extruder for each material. For example, material 900 can be fed into an extruder 901 while material 902 can be fed into an extruder 903. Exiting from the feedblock 904 is a multilayer flow stream 905. A layer multiplier 906 splits the multilayer flow stream, and then redirects and "stacks" one stream atop the second to multiply the number of layers extruded. An asymmetric multiplier, when used with extrusion equipment that introduces layer thickness deviations throughout the stack, may broaden the distribution of layer thicknesses so as to enable the multilayer film to have layer pairs corresponding to a desired portion of the visible spectrum of light, and provide a desired layer thickness gradient. If desired, skin layers 911 may be introduced into the film by feeding resin 908 (for skin layers) to a skin layer feedblock 910.

The multilayer feedblock feeds a film extrusion die 912. Suitable feedblocks are described, for example, in U.S. Pat. No. 3,773,882 (Schrenk) and U.S. Pat. No. 3,884,606 (Schrenk). As an example, the extrusion temperature may be approximately 295 C.°, and the feed rate approximately 10-150 kg/hour for each material. In some embodiments, it may be preferred to have the skin layers 911 flowing on the upper and lower surfaces of the film as it goes through the feedblock and die. These layers serve to dissipate the large stress gradient found near the wall, leading to smoother extrusion of the optical layers. Typical extrusion rates for each skin layer would be 2-50 kg/hr (1-40% of the total throughput). The skin material can be the same material as one of the optical layers or be a different material. An extrudate leaving the die is typically in a melt form.

The extrudate is cooled on a casting wheel 916, which rotates past pinning wire 914. The pinning wire pins the extrudate to the casting wheel. To achieve a clear film over a broad range of angles, one can make the film thicker by running the casting wheel at a slow speed, which moves the reflecting band towards longer wavelengths. The film is oriented by stretching at ratios determined by the desired optical and mechanical properties. Longitudinal stretching can be done by pull rolls 918. Transverse stretching can be done in a tenter oven 920. If desired, the film can be bi-axially oriented simultaneously. Stretch ratios of approximately 3-4 to 1 may be preferred, although ratios as small as 1 to 1 and as large as 6 to 1 may also be appropriate for a given film. Stretch temperatures will depend on the type of birefringent polymer used, but 2° to 33° C. (5° to 60° F.) above its glass transition temperature would generally be an appropriate range. The film is typically heat set in the last two zones 922 of the tenter oven to impart the maximum crystallinity in the film and reduce its shrinkage. Employing a heat set temperature as high as possible without causing film breakage in the tenter reduces the shrinkage during a heated embossing step. A reduction in the width of the tenter rails by about 1-4% also serves to reduce film shrinkage. If the film is not heat set, heat shrink properties are maximized, which may be desirable in some security packaging applications. The film can be collected on windup roll 924.

In some applications, it may be desirable to use more than two different polymers in the optical layers of the multilayer film. In such a case, additional resin streams can be fed using similar means to resin streams 900 and 902. A feedblock appropriate for distributing more than two layer types analogous to the feedblock 904 could be used.

FIG. 9B shows a schematic perspective view of one embodiment of feedblock 904, which is enclosed in a housing 928. Within the housing 928 resides a gradient plate 930. Residing in gradient plate 930 are at least two flow channels, a first flow channel 932 and a second flow channel 934. The flow channels are bounded by a combination of the gradient plate 930 and a feeder tube plate 940.

In the gradient plate 930, each flow channel is machined so that its cross-section has a central axis of symmetry, such as, e.g., a circle, square, or equilateral triangle. For ease of machining purposes, the square cross-section flow channel is preferably used. Along each flow channel, the cross-sectional area can remain constant or can change. The change may be an increase or decrease in area, and a decreasing cross-section is typically referred to as a "taper." A change in cross-sectional area of the flow channels can be designed to provide an appropriate pressure gradient, which affects the layer thickness distribution of a multilayer optical film. Thus, the gradient plate can be changed for different types of multilayer film constructions.

When the cross-sectional area of the flow channels is made to remain constant, a plot of layer thickness vs. layer number is non-linear and decreasing. For a given polymer flow, there exists at least one cross-sectional tapering profile which will result in a linear, decreasing dependency of layer thickness upon layer number, which is sometimes preferred. The taper profile can be found by one reasonably skilled in the art using reliable rheological data for the polymer in question and polymer flow simulation software known in the art, and should be calculated on a case by case basis.

Referring again to FIG. 9B, the feedblock 904 further contains a feeder tube plate 940 that has a first set of conduits 942 and a second set of conduits 944, each set in fluid communication with flow channels 932 and 934 respectively. As used herein, "conduits" are also referred to as "side channel tubes." Residing proximate conduits 942 and 944 are axial rod heaters 946, used to provide heat to the resin flowing in the conduits. If desired, temperature can be varied in zones along the length of the axial rod heaters. Each conduit feeds its own respective slot die 956, which has an expansion section and a slot section. The expansion section typically resides in the feeder tube plate 940. If desired, the slot section can reside in a slot plate 950. As used herein, the term "slot die" is synonymous with "layer slot." The first set of conduits 942 is interleaved with the second set of conduits 944 to form alternating layers.

In use, for example, resin A and resin B would be delivered directly to the flow channels 932 and 934. As the melt stream A and melt stream B travel down the flow channels in the gradient plate 930, each melt stream is bled off by the conduits. Because the conduits 942 and 944 are interleaved, they begin the formation of alternating layers, such as, for example, ABABAB. Each conduit has its own slot die to begin the formation of an actual layer. The melt stream exiting the slot die contains a plurality of alternating layers. The melt stream is fed into a compression section (not shown) where the layers are compressed and also uniformly spread out transversely. Special thick layers known as protective boundary layers (PBLs) may be fed nearest to the feedblock walls from any of the melt streams used for the optical multilayer stack. The PBLs can also be fed by a separate feed stream after the feedblock. The PBLs function to protect the thinner optical layers from the effects of wall stress and possible resulting flow instabilities.

In some embodiments, the asymmetric reflective films of the present disclosure can be manufactured without the use of a multiplier (e.g., multiplier 906). Although multipliers greatly simplify the generation of a large number of optical layers, they may impart distortions to each resultant packet of layers that are not identical for each packet. For this reason, any adjustment in the layer thickness profile of the layers generated in the feedblock is not the same for each packet, i.e., all packets cannot be simultaneously optimized to produce a uniform smooth spectrum free of spectral disruptions. Thus, an optimum profile and low transmission color reflector can be difficult to make using multi-packet films manufactured using multipliers. If the number of layers in a single packet generated directly in a feedblock do not provide sufficient reflectivity, then two or more such films can be attached to increase the reflectivity.

When the multiplier is removed from the method of FIG. 9A, the axial rod heaters 946 can be used to control the layer thickness values of coextruded polymer layers as is further described, e.g., in U.S. Pat. No. 6,783,349. Such axial rod heaters can be utilized both for maintaining constant temperature in the feedblock and for creating a temperature gradient of up to about 40° C. In some embodiments, the axial rod heaters are placed in a bore through the feedblock and oriented in a direction normal to the layer plane, preferably very near an imaginary line through the points where each side channel tube feeds a slot die. More preferably, in the case of coextrusion of a first polymer and a second polymer, the bores for the axial rod heaters will be located both near an imaginary line through the points where each side channel tube feeds a slot die, and also equidistant from the side channel tubes carrying the first polymer and the side channel tubes carrying the second polymer. Further, the axial rod heaters are preferably of a type that can provide a temperature gradient or a multiplicity of discrete temperatures along its length, either by variation in electrical resistance along its length, or by multi-zone control, or by other means known in the art. Such axial rod heaters can control layer thickness and gradient layer thickness distribution, which is especially important in controlling the positions and profiles of reflection bands as described, e.g., in U.S. Pat. No. 6,157,490 (Wheatley et al.), entitled OPTICAL FILM WITH SHARPENED BAND-EDGE; and U.S. Pat. No. 6,531,230 (Weber et al.), entitled COLOR SHIFTING FILM.

The feedblock 904 is configured such that all layers in the film stack are directly controlled by an axial rod heater 946. Layer thickness profile can be monitored during the process by using any suitable thickness measuring technique, e.g., atomic force microscopy, transmission electron microscopy, or scanning electron microscopy. The layer thickness profile can also be modeled optically using any suitable technique, and then the axial rod heaters can be adjusted based on the difference between the measured layer profile and the desired layer profile.

Although not as accurate in general as an AFM, the layer profile can also be quickly estimated by integrating the optical spectrum (integrating the −Log(1−R) vs. wavelength spectrum). This follows from the general principle that the spectral shape of a reflector can be obtained from the derivative of the layer thickness profile, provided the layer thickness profile is monotonically increasing or decreasing with respect to layer number.

The basic process for layer thickness profile control involves adjustment of axial rod zone power settings based on the difference of the target layer thickness profile and the measured layer profile. The axial rod power increase needed to adjust the layer thickness values in a given feedblock zone can first be calibrated in terms of watts of heat input per nanometer of resulting thickness change of the layers generated in that heater zone. Fine control of the spectrum is possible using 24 axial rod zones for 275 layers. Once calibrated, the necessary power adjustments can be calculated once given a target profile and a measured profile. The procedure is repeated until the two profiles converge.

Figure 10:
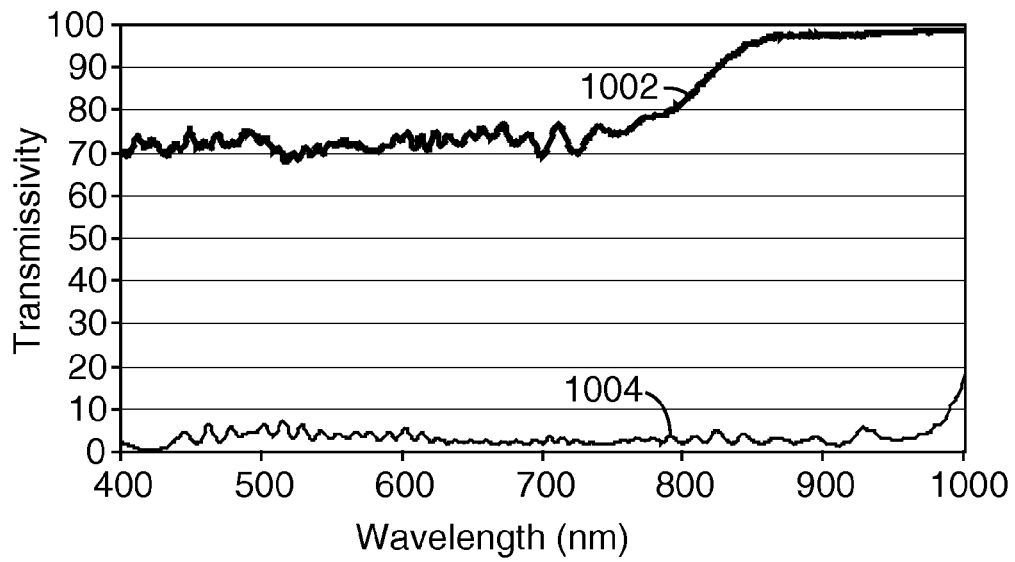
FIG. 10 is a graph of transmissivity versus wavelength of an asymmetric reflective film formed using the method illustrated in FIG. 9A.

For example, a film of 275 layers was made according to the above technique, using a coPEN with indices of nx1=1.82, ny1=1.61, nz=1.50, and a mixture of PCTG with polycarbonate with index n2=1.57 for all directions. The measured transmission spectrum for p-polarized light at 60° angle of incidence on the pass axis is shown in FIG. 10 as curve 1002. Also shown is the transmission of the block axis as curve 1004. Note that both the block and the pass axis spectra have relatively constant transmission over a very broad band.

Returning to FIG. 2, the backlight 200 also includes back reflector 220 that, along with the front reflector 210, form the hollow light recycling cavity 202. The back reflector 220 is preferably highly reflective. For example, the back reflector 220 can have an on-axis average reflectivity for visible light emitted by the light sources of at least 90%, 95%, 98%, 99%, or more for visible light of any polarization. Such reflectivity values also can reduce the amount of loss in a highly recycling cavity. Such reflectivity values encompass all visible light reflected into a hemisphere, i.e., such values include both specular and diffuse reflections.

The back reflector 220 can be a predominantly specular, diffuse, or combination specular/diffuse reflector, whether spatially uniform or patterned. In some embodiments, the back reflector 220 can be a semi-specular reflector as is further described herein. See also PCT Publication No.

WO2008/144644; and U.S. patent application Ser. No. 11/467,326 (Ma et al.), entitled BACKLIGHT SUITABLE FOR DISPLAY DEVICES. In some cases, the back reflector 220 can be made from a stiff metal substrate with a high reflectivity coating, or a high reflectivity film laminated to a supporting substrate. Suitable high reflectivity materials include Vikuiti™ Enhanced Specular Reflector (ESR) multi-layer polymeric film available from 3M Company; a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum-Veredlung GmbH & Co.; MCPET high reflectivity foamed sheeting from Furukawa Electric Co., Ltd.; White Refstar™ films and MT films available from Mitsui Chemicals, Inc.; and 2×TIPS (see Examples for description).

The back reflector 220 can be substantially flat and smooth, or it may have a structured surface associated with it to enhance light scattering or mixing. Such a structured surface can be imparted (a) on the surface of the back reflector 220, or (b) on a transparent coating applied to the surface. In the former case, a highly reflecting film may be laminated to a substrate in which a structured surface was previously formed, or a highly reflecting film may be laminated to a flat substrate (such as a thin metal sheet, as with Vikuiti™ Durable Enhanced Specular Reflector-Metal (DESR-M) reflector available from 3M Company) followed by forming the structured surface, such as with a stamping operation. In the latter case, a transparent film having a structured surface can be laminated to a flat reflective surface, or a transparent film can be applied to the reflector and then afterwards a structured surface can be imparted to the top of the transparent film.

For those embodiments that include a direct-lit configuration (e.g., backlight 1600 of FIG. 16), the back reflector can be a continuous unitary (and unbroken) layer on which the light source(s) are mounted, or it can be constructed discontinuously in separate pieces, or discontinuously insofar as it includes isolated apertures, through which light sources can protrude, in an otherwise continuous layer. For example, strips of reflective material can be applied to a substrate on which rows of light sources are mounted, each strip having a width sufficient to extend from one row of light sources to another and having a length dimension sufficient to span between opposed borders of the backlight's output area.

The backlight 200 can also include one or more side reflectors 250 located along at least a portion of the outer boundary of the backlight 200 that are preferably lined or otherwise provided with high reflectivity vertical walls to reduce light loss and improve recycling efficiency. The same reflective material used for the back reflector 220 can be used to form these reflectors, or a different reflective material can be used. In some embodiments, the side reflectors 250 and back reflector 220 can be formed from a single sheet of material.

The side reflectors 250 can be vertical, or alternatively, one or more reflectors can be tilted. Also, the reflective material for the side reflectors 250 can be the same or different as the material used for the back reflector 220. Specular, semispecular, diffuse materials can be used on for the side reflectors 250. Refractive structures can be used on or adjacent to side reflectors 250 to achieve a desired reflection profile. Wall material and inclination can be chosen to adjust the brightness profile.

The light sources 230 are shown schematically. In most cases, these sources 230 are compact light emitting diodes (LEDs). In this regard, "LED" refers to a diode that emits light, whether visible, ultraviolet, or infrared. It includes incoherent encased or encapsulated semiconductor devices marketed as "LEDs", whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. More discussion of packaged LEDs, including forward-emitting and side-emitting LEDs, is provided herein.

Multicolored light sources, whether or not used to create white light, can take many forms in a backlight, with different effects on color and brightness uniformity of the backlight output area. In one approach, multiple LED dies (e.g., a red, a green, and a blue light emitting die) are all mounted in close proximity to each other on a lead frame or other substrate, and then encased together in a single encapsulant material to form a single package, which may also include a single lens component. Such a source can be controlled to emit any one of the individual colors, or all colors simultaneously. In another approach, individually packaged LEDs, with only one LED die and one emitted color per package, can be clustered together for a given recycling cavity, the cluster containing a combination of packaged LEDs emitting different colors such as blue/yellow or red/green/blue. In still another approach, such individually packaged multicolored LEDs can be positioned in one or more lines, arrays, or other patterns.

LED efficiency is temperature dependent and generally decreases with increasing temperature. This efficiency decrease may be different for different types of LEDs. For example, red LEDs exhibit a significantly greater efficiency decrease than blue or green. Various embodiments of the present disclosure can be used to mitigate this effect if the more thermally sensitive LEDs are thermally isolated so that they have a lower watt density on the heat sink, and/or are not subject to heat transfer from the other LEDs. In a conventional backlight, locating a cluster of one color of LEDs would result in poor color uniformity. In the present disclosure, the color of, for example a cluster of reds, can mix well with green and blue LEDs to form white. A light sensor and feedback system can be used to detect and control the brightness and/or color of light from the LEDs. For example, a sensor can be located near individual or clusters of LEDs to monitor output and provide feedback to control, maintain, or adjust a white point or color temperature. It may be beneficial to locate one or more sensors along the edge or within the hollow cavity to sample the mixed light. In some instances it may be beneficial to provide a sensor to detect ambient light outside the display in the viewing environment, for example, the room in which the display is located. In such a case, control logic can be used to appropriately adjust the display light source output based on ambient viewing conditions.

Many types of sensors can be used such as light-to-frequency or light-to-voltage sensors available from Texas Advanced Optoelectronic Solutions, Plano, Tex. Additionally, thermal sensors can be used to monitor and control the output of LEDs. All of these techniques can be used to adjust base on operating conditions and based on compensation of component aging over time. Sensors can be used for dynamic contrast or field sequential systems to supply feedback signals to the control systems.

If desired, other visible light emitters such as linear cold cathode fluorescent lamps (CCFLs) or hot cathode fluorescent lamps (HCFLs) can be used instead of or in addition to discrete LED sources as illumination sources for the disclosed backlights. In addition, hybrid systems such as, for example, (CCFL/LED), including cool white and warm white, CCFL/HCFL, such as those that emit different spectra, may be used. The combinations of light emitters may vary widely, and include LEDs and CCFLs, and pluralities such as, for example, multiple CCFLs, multiple CCFLs of different colors, and LEDs and CCFLs.

For example, in some applications it may be desirable to replace the row of discrete light sources with a different light source such as a long cylindrical CCFL, or with a linear surface emitting light guide emitting light along its length and coupled to a remote active component (such as an LED die or halogen bulb), and to do likewise with other rows of sources. Examples of such linear surface emitting light guides are disclosed in U.S. Pat. No. 5,845,038 (Lundin et al.) and U.S. Pat. No. 6,367,941 (Lea et al.). Fiber-coupled laser diode and other semiconductor emitters are also known, and in those cases the output end of the fiber optic waveguide can be considered to be a light source with respect to its placement in the disclosed recycling cavities or otherwise behind the output area of the backlight. The same is also true of other passive optical components having small emitting areas such as lenses, deflectors, narrow light guides, and the like that give off light received from an active component such as a bulb or LED die. One example of such a passive component is a molded encapsulant or lens of a side-emitting packaged LED.

Any suitable side-emitting LED can be used for one or more light sources, e.g., Luxeon™ LEDs (available from Lumileds, San Jose, Calif.), or the LEDs described, e.g., in U.S. patent application Ser. No. 11/381,324 (Leatherdale et al.), entitled LED PACKAGE WITH CONVERGING OPTICAL ELEMENT; and U.S. patent application Ser. No. 11/381,293 (Lu et al.), entitled LED PACKAGE WITH WEDGE-SHAPED OPTICAL ELEMENT. Other emission patterns may be desired for various embodiments described herein. See, e.g., U.S. Patent Publication No. 2007/0257270 (Lu et al.), entitled LED PACKAGE WITH WEDGE-SHAPED OPTICAL ELEMENT.

In some embodiments where the backlights are used in combination with a display panel (e.g., panel 150 of FIG. 1), the backlight 200 continuously emits white light, and the LC panel is combined with a color filter matrix to form groups of multicolored pixels (such as yellow/blue (YB) pixels, red/green/blue (RGB) pixels, red/green/blue/white (RGBW) pixels, red/yellow/green/blue (RYGB) pixels, red/yellow/green/cyan/blue (RYGCB) pixels, or the like) so that the displayed image is polychromatic. Alternatively, polychromatic images can be displayed using color sequential techniques, where, instead of continuously back-illuminating the LC panel with white light and modulating groups of multicolored pixels in the LC panel to produce color, separate differently colored light sources within the backlight 200 (selected, for example, from red, orange, amber, yellow, green, cyan, blue (including royal blue), and white in combinations such as those mentioned above) are modulated such that the backlight flashes a spatially uniform colored light output (such as, for example, red, then green, then blue) in rapid repeating succession. This color-modulated backlight is then combined with a display module that has only one pixel array (without any color filter matrix), the pixel array being modulated synchronously with the backlight to produce the whole gamut of achievable colors (given the light sources used in the backlight) over the entire pixel array, provided the modulation is fast enough to yield temporal color-mixing in the visual system of the observer. Examples of color sequential displays, also known as field sequential displays, are described in U.S. Pat. No. 5,337,068 (Stewart et al.) and U.S. Pat. No. 6,762,743 (Yoshihara et al.). In some cases, it may be desirable to provide only a monochrome display. In those cases the backlights 200 can include filters or specific sources that emit predominantly in one visible wavelength or color.

In some embodiments, the light sources can include one or more polarized sources. In such embodiments, it may be preferred that a polarization axis of the polarized sources is oriented such that it is substantially parallel with a pass axis of the front reflector; alternatively it may be preferred that the source polarization axis is substantial perpendicular to the pass axis of the front reflector. In other embodiments, the polarization axis may form any suitable angle relative to the pass axis of the front reflector.

Figure 16:
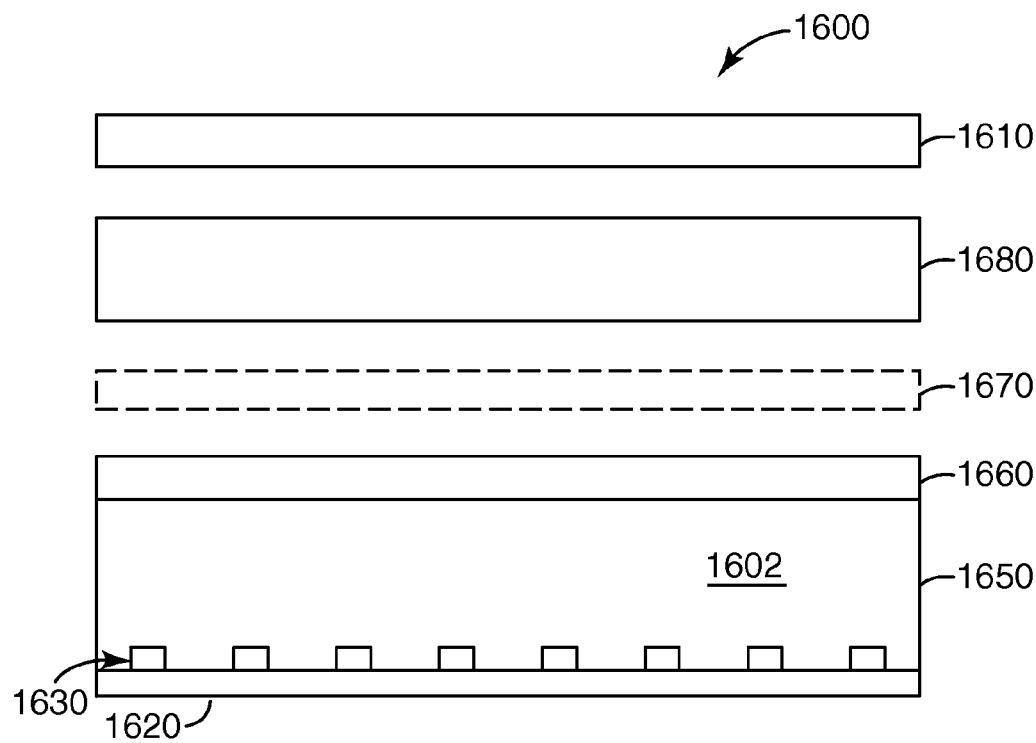
FIG. 16 is a schematic cross-section view of another embodiment of a direct-lit backlight.

In some embodiments, e.g., direct-lit backlights such as the embodiment illustrated in FIG. 16, the light sources may be positioned on the back reflector; alternatively, the light sources may be spaced apart from the back reflector. In other embodiments, the light sources may include light sources that are positioned on or attached to the back reflector, e.g., as described in co-owned and copending U.S. patent application Ser. Nos. 11/018,608; 11/018,605; 11/018,961; and 10/858,539.

The light sources 230 may be positioned in any suitable arrangement. Further, the light sources 230 can include light sources that emit different wavelengths or colors of light. For example, the light sources may include a first light source that emits a first wavelength of illumination light, and a second light source that emits a second wavelength of illumination light. The first wavelength may be the same as or different from the second wavelength. The light sources 230 may also include a third light source that emits a third wavelength of light. See, e.g., PCT Publication No. WO2008/147753. In some embodiments, the various light sources 230 may produce light that, when mixed, provides white illumination light to a display panel or other device. In other embodiments, the light sources 230 may each produce white light.

Further, in some embodiments, light sources that at least partially collimate the emitted light may be preferred. Such light sources can include lenses, extractors, shaped encapsulants, or combinations thereof of optical elements to provide a desired output into the hollow light recycling cavity of the disclosed backlights. Further, the backlights of the present disclosure can include injection optics that partially collimate or confine light initially injected into the recycling cavity to propagation directions close to a transverse plane (the transverse plane being parallel to the output area of the backlight), e.g., an injection beam having a full angle-width (about the transverse plane) at half maximum power (FWHM) in a range from 0 to 90 degrees, or 0 to 60 degrees, or 0 to 30 degrees, 0 to 15 degrees, or 0 to 10 degrees or less. Suitable injector shapes include wedge, parabolic, compound parabolic, etc.

In general, the FWHM value for the light emitted into the cavity 202 by the one or more light sources 230 can be controlled to provide the desired collimation. Any suitable value of FWHM can be provided using any suitable technique. Further, the direction of the injected light can also be controlled to provide desired transport characteristics. For example, light from the one or more light sources can be directed into the cavity at any suitable angle to the transverse plane. In some embodiments, the injected light can be directed in a direction toward the back reflector 220.

In some embodiments of the present disclosure it may be preferred that some degree of diffusion be provided within the hollow light recycling cavity. Such diffusion can provide more angular mixing of light within the cavity, thereby helping to spread the light within the cavity and provide greater uniformity in the light directed out of the cavity through the output surface. In other words, the recycling optical cavity contains a component that provides the cavity with a balance of specular and diffuse characteristics, the component having sufficient specularity to support significant lateral light transport or mixing within the cavity, but also having sufficient diffusivity to substantially homogenize the angular distribution of steady state light propagation within the cavity, even when injecting light into the cavity only over a narrow range of propagation angles. Additionally, recycling within the cavity must result in a degree of randomization of reflected light polarization relative to the incident light polarization state. This allows for a mechanism by which unusable polarization light can be converted by recycling into usable polarization light. The diffusion can be provided by one or both of the front and back reflectors, the side reflectors, or by one or more layers positioned between the front and back reflectors as is further described herein.

In some embodiments, the diffusion provided within the cavity can include semi-specular diffusion. As used herein, the term "semi-specular reflector" refers to a reflector that reflects substantially more forward scattering than reverse scattering. Similarly, the term "semi-specular diffuser" refers to a diffuser that does not reverse the normal component of the incident ray for a substantial majority of the incident light, i.e., the light is substantially transmitted in the forward (z) direction and scattered to some degree in the x and y directions. In other words, semi-specular reflectors and diffusers direct the light in a substantially forward direction and thus are very different from Lambertian components that redirect light rays equally in all directions. Semi-specular reflectors and diffusers can exhibit relatively wide scattering angles; alternatively, such reflectors and diffusers can exhibit only small amounts of light deflection outside the specular direction. See, e.g., PCT Publication No WO2008/144644.

Figure 11:
FIG. 11 is a schematic cross-section view of a portion of one embodiment of a backlight that includes a diffusely reflective front reflector and a diffusely reflective back reflector.

Semi-specular reflectors can assist the lateral spreading of light across the cavity while still providing adequate mixing of polarization and light ray directions. For example, FIG. 11 is a schematic cross-section view of a portion of a backlight 1100 that includes a diffusely reflective front reflector 1120 and a diffusely reflective back reflector 1130. Both the front and back reflectors are Lambertian reflectors, i.e., both reflectors reflect light substantially equally in all directions. The front reflector 1120 is also partially transmissive. As such, the front and back reflectors 1120, 1130 direct equal amounts of light in the forward and reverse direction on each reflection, which greatly diminishes the forward directed component of a light ray after several reflections.

As seen in FIG. 11, ray 1160 is incident on the front reflector 1120 and is diffusely reflected. At least a portion of the incident light 1160 is transmitted through the front reflector 1120. Light 1162, which is a portion of the diffusely reflected light, is subsequently incident on the back reflector 1130, where it is diffusely reflected. The combination of diffusely reflective front and back reflectors 1120, 1130 may prevent a sufficient spreading of light within the backlight 1100 because a substantial amount of light 1160 is directed backwards in a direction opposite that of the propagation direction of the light 1160. Because front reflector 1120 is partially transmissive, a potentially disproportionate amount of light may be extracted by the front reflector on one end of the backlight 1100.

Figure 12:
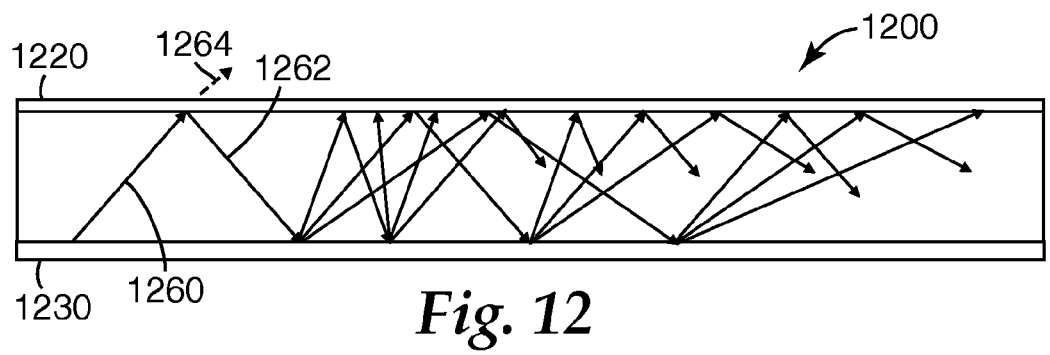
FIG. 12 is a schematic cross-section view of a portion of one embodiment of a backlight that includes a specularly reflective front reflector and a semi-specular back reflector.

In contrast to the embodiment illustrated in FIG. 11, FIG. 12 is a schematic cross-section view of a portion of another embodiment of a backlight 1200 that includes a specularly reflective front reflector 1220 and a semi-specular back reflector 1230. Ray 1260 is incident on the reflector 1220 where at least a portion of light 1262 is specularly reflected toward the back reflector 1230 and a portion 1264 of light is transmitted. In turn, light 1262 is semi-specularly reflected by the back reflector 1230 such that a substantial portion of light continues to propagate in the forward direction.

Any suitable semi-specular material or materials can be used for the front and back reflectors of the present disclosure. See, e.g., PCT Publication No. WO2008/144644.

Further, for example, the semi-specular back reflectors can include a partially transmitting specular reflector on a high reflectance diffuse reflector. Suitable partially transmitting specular reflectors include any of the partially transmitting reflective films described herein, e.g., symmetric or asymmetric reflective films. Suitable high reflectance diffuse reflectors include EDR II film (available from 3M); porous polytetrafluoroethylene (PTFE) films, such as those available from W. L. Gore & Associates, Inc.; Spectralon™ reflectance material available from Labsphere, Inc.; MCPET high reflectivity foamed sheeting from Furukawa Electric Co., Ltd.; and White Refstar™ film available from Mitsui Chemicals, Inc.

In another embodiment, a semi-specular back reflector can include a partial Lambertian diffuser on a high reflectance specular reflector. Alternatively, a forward scattering diffuser on a high reflectance specular reflector can provide a semi-specular back reflector.

The front reflector can be made semi-specular with constructions that are similar to the back reflector. For example, a partial reflecting Lambertian diffuser can be combined with a partial specular reflector. Alternatively, a forward scattering diffuser can be combined with a partial specular reflector. Further, the front reflector can include a forward scattering partial reflector. In other embodiments, any of the above-described front reflectors can be combined to provide a semi-specular front reflector. For example, the front reflector can include an asymmetric reflective film having refractive structures positioned on or in a major surface of the reflector that faces the cavity, e.g., front reflector 810 or 820 of FIGS. 8B and 8C.

In some embodiments, additional optical components can be inserted into the recycling cavity between the front and back reflectors, and such additional components may be tailored to provide the desired degree of semi-specularity to the cavity. For example, a semi-specular diffusing film can be suspended in the cavity between the front and back reflectors, both of which can be specular or semi-specular. Although it is often desirable to minimize the number of components in the cavity, the use of a third component can sometimes provide a higher efficiency cavity by allowing for the minimal loss design of the front or back reflector.

The mixing of light rays in the cavity with forward scattering elements can be accomplished in several ways. It can be done by diffusing elements that are either an integral part of the front or back reflector or are laminated to the front or back reflector, or by use of a separate diffusing sheet placed anywhere between the two. Combinations of any of these options are also possible. The choices depend on the relative importance of matters such as optical losses, component cost, and convenience of manufacturing. The diffusing element may be attached to or an integral part of either the front or back reflector, or an air gap may be provided between the diffuser and the reflectors.

Whether the diffuser is an integral part of either reflector, or laminated to either reflector, or placed in the cavity as a separate component, the overall desired optical performance is one with an angular spreading function that is substantially narrower than a Lambertian distribution for a ray that completes one round trip passage from the back reflector to the front and back again. A semi-specular reflector can have characteristics of both a specular and a Lambertian reflector or can be a well defined Gaussian cone about the specular direction. The performance depends greatly on how it is constructed. See, e.g., PCT Publication No. WO2008/144644.

As mentioned herein, backlights of the present disclosure are hollow, i.e., the lateral transport of light within the cavity occurs predominantly in air, vacuum, or the like rather than in an optically dense medium such as acrylic or glass. Historically, solid light guides have generally been used for the thinnest backlights and, except for very small displays such as handheld devices, have been illuminated with linearly continuous light sources such as cold cathode fluorescent lights (CCFLs). Solid light guides can provide low loss transport of light and specular reflections at the top and bottom surfaces of the light guide via the phenomenon of total internal reflection (TIR) of light. As described elsewhere in this application, the specular reflection of light provides the most efficient lateral transport of light within a light guide. Extractors placed on the top or bottom surface of a solid light guide redirect the light in order to direct it out of the light guide, creating in essence, a partial reflector.

However, solid light guides present several problems for large displays, such as cost, weight, and uniformity of light. The problem with uniformity for large area displays has increased with the advent of separate RGB colored LEDs, which are effectively point sources of light compared to the area of the output face of the backlight. The high intensity point sources cause uniformity problems with conventional direct-lit backlights as well as edge-lit systems that utilize solid light guides. The uniformity problems can be greatly reduced if a hollow light guide can be made that also provides for significant lateral transport of light as in a solid light guide. In some cases for polarization and light ray angle recycling systems, a hollow cavity can be more proficient at spreading light laterally across a display face than a solid cavity.

As previously described herein, the use of highly reflective front and back reflectors requires that the light losses in the recycling cavities by such reflectors are minimized Losses in the cavity arise from multiple sources such as absorption of light by the front partial reflector, the back reflector, the edge faces and corners, the light sources and their support structure and/or their injection ports, as well as losses in other components such as diffuser sheets or other light control films that may be placed inside the cavity or are a part of the partial reflector. Each reflection and transmission of every light ray for each component of the cavity results in some loss of light intensity. Therefore, overall losses for light propagating in the recycling cavity may be kept extraordinarily low, for example, both by providing a substantially enclosed cavity of low absorptive loss, including low loss front and back reflectors as well as side reflectors, and by keeping losses associated with the light sources very low, for example, by ensuring the cumulative emitting area of all the light sources is a small fraction of the backlight output area Losses that occur only once, e.g., in a component on the top side of the front reflector, that the light traverses only once, lower the overall brightness by a simple fraction equal to their percent absorption. As shown herein, the repeated losses that occur for multiple reflections of a light ray can create large losses of light intensity. Sides and corners of the cavity can be sealed with mirror films if desired. Very thin multilayer polymeric reflectors that can be applied as a tape can be used for that purpose. Where space is less of an issue, thicker diffuse reflectors can be applied to seal the sides and corners of a cavity.

A potential loss for polarized LCD backlights is light of the wrong polarization that is transmitted by the front reflector, which is then absorbed by the lower polarizer on the LC panel. This loss can be minimized by utilizing a front reflector that transmits mainly polarized light, and by maximizing the reflectivity of the block axis of the front reflector.

For any given level of partial reflectivity of the front reflector, the output of the system depends greatly on the loss value per transit of the cavity. This loss value is most easily characterized as an average loss of all rays with all components in the cavity. For several reasons, the characteristic loss value is difficult to estimate by making individual loss measurements on all components. The losses typically depend on the angle of incidence of the light ray, and the relative number of rays that pass through or reflect off each component in a cavity such as the side reflectors and light sources within the cavity.

The most direct way to estimate the characteristic loss value for the aggregate system is to measure the amount of light the cavity emits compared to the light that all of its light sources emit. This ratio is typically called the cavity efficiency. Optical modeling of these cavities can be helpful in understanding the relative importance of the individual component and aggregate loss values of a cavity. The total loss in the cavity depends on the reflectivity of the front reflector due to the creation of multiple reflections and therefore multiple losses for a given light ray. If the reflectivity of the front reflector is increased, the average number of reflections of an average light ray increases in the system.

Figure 13:
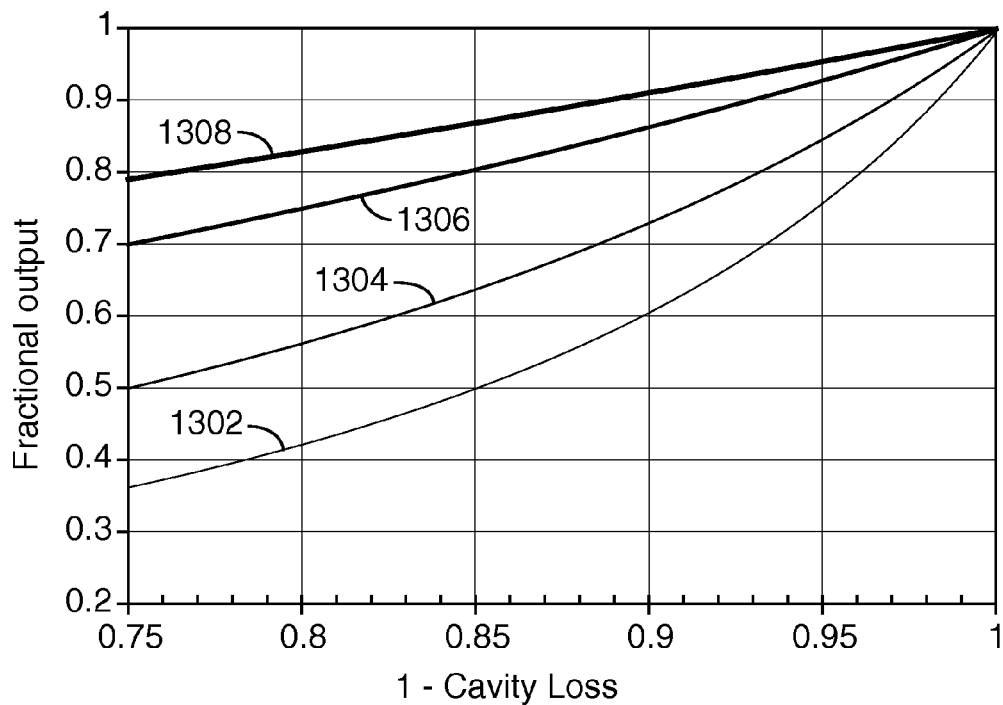
FIG. 13 is a graph of the fractional output of a cavity versus 1 minus the Cavity Loss value for front reflectors with various on-axis average reflectivities for light polarized parallel to the pass axis of the front reflector.

A simple multi-bounce model for light reflecting between two reflectors illustrates this function. For example, FIG. 13 is a graph of the fractional output of a cavity versus 1 minus the Cavity Loss for front reflectors with various on-axis average reflectivities for light polarized parallel to the pass axis of the front reflector. The back reflector was assumed to have 100% reflection. A cavity loss value is assigned for each transit of a light ray from the front reflector to the back reflector. The model assumes a constant ray angle, i.e., it is a one dimensional model. The loss value represents potential loss values in both the front and the back reflector, as well as in any other component in between. Curve 1302 represents a front reflector having an on-axis reflectivity of 85%, curve 1304 represents a front reflector having an on-axis reflectivity of 75%, curve 1306 represents a front reflector having an on-axis reflectivity of 50%, and curve 1308 represents a front reflector having an on-axis reflectivity of 30%.

For increasing reflectance values of the partial reflector, the Cavity Loss value becomes increasingly important in the efficiency of the cavity. For values above R=50% for the front reflector, the cavity output becomes substantially non-linear with respect to the characteristic cavity loss value, and the cavity loss value is preferably less than 10%. (i.e., 1 minus the Cavity Loss should be greater than 0.90). In some embodiments, the back reflector can have greater than 95% on-axis average reflectance as the total losses in the reflectors, light sources, edges, corners, etc. should be less than 10%.

Figure 14:
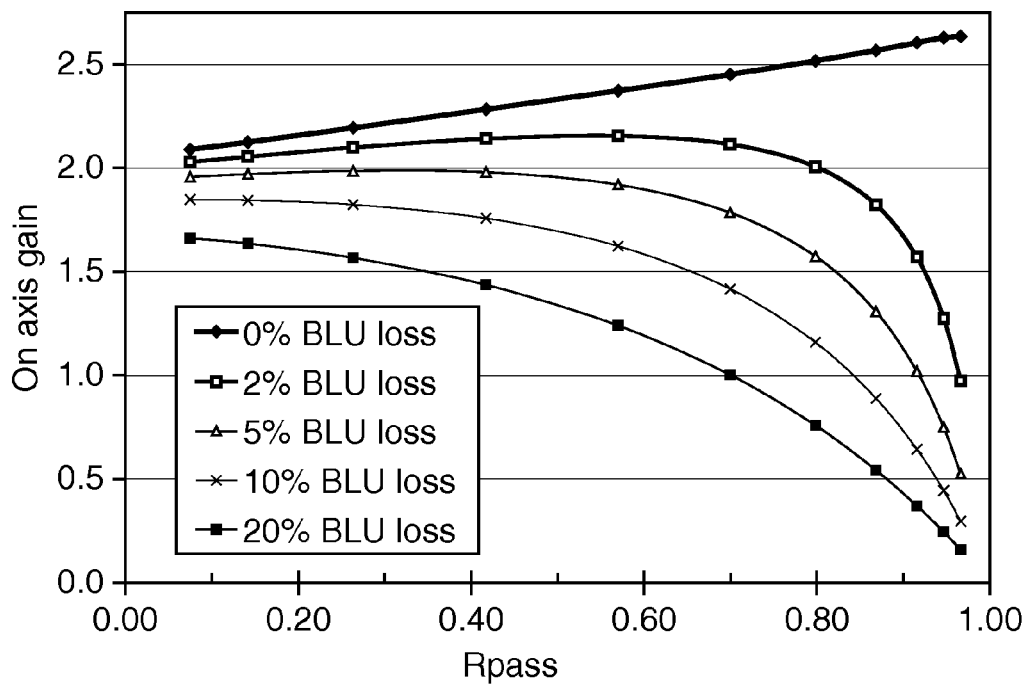
FIG. 14 is a graph of the on-axis polarized output gain versus the reflectivity of a front reflector for various values of % backlight loss.

A more complex cavity model for polarized backlights shows a similar trend. FIG. 14 illustrates the on-axis polarized output versus the reflectivity of the front reflector for various values. This model calculates the multi-bounce loss for all ray angles and polarization states within a cavity. Since the reflectivity of the front reflector is modeled as a function of angle of incidence and polarization, the on-axis brightness of the cavity can be estimated. If the front reflector has very high reflectivity for light polarized parallel to one axis (block axis $R_{block}$=99.9%), and the reflectivity of the other axis ($R_{pass}$) is varied by design, then the brightness of the backlight, when viewed at normal incidence to its face, depends greatly on the loss per pass in the cavity and the values of $R_{pass}$. The average loss per pass was varied from zero to 20% to obtain the various curves in FIG. 14 that show the on-axis brightness of the cavity for each assumed value of cavity loss.

The on-axis brightness is a spatial average over the front face of the cavity, which in the limit of perfect uniformity is the brightness at any point over the front face. The front reflector was assumed to be an asymmetric reflective film, with indices similar to an oriented PEN/PMMA multilayer stack. The high index PEN material includes the following indices of refraction: $nx1$=1.82, $ny1$=variable, $nz1$=1.49. The indices for the PMMA material are $nx2$=$ny2$=$nz2$=1.49. The value of $R_{pass}$ was varied in the model by varying the y-index (pass axis direction) of the PEN layers while keeping all other indices constant in both layers of the multilayer repeat unit. Note that the output of the system is very sensitive to the loss function when the partial reflector has high values of reflectivity ($R_{pass}$). The model assumed an index difference of 0.33 for the block axis of PEN/PMMA (i.e., $\Delta x$=0.33), a value that is readily attainable with PEN or various coPENs in conjunction with PMMA. This assures a low loss due to block axis leakage. If the block axis has a substantial leakage, it will contribute to the backlight loss function since light of this polarization will be absorbed by the bottom absorbing polarizer of the LC panel.

Both the full and partially reflective films share the common requirement of low absorption losses. The absorptivity (A) of either film may be characterized by the expression $A=1-T-R$ where T is the transmissivity and R is the reflectivity as determined in a single pass measurement. The absorption loss for the front reflector can be separated into two components: the absorption loss upon reflection ($A_R$) and an additional absorption loss that can occur upon transmission ($A_T$) of a light ray. The latter occurs in many films that have additional materials or material layers that do not participate in the actual reflection process, but which are necessary, e.g., for structural support or ease of manufacturing. It is important that these additional materials are not facing the inside of the cavity but instead face outward whenever possible. In a recycling cavity, the absorption loss upon reflection is more critical than the absorption loss upon transmission. The latter only occurs once, whereas the former occurs with each bounce, or reflection of a light ray. As a result, a 5% absorption loss upon reflection can be multiplied to as much as a 50% loss or more, depending on the value of T for the front reflector. By contrast, an absorption loss of 5% upon transmission results in only a 5% total loss. The two absorption loss values $A_R$ and $A_T$ for each optical component can be determined by measuring the reflectance from each side of the film, as well as the transmission of the film. This yields two equations and two unknowns: $1-T-R_1=A_R$ and $1-T-R_2=A_T$.

Losses can be minimized by using as few components as possible in the light mixing cavity. For a low-loss hollow backlight that is designed to promote uniform lateral spreading of the light, attributes of the components of the backlight cavity can include at least some of the following:

1) high reflectivity (e.g., for the back reflector, edges, corners, etc.; low absorption light sources and area surrounding the light sources; adequate seal between top reflector and backlight edges);
2) light ray mixing via semi-specular reflection or diffusion;
3) Partial reflectivity/transmissivity for the front reflector;
4) Efficient polarization output selection;
5) Efficient angle output selection;
6) Mechanical support (e.g., substrates and support posts) of each component.

Separate components can be used to create one or more of these six attributes, but it may be preferred to combine as many attributes into as few components as possible to minimize the losses in the system. For example, multiple components can share a common substrate whenever possible. In addition, substrates can face outward from the cavity whenever possible, so as to minimize multiple transmissions of light through them.

Additional losses can also occur in the light sources or in their supporting substrates, or through the ports created to connect them to their substrates and electrical connections. Ideally, only the emitting surfaces of the light sources are exposed in the cavity, and all other surfaces and components are covered with highly reflecting materials. The same is true for edge and corner losses. The remaining losses in the cavity occur mainly in the light reflecting and redirecting components that provide the six attributes listed above.

As stated above, losses can be reduced with the use of multi-functional components. The term "multi-functional" refers to a component that performs the function of two or more separate components that are needed in the backlight. In this manner, components such as solid light guides, diffuser plates, reflective polarizers, prismatic films or other brightness enhancement films can be replaced by fewer components. In general, reducing the number of components used in a backlight can increase the efficiency of the backlight and also reduce the depth of the backlight cavity. The thicknesses and types of materials selected for use in a component can also affect its loss values.

There are several types of materials and component designs that can be used to achieve one or more of the six attributes listed above. For example, the back reflector and/or the block axis of the front reflector can be made highly reflective. High reflectivity can be difficult to achieve with random reflective systems such as diffuse reflectors or pile-of-plates films. High reflectivity of only one polarization can be difficult to achieve with such systems. Furthermore, high reflectivity with a semi-specular scattering distribution can be difficult to achieve with diffuse reflectors. Constructive interference systems using ¼ wave thick layers can be made very reflective and much thinner, which is useful in making thin backlights.

Examples in the industry of high reflectance films are diffuse films like micro-voided oriented polyester (PET) film from Toray Films, and specular reflectors like ESR from 3M Co. The micro-voided film is about 95% reflective (transmission is about 4%) and is about 0.2 mm thick. ESR is about 99% reflective and is only about 0.07 mm thick. The micro-voided PET reflectivity is created by the index difference of air and oriented polyester, which is about 0.65. ESR is a multilayer film of oriented PEN and PMMA, with an index differential at normal incidence of about 0.26. Even though ESR has a much smaller index differential, it can be made at least 99% reflective with a much thinner construction.

If a polarizing film with high block axis reflectance is desired, then the index differential between materials is limited by the birefringence of the materials, since the indices need to be matched along one axis. For PEN, the birefringence is about 0.25, so diffuse reflecting polarizers can be made with blended polymers having index differentials of about 0.25. These constructions would therefore have to be much thicker than the voided PET reflectors in order to be 95% reflective. The reflectivity may be limited by absorption losses in such thick films since highly birefringent materials often have relatively high absorption coefficients compared to isotropic low index materials like acrylic materials. The multilayer constructions have the additional benefit of being specular, which can enhance light transport across the hollow cavity. Cholesteric reflectors are also in the class of Bragg reflectors and can be made very reflective and are inherently polarizing. A quarterwave retarder plate is needed to convert the circularly polarized light to linear. To reduce losses to a minimum, the retarder can be placed on the outside face of the cavity so that the light only passes through it once.

A silver metal back reflector can be 95% reflective if it is coated for corrosion resistance. Higher reflectivities can be achieved with silver and other metals, most notably aluminum, if they are coated with dielectric thin films.

A wire grid polarizer can have a relatively high reflectivity for the block axis if constructed properly. See, e.g., U.S. Pat. No. 6,122,103. There is some partial reflectivity for the pass axis, and this can be increased with an additional multilayer reflector film stack.

Figure 15:
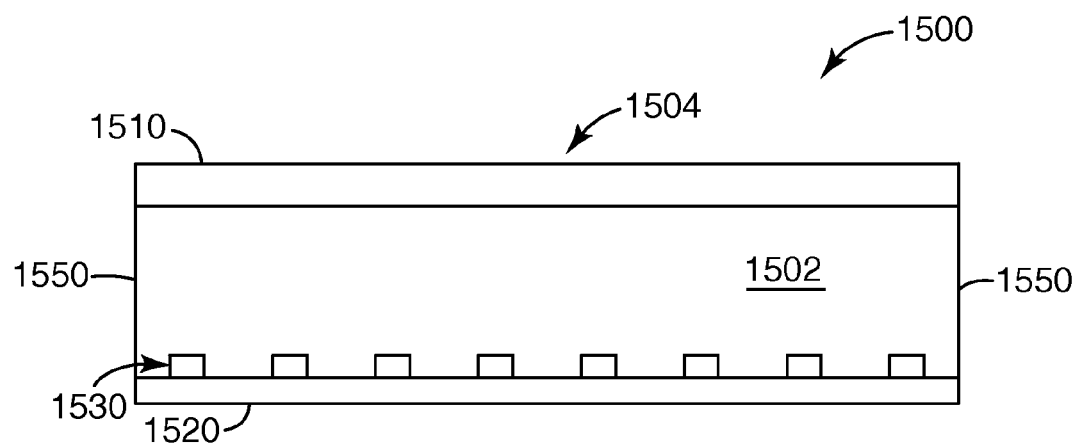
FIG. 15 is a schematic cross-section view of one embodiment of a direct-lit backlight.

The backlights of the present disclosure can include other types of arrangements of light sources relative to the recycling cavity and the output surface. For example, FIG. 15 is a schematic cross-section view of direct-lit backlight 1500. The backlight 1500 includes a front reflector 1510 and a back reflector 1520 that form a hollow illumination cavity 1502. The cavity 1502 includes an output surface 1504. The backlight 1500 also includes one or more light sources 1530 disposed to emit light into the cavity 1502. The backlight 1500 can optionally include side reflectors 1550 surrounding at least a portion of the periphery of the backlight 1500. All of the design considerations and possibilities described herein regarding the front reflector 210, the back reflector 220, the one or more light sources 230, and the side reflectors 250 of the backlight 200 of FIG. 2 apply equally to the front reflector 1510, the back reflector 1520, the one or more light sources 1530, and the side reflectors 1550 of the backlight 1500 illustrated in FIG. 15.

As previously stated herein, one or more films or layers can be positioned between the front and back reflectors to further provide uniformity and/or efficiency. For example, FIG. 16 is a schematic cross-section view of one embodiment of a direct-lit backlight 1600 that includes a front reflector 1610, a back reflector 1620, and one or more light sources 1620. The backlight 1600 also includes one or more side reflectors 1650. All of the design considerations and possibilities regarding the front reflector 210, back reflector 220, light sources 230, and side reflectors 250 of the embodiment illustrated in FIG. 2 apply equally to the front reflector 1610, back reflector 1620, light sources 1630, and side reflectors 1650 of the embodiment illustrated in FIG. 16. Although the side reflectors 1650 are depicted as extending between the back reflector 1620 and the first diffuser 1660, the side reflectors 1650 can also extend to any of the layers beyond the first diffuser 1660. In some embodiments, the side reflectors 1650 extend to the front reflector 1610.

The backlight 1600 also includes a first diffuser 1660 and an optional second diffuser 1670, both positioned between the front and back reflectors 1610, 1620. The first and second diffusers 1660, 1670 can include any suitable diffuser, e.g., diffuser plates, gain diffusers, bulk diffusers, etc. The first and second diffusers 1660, 1670 can be the same or different diffusers.

The backlight 1600 also includes a brightness enhancing layer 1680 positioned between the front and back reflectors 1610, 1620. The brightness enhancing layer 1680 can include any suitable brightness enhancing layer or film, e.g., BEF (available from 3M Company).

In general, light from the light sources 1630 is diffused by the first diffuser 1660 and optional second diffuser 1670. For embodiments that included a gain diffuser as the second diffuser 1670, diffuse light from the first diffuser 1660 is further diffused by the second diffuser 1670 and collimated as well. The brightness enhancing layer 1680 further acts to collimate the diffuse light. Although depicted as including a single brightness enhancing layer 1680, the backlight 1600 can include a second brightness enhancing layer positioned between the first layer 1680 and the front reflector 1610 to further collimate the light, e.g., in an orthogonal plane.

Light that is transmitted by the brightness enhancing layer 1680 is partially reflected and partially transmitted by the front reflector 1610. The reflected light is directed toward the back reflector 1620 where it can be recycled within the cavity 1602. While some amount of recycling may occur between the front reflector 1610 and other films or layers in the backlight 1600, a substantial portion of recycled light in the cavity 1602 is recycled by the front and back reflectors 1610, 1620.

Figure 17:
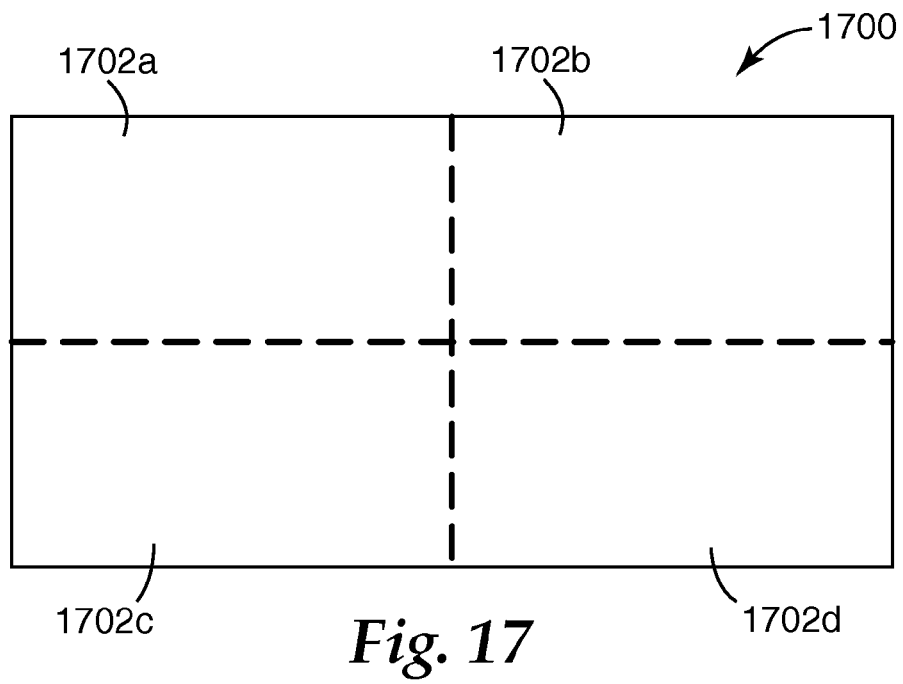
FIG. 17 is a schematic plan view of one embodiment of a zoned backlight.

The backlights of the present disclosure can also include two or more zones, where each zone can provide different output characteristics such as brightness, color, etc. Such zoned backlights can include vertical partitions disposed between the front reflector and the back reflector to partially or completely segment a hollow light recycling cavity into separate zones or sub-cavities. For example, FIG. 17 is a schematic plan view of one embodiment of a zoned backlight 1700. The backlight 1700 includes four zones 1702a-d formed by vertical partitions that are arranged between the front and back reflectors as shown by the broken lines to define distinct zones or cavities 1702a-d. The partitions can be made of (or covered with) a highly reflecting material such as the ones listed as suitable for the back reflector; alternatively, one or more partitions can also be partially transmissive. The partitions may extend from the back reflector to the front reflector, or they may extend only part of the way from the back reflector to the front reflector or the front reflector to the back reflector, thereby providing a small gap between one of the top edge and bottom edge of the partition and the front reflector. The presence of such a gap, especially when used in conjunction with the front reflectors described herein, can help hide the partition by reducing the local luminance non-uniformity that can be caused by the presence of the partition. For example, in some embodiments, the gap may be about 0.5 to 5 mm. In some embodiments, it may also be preferred that the top edge of the partition (the edge closest to the front reflector) be narrow so as to further reduce the visibility of the partition. Any suitable number of zones may be provided in the backlight 1700.

The partitions can be separate elements that are appropriately placed within the backlight. Alternatively, the partitions can be formed in one or both of the front and back reflectors.

For example, the back reflector can be shaped or formed to provide partitions, e.g., as is described in U.S. Patent Publication No. 2005/0265029 (Epstein et al.), entitled LED ARRAY SYSTEMS. Any suitable technique can be used to form partitions in one or both of the front and back reflectors, e.g., bending, thermoforming, stamping, pressure forming, etc. Light sources may be disposed within each zone in a direct-lit configuration, along the periphery of each zone in an edge-lit configuration, or disposed to provide a combination edge-lit/direct-lit backlight.

Further, the zones may be any suitable plan shape, e.g., rectangular, hexagonal, or other polygonal shapes; circles, ellipses, and any other desired shapes are contemplated. The geometry can be tailored to achieve high efficiency and brightness and color uniformity in the backlight.

Backlights utilizing more than one of the disclosed recycling cavities, and particularly those having zones or arrays of distinct cavities, each of which is illuminated by its own light source(s) which are separately controlled or addressable relative to light source(s) in neighboring cavities, can be used with suitable drive electronics to support dynamic contrast display techniques and color sequential display techniques, in which the brightness and/or color distribution across the output area of the backlight is intentionally non-uniform. Thus, different zones of the output area can be controlled to be brighter or darker than other zones, or the zones can emit in different colors, simply by appropriate control of the different light sources in the different recycling cavities.

It may be desired to have light source redundancy within a zone. For example, one important concern of backlight designers is that objectionable non-uniformity could be seen by the consumer if an individual light source fails. To mitigate this risk, one or more zones can include two or more light sources so that if one source fails, there would still be some minimum level of brightness within a zone. The control scheme could increase the brightness of the remaining light sources within a zone to further compensate for the non-functioning light source.

The various embodiments of backlights described herein can include a light sensor and feedback system to detect and control one or both of the brightness and color of light from the light sources. For example, a sensor can be located near individual light sources or clusters of sources to monitor output and provide feedback to control, maintain, or adjust a white point or color temperature. It may be beneficial to locate one or more sensors along an edge or within the cavity to sample the mixed light. In some instances it may be beneficial to provide a sensor to detect ambient light outside the display in the viewing environment, for example, the room that the display is in. Control logic can be used to appropriately adjust the output of the light sources based on ambient viewing conditions. Any suitable sensor or sensors can be used, e.g., light-to-frequency or light-to-voltage sensors (available from Texas Advanced Optoelectronic Solutions, Plano, Tex.). Additionally, thermal sensors can be used to monitor and control the output of light sources. Any of these techniques can be used to adjust light output based on operating conditions and compensation for component aging over time. Further, sensors can be used for dynamic contrast, vertical scanning or horizontal zones, or field sequential systems to supply feedback signals to the control system.

While not wishing to be bound by any particular theory, there are four attributes for edge-lit backlights that can be selected with mutual cognizance to simultaneously achieve adequate efficiency, uniformity, and viewing angle. These are 1) the geometry of the cavity, 2) the reflective and transmissive properties of the emissive surface, 3) the reflective properties of the back reflector, and 4) the angular distribution of light injected into the cavity at each illuminated edge.

The reflective and transmissive properties of the front reflector, and the reflective properties of the back reflector, can be described by the bidirectional reflectivity and transmissivity distribution functions (BRDF and BTDF, respectively) of the former, and the BRDF of the latter. The BRDF describes the radiance reflected into every inward direction for unit radiance incident in any outward direction. The BTDF describes analogously the radiance transmitted into every outward direction for unit radiance incident in any outward direction. The total reflectivity/transmissivity is the total power per unit area reflected/transmitted into all inward/outward directions for unit power per unit area incident in any outward direction. The hemispherical reflectivity/transmissivity is the total reflectivity/transmissivity averaged over all directions of incidence. The hemispherical reflectivity/transmissivity can be measured for wavelengths of incident light that are to be used with the backlight.

One or more of the embodiments of front reflectors described herein exhibit a hemispherical reflectivity of at least 60%, with a total reflectivity for directions of incidence substantially perpendicular to the illuminated edge(s) and within approximately 30 degrees of grazing incidence of the front reflector that can be greater than the hemispherical reflectivity, and less than the hemispherical reflectivity for directions of incidence substantially parallel to the illuminated edges or beyond 30 degrees of grazing.

For purposes of explanation, light within an edge-lit backlight can be thought of as falling into two classes of angular distributions. The first angular distribution includes light within the recycling cavity that is propagating in a direction that is substantially orthogonal to the illuminated edge and at an incidence angle with the front reflector of at least 60° measured from the front reflector normal. The second angular distribution includes all propagating light within the cavity that does not fall within the first angular distribution.

Figure 18:
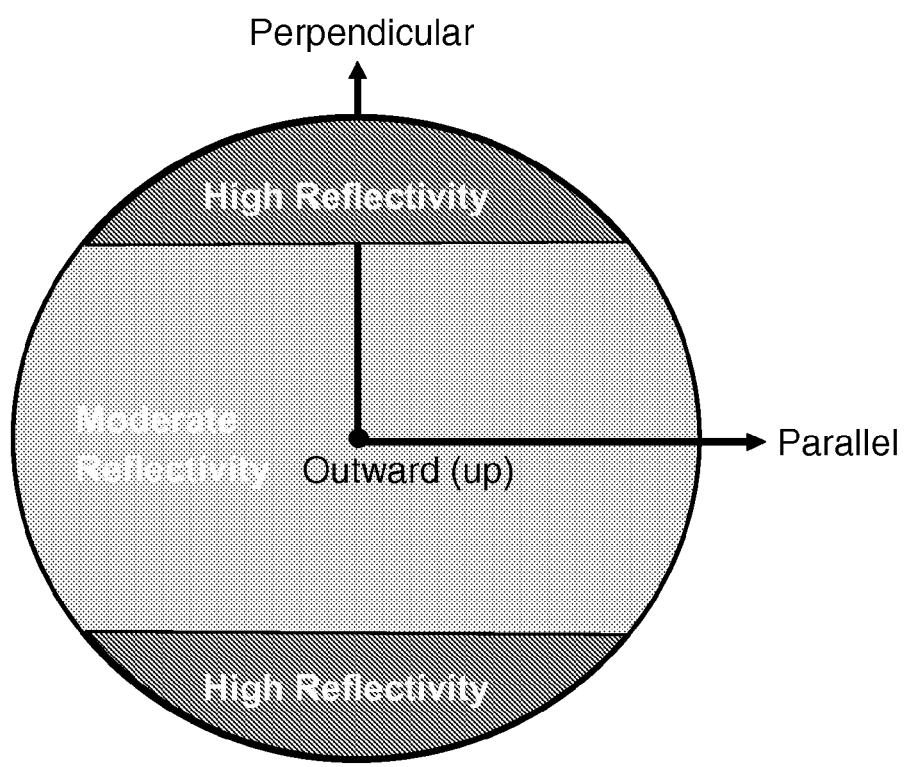
FIG. 18 is a schematic view of the approximate dependence of the total reflectivity upon the direction of incidence for one or more embodiments of front reflectors.

For example, FIG. 18 is a schematic view of the approximate dependence of the total reflectivity upon the direction of incidence for one or more embodiments of front reflectors described herein. The unit-radius circular domain depicts the projection of every outward direction of incidence into the plane of the front reflector. For the embodiment illustrated in FIG. 18, the emission of the backlight will be both substantially linearly polarized and most intense near normal and in directions deviating from normal parallel to the illuminated edge(s), and least intense in directions deviating from normal by more than 60 degrees in directions perpendicular to the illuminated edge(s).

Light injected at the illuminated edge(s) is substantially wholly retained within the cavity if it strikes the emissive surface substantially perpendicular to the illuminated edges and within 30 degrees of grazing, i.e., light in the first angular distribution. It is otherwise partially retained within the cavity with the complementary portion emitted. The radiance in each angular distribution diminishes as the number of interactions with the front and back reflectors of the cavity increases, and, therefore, generally with increasing distance from the illuminated edge(s). The radiance in the second angular distribution diminishes more rapidly than that in the first angular distribution because of the relatively smaller values of the total reflectivity of the front reflector. Since this second angular distribution directly supplies the emission, the rapidity of its decay primarily determines the overall uniformity of the backlight emission.

If the BRDFs of both the front and back reflectors are purely specular, then, assuming a cavity of uniform depth and specular edges, retained light will strike the front reflector with the same (or a symmetrically-equivalent) direction of incidence upon all subsequent encounters until it eventually interacts with the injection optics at the illuminated edge(s). In this circumstance, there exists no leveraged mechanism by which light in either distribution can transfer to the other. Light in the first angular distribution remains substantially trapped within the cavity until it is eventually absorbed, thereby diminishing the efficiency of the backlight. Light in the second angular distribution decays relatively rapidly because of the transmission through the front reflector, thereby creating non-uniform emission.

If the BRDF of either the front reflector or back reflector possesses a significant non-specular component, then retained light will strike the front reflector with a potentially different direction of incidence upon each subsequent encounter, thereby providing a mechanism for the transfer of light from one distribution to the other. The average number of bounces can be controlled, or equivalently the propagation distance necessary to effect this transfer by controlling the degree of non-specularity in one or both BRDFs. In the presence of an appropriate degree of conversion, light in the first angular distribution may be gradually transferred to the latter as it propagates away from the illuminated edge(s), thereby avoiding the eventuality of its absorption, and at the same time slowing the decay of the second angular distribution by providing a gradual influx distributed along the extent of the backlight perpendicular to its illuminated edge(s). The result is both increased efficiency and improved uniformity.

The injection optics determine the angular distribution of light at the illuminated edge(s) of the cavity, and thus the initial population of light within each of the two angular distributions. The initial population, in turn, determines the sense and the magnitude of the transfer of light between distributions in circumstances where one or both BRDFs possess a non-specular component. Thus, for example, if light is injected exclusively into the second angular distribution, the rate of decay of this distribution will increase beyond its relatively-high baseline value due to a net transfer out of the second distribution into the first with increasing distance from the illuminated edge(s). While increasing the overall efficiency of emission, it will generally also result in an overly-rapid decay, engendering a darkening at positions removed from the illuminated edge(s). If, at the opposite extreme, light is injected exclusively into the first distribution, the net transfer will be out of the first into the second, and the second will decay less rapidly than its baseline. Overall, the uniformity will improve, although at the expense of efficiency, and with the possibility of darkening near the illuminated edge(s) due to a local paucity of light in the second distribution.

Imaging of the sources creates a second type of potential non-uniformity. Such imaging can create one or more bright bands or spots near the illuminated edge(s), which in the case of spots may also engender color non-uniformity when colored LEDs are used. In many circumstances, the suppression of these non-uniformities trumps concerns over the gradual changes in intensity which occur across the separation between the illuminated edges.

Imaging can occur when 1) the angular distribution of injected light contains residual sharp features (engendered by spatially-discrete sources), and 2) the injected light contributes directly to the backlight emission. It can largely be eliminated by 1) eliminating the sharp features in the injected radiance, or 2) injecting light exclusively into the first angular distribution. The former alternative is usually accomplished by forcing multiple-bounces, possibly with some degree of diffusion, within the injection optics. The latter alternative is accomplished by partially-collimating designs, as described herein.

Uniformity is desired both perpendicular and parallel to the illuminated edge(s) of the display. Since the optical characteristics of the cavity are independent of position parallel to these edges, the injection optics can possess a cross section in any plane normal to the illuminated edge(s) that is independent of the position of the plane along these edge(s). That is, in some embodiments, the preferred injection optics are translationally invariant along the illuminated edge(s). The collimation afforded by a translationally-invariant optic is completely specified by the angular subtense of the emission of the optic in the plane normal to the translational axis. If, for example, the in-plane emission is confined to within $\psi$ degrees of any plane parallel to the emissive surface, the directions of incidence upon the emissive surface populated by the injected light will be all those for which $|s_{perp}| \geq \sqrt{1-s_{par}^2} \cos \psi$.

It follows that the exclusive population of the first angular distribution of light can be substantially accomplished by collimation of the injected light distribution injected by a translationally-invariant optic. The degree of collimation required can be dictated by the extent of the high-reflectivity domain of the front reflector, and is evaluated once the BRDF of that surface is known. For one or more embodiments of front reflectors described herein, the high-reflectivity domain extends between approximately 60 to 90 degrees incidence (in relation to the surface normal), and the required in-plane collimation is within 30 degrees of any plane parallel to the emissive surface.

Conveniently, injection which eliminates imaging of the sources by exclusively populating the first angular distribution of radiant intensity also minimizes the gradual decay of emission between the illuminated edge(s) and points further removed from these within the output surface.

In some embodiments, the backlights can include a conversion structure positioned within the cavity to convert at least a portion of light in the cavity having the first angular distribution into light having the second angular distribution and at least a portion of light in the cavity having the second angular distribution into light having the first angular distribution. The conversion structure can be positioned proximate the front reflector, back reflector, or between the front reflector and back reflector. Any suitable material or materials can be used to form the converting structure. In some embodiments, the converting structure can include a semi-specular reflective material or structure, e.g., the semi-specular reflective materials described herein. For example, the conversion structure can be a back reflector that includes a bead-coated ESR. At least a portion of light within the first angular distribution that is propagating in the cavity is converted to the second angular distribution after interacting with the semi-specular back reflector.

EXAMPLES

The following Examples include various sizes of edge-lit and direct-lit backlight configurations. The tested backlights included different films for both the front and back reflectors as is shown in Table 2 below.

Front and Back Reflector Films

The following is a description of the front and back reflector films used in the Examples:

89% R Asymmetric Reflective Film (ARF-89).

This asymmetric reflective film included 264 alternating microlayers of birefringent 90/10 coPEN and non-birefringent PMMA. The 264 alternating microlayers were arranged in a sequence of ¼ wave layer pairs, where the thickness gradient of the layers was designed to provide a strong reflection resonance broadly and uniformly across a bandwidth from approximately 400 nm to 900 nm wavelength for one polarization axis, and a weaker reflection resonance for the orthogonal axis. Five micron thick skin layers of 90/10 coPEN were disposed on the outside surfaces of the coherent alternating microlayer stack. The overall thickness of the film, including the alternating microlayers, the PBLs and the skin layers, was approximately 40 µm. This film was manufactured using the techniques described herein.

The birefringent refractive index values (measured at 633 nm) for the 90/10 coPEN layers were nx1=1.785, ny1=1.685, nz1=1.518, and the indices for the PMMA layers were nx2=ny2=nz2=1.494.

ARF-89 had an average on-axis reflectivity of 89% in the pass axis, an average on-axis reflectivity of 98% in the block axis, and a hemispherical reflectivity of 92.5%.

86% R Asymmetric Reflective Film (ARF-86).

This asymmetric reflective film included 264 alternating microlayers of birefringent 90/10 coPEN and non-birefringent PMMA. The 264 alternating microlayers were arranged in a sequence of ¼ wave layer pairs, where the thickness gradient of the layers was designed to provide a strong reflection resonance broadly and uniformly across a bandwidth from approximately 410 nm to 890 nm wavelength for one polarization axis, and a weaker reflection resonance for the orthogonal axis. Twenty-five micron thick skin layers of SA115 were disposed on the outside surfaces of the coherent altering microlayer stack. The overall thickness of the film, including the alternating microlayers, the PBLs and the skin layers, was approximately 75 µm. This film was manufactured using the techniques described herein.

The birefringent refractive index values (measured at 633 nm) for the 90/10 coPEN layers were nx1=1.805, ny1=1.665, nz1=1.505, and the indices for the PMMA layers were nx2=ny2=nz2=1.494.

ARF-86 had an average on-axis reflectivity of 86% in the pass axis, an average on-axis reflectivity of 98% in the block axis, and a hemispherical reflectivity of 92.1%.

84% R Asymmetric Reflective Film (ARF-84).

This asymmetric reflective film included 264 alternating microlayers of birefringent 90/10 coPEN material and non-birefringent PMMA material. The 264 alternating microlayers were arranged in a sequence of ¼ wave layer pairs, where the thickness gradient of the layers was designed to provide a strong reflection resonance broadly and uniformly across a bandwidth from approximately 400 nm to 900 nm for one polarization axis, and a weaker reflection resonance for the orthogonal axis. Five micron thick skin layers of 90/10 coPEN were disposed on the outside surfaces of the coherent alternating microlayer stack. The overall thickness of ARF-84, including the alternating microlayers, the PBLs and the skin layers, was approximately 40 µm. This film was manufactured using the techniques described herein.

The birefringent refractive index values (measured at 633 nm) for the alternating microlayers of 90/10 coPEN were nx1=1.785, ny1=1.685, and nz1=1.518; and the indices for the microlayers of PMMA were nx2=ny2=nz2=1.494.

ARF-84 had an average on-axis reflectivity of 83.7% in the pass axis, an average on-axis reflectivity of 97.1% in the block axis, and a hemispherical reflectivity of 88.5%.

68% R Asymmetric Reflective Film (ARF-68).

This asymmetric reflective film included 274 alternating microlayers of birefringent 90/10 coPEN material and non-birefringent PMMA material. The 274 alternating microlayers were arranged in a sequence of ¼ wave layer pairs, where the thickness gradient of the layers was designed to provide a strong reflection resonance broadly and uniformly across bandwidth from approximately 400 nm to 970 nm for one polarization axis, and a weaker reflection resonance for the orthogonal axis. Five micron thick skin layers of a blend of 75% SA115 (available from Eastman Chemical Company) and 25% DP2554 were disposed on the outside surfaces of the coherent alternating microlayer stack. The overall thickness of the asymmetric reflective film, including the alternating microlayers, the PBLs and the skin layers, was approximately 50 µm. This film was manufactured using the techniques described herein.

The birefringent refractive index values for the alternating microlayers of 90/10 coPEN and of PMMA material were measured at 633 nm. The indices for the coPEN microlayers were nx1=1.820, ny1=1.615, and nz1=1.505. The index of refraction for the PMMA microlayers were nx2=ny2=nz2=1.494.

ARF-68 had an average on-axis reflectivity of 68.4% in the pass axis, an average on-axis reflectivity of 99.5% in the block axis, and a hemispherical reflectivity of 83.2%.

37% R Asymmetric Reflective Film (ARF-37).

This asymmetric reflective film included 274 alternating microlayers of birefringent 90/10 coPEN and non-birefringent blend of CoPET-F and DP29341. The 274 alternating microlayers were arranged in a sequence of ¼ wave layer pairs, where the thickness gradient of the layers was designed to provide a strong reflection resonance broadly and uniformly across a bandwidth from approximately 420 nm to 850 nm for one polarization axis, and a weaker reflection resonance for the orthogonal axis. Five micron thick skin layers of coPEN 55/45/HD were disposed on the outside surfaces of the coherent alternating microlayer stack. The overall thickness of ARF-37, including the alternating microlayers, the PBLs and the skin layers, is approximately 50 µm. This film was manufactured using the techniques described herein.

The measured birefringent refractive index values (measured at 633 nm) for the alternating microlayers of 90/10 coPEN were nx1=1.820, ny1=1.615, and nz1=1.505, and the indices for the layers of coPET-F+DP29341 were nx2=ny2=nz2=1.542.

ARF-37 had an average on-axis reflectivity of 38.1% in the pass axis, an average on-axis reflectivity of 99.0% in the block axis, and a hemispherical reflectivity of 67.6%.

2 Layer Laminate of Asymmetric Reflective Film (2×ARF).

This asymmetric reflective film included two asymmetric reflective films bonded together using one thick optical adhesive layer to form a laminate. Each film included 274 alternating microlayers of birefringent 90/10 coPEN and non-birefringent PET-G. The 274 alternating microlayers were arranged in a sequence of ¼ wave layer pairs, where the thickness gradient of the layers was designed to provide a strong reflection resonance broadly and uniformly across a bandwidth from approximately 410 nm to 940 nm for one polarization axis, and a weaker reflection resonance for the orthogonal axis. There were no skin layers on the individual multilayer optical films. Each film was manufactured using the techniques described herein. The overall thickness of 2×ARF, including the alternating microlayers, PBLs and adhesive layers, was approximately 100 µm. The birefringent refractive index values (measured at 633 nm) for the alternating microlayers of 90/10 coPEN were nx1=1.830, ny1=1.620, and nz1=1.500, and the indices for the microlayers of PET-G were nx2=ny2=nz2=1.563.

2×ARF had an average on-axis reflectivity of 36% in the pass axis, and a hemispherical reflectivity of 75.4%.

3 Layer Laminate of Asymmetric Reflective Film (3×ARF).

This asymmetric reflective film included three asymmetric reflective films bonded together using two thick optical adhesive layers to form a laminate. Each film included 274 alternating microlayers of birefringent 90/10 coPEN and non-birefringent of PET-G. The 274 alternating microlayers were arranged in a sequence of ¼ wave layer pairs, where the thickness gradient of the layers was designed to provide a strong reflection resonance broadly and uniformly across a bandwidth from approximately 410 nm to 940 nm for one polarization axis, and a weaker reflection resonance for the orthogonal axis. There were no skin layers on the individual multilayer optical films. Each film was manufactured using the techniques described herein. The overall thickness of 3×ARF, including the alternating microlayers, PBLs and adhesive layers, was approximately 150 p.m. The birefringent refractive index values (measured at 633 nm) for the alternating microlayers of 90/10 coPEN were nx1=1.830, ny1=1.620, and nz1=1.500, and the indices for the microlayers of PET-G were nx2=ny2=nz2=1.563.

3×ARF had an average on-axis reflectivity of 48% in the pass axis, and a hemispherical reflectivity of 75.4%.

4 Layer Laminate of Asymmetric Reflective Film (4×ARF).

This asymmetric reflective film included four asymmetric reflective films bonded together using three thick optical adhesive layers to form a laminate. Each film included 274 alternating microlayers of birefringent 90/10 coPEN and non-birefringent of PET-G. The 274 alternating microlayers were arranged in a sequence of ¼ wave layer pairs, where the thickness gradient of the layers was designed to provide a strong reflection resonance broadly and uniformly across a bandwidth from approximately 410 nm to 940 nm for one polarization axis, and a weaker reflection resonance for the orthogonal axis. There were no skin layers on the individual multilayer optical films. Each film was manufactured using the techniques described herein. The overall thickness of 4×ARF, including the alternating microlayers, PBLs and adhesive layers, was approximately 200 μm.

The measured birefringent refractive index values (measured at 633 nm) for the alternating microlayers of 90/10 coPEN were nx1=1.830, ny1=1.620, and nz1=1.500, and the indices for the microlayers of PET-G were nx2=ny2=nz2=1.563.

4×ARF had an average on-axis reflectivity of 55.6% in the pass axis, and a hemispherical reflectivity of 79.2%.

5 Layer Laminate of Asymmetric Reflective Film (5×ARF).

This multilayer optical film is included four thick optical adhesive layers used to bond five sheets of asymmetric reflective film in a laminate body. Each film included 274 alternating microlayers of birefringent 90/10 coPEN and non-birefringent of PET-G. The 274 alternating microlayers are arranged in a sequence of ¼ wave layer pairs, where the thickness gradient of the layers was designed to provide a strong reflection resonance broadly and uniformly across bandwidth from approximated 410 nm to 940 nm wavelength for one polarization axis, and a weaker reflection resonance for the orthogonal axis. There were no skin layers on the individual multilayer optical films. The overall thickness of 5×ARF, including the alternating microlayers, PBLs and adhesive layers, was approximately 260 μm. The measured (at 633 nm) birefringent refractive index values for the alternating microlayers of 90/10 coPEN material were nx1=1.830, ny1=1.620, and nz1=1.500, and the indices of the PET-G material were nx2=ny2=nz2=1.563.

In the following Examples, 5×ARF was used with an Opalus BS-702 beaded gain diffuser (available from Keiwa Corp., Japan) laminated to the side of the surface of the 5×ARF that faced the back reflector, such that the beads (i.e., microspheres) of the gain diffuser faced toward the back reflector.

5×ARF laminated to the beaded gain diffuser had an average on-axis reflectivity of 61.7% in the pass axis, and a hemispherical reflectivity of 81.1%.

Bead-Coated ESR (BESR).

This optical film included a plurality of optical elements coated onto an ESR film. The coating process included dispersing a size distribution with geometric mean diameter of ~18 μm, of small PMMA beads (MBX-20, available from Sekisui, Japan) into a solution of Iragacure 142437-73-01, IPA, and Cognis Photomer 6010. The solution was metered into a coater, and subsequently UV cured, producing a dried coating thickness of approximately 40 μm. At this thickness, the dispersion of PMMA beads created a partial hemispheric surface structure, randomly distributed spatially. The average radius of protrusion of the PMMA beads above the mean surface was estimated to be approximately 60% of the average bead radius. The dried matrix was formulated to have approximately the same refractive index as the PMMA beads, minimizing the bulk scattering within the coating. BESR had a hemispherical reflectivity of 98.0%.

ESR.

Vikuiti™ Enhanced Specular Reflector multilayer polymeric film available from 3M Company. ESR had a hemispherical reflectivity of 99.4%.

BGD.

Unless otherwise specified, some of the following Examples included a Opalus BS-702 beaded gain diffuser (available from Keiwa Corp.).

2×TIPS.

A porous polypropylene film having a high reflectivity and can be made using thermally induced phase separation as described, e.g., in U.S. Pat. No. 5,976,686 (Kaytor et al.). Two sheets of TIPS were laminated together using an optical adhesive to form a laminate. The Lambertian diffuse reflector had an average hemispherical reflectivity of 97.5%.

DBEF.

Multilayer reflective polarizing film available from 3M Company. DBEF had a hemispheric reflectivity of 50.8%.

APF.

Multilayer reflective polarizing film available from 3M Company. APF had a hemispheric reflectivity of 51.0%.

LEF.

Light Enhancement Film 3635-100, available from 3M Company. This film is diffusely reflective. LEF had a hemispheric reflectivity of 94%.

MCPET.

Microcellular PET reflective sheeting, available from Furukawa America, Inc. (Peachtree City, Ga.). MCPET is diffusely reflective.

The following table indicates which front and back reflector films were used for each Example:

TABLE 2

| Example | Front Reflector | Back Reflector |
|---|---|---|
| Comparative Example 1 | BGD | ESR |
| 1 | ARF-89 | Brushed Aluminum |
| 2 | ARF-89 | ESR |
| 3 | ARF-89 | BESR |
| 4 | ARF-89 | LEF |
| 5 | ARF-89/BGD | ESR |
| 6a | ESR | BESR |
| 6b | ARF-89 | BESR |
| 6c | ARF-84 | BESR |
| 6d | ARF-68 | BESR |
| 6e | ARF-37 | BESR |
| 6f | APF | BESR |
| 7 | ARF-89 | BESR |
| 8 | ARF-89 | BESR |
| 9 | ARF-89 | BESR |
| 10a | ARF-68/BGD | ESR |
| 10b | ARF-68/BGD | ESR |
| 11a | ARF-68/BGD | ESR |
| 11b | ARF-68/BGD | ESR |
| 12a | ESR | BESR |
| 12b | ARF-89 | BESR |
| 12c | ARF-84 | BESR |
| 12d | ARF-68 | BESR |
| 12e | ARF-37 | BESR |
| 12f | APF | BESR |
| Comparative Example 2 | APF/BGD | ESR |
| 13 | 5 × ARF/BGF | ESR |
| 14 | 5 × ARF/BGF | ESR |
| 15 | ARF-68 | BESR |
| Comparative Example 3 | APF | BESR |
| 16 | ARF-89 | BESR |
| 17 | ARF-68 | BESR |
| 18 | 4 × ARF | BESR |
| 19 | 4 × ARF | 2 × TIPS |
| 20 | ARF-89 | BESR |
| 21 | ARF-89 | BESR |
| Comparative Example 4 | APF/BGD | ESR |
| 22 | ARF-68/BGD | ESR |
| 23 | ARF-68/BGD | ESR |
| 24 | ARF-68/BGD | ESR/BGD |
| Comparative Example 5 | Diffuser Plate | 2 × TIPS |
| 25 | Bead Coated ARF-84 | 2 × TIPS |
| 26 | ARF-84/BGD | 2 × TIPS |
| Comparative Example 6 | Diffuser Plate | 2 × TIPS |
| Comparative Example 7 | Diffuser Plate/DBEF | 2 × TIPS |
| 27 | Diffuser Plate/ARF-37 | 2 × TIPS |
| 28 | Diffuser Plate/3 × ARF | 2 × TIPS |
| Comparative Example 8 | DP/BDG/BEF/DBEF | 2 × TIPS |
| 29 | BGD/BEF/ARF-68 | ESR |
| 30 | (2) ARF-84/BGD | 2 × TIPS |
| 31 | DP/2 × ARF | MCPET |

Measurement Systems

The luminance and uniformity of the examples were measured using one of two models of colorimetric cameras (either model PM 1613F-1 or model PM-9913E, both from Radiant Imaging, Inc.). These two models of colorimetric camera produce data that are nearly identical when properly calibrated. Unless otherwise noted, the camera was fitted with a 105 mm lens and the internal ND2 neutral density filter was selected. The software supplied by Radiant Imaging was used to calibrate the camera and take the measurements. Color and luminance calibration was done with the aid of a spot radiometer (model PR650 from Photo Research, Inc.). The test bed was placed in the vertical orientation, 5 m in front of the camera. The test bed was aligned to the camera such that the axis of the camera lens was normal to the output area and aimed approximately at the center of the test system. The camera software was set to record only the display portion of the image using the clipping feature. Exposure time was set automatically by the software to avoid overexposure of the images.

Measurements were carried out by configuring the test bed with the films to be tested and then using the colorimetric camera to take pictures of the test system. The average luminance, average color, luminance uniformity and color uniformity were calculated from the measured images using custom data analysis programs.

Unless otherwise noted, the data was measured through an absorbing polarizer (HLC2-5618S from Sanritz) laminated to an acrylic plate. The pass axis of the absorbing polarizer was oriented parallel with the pass axis of the front reflector film.

Data collected using the colorimetric camera were analyzed to determine the average luminance, average color, luminance uniformity and color uniformity. In the following examples, the average luminance value was calculated by summing the luminance value of every pixel in an image and dividing by the total number of pixels in the recorded image. Since the image data was recorded using a colorimetric camera, this is an on-axis luminance value. Similarly, the average color (expressed in the color coordinates on the CIE 1976 Uniform Chromaticity Scale and herein referred to as u' and v') was obtained by summing u' or v' over all of the pixels in the image and dividing by the total number of pixels in the recorded image.

Luminance and color uniformity was determined according to the Video Electronics Standards Association's *Flat Panel Display Measurements Standard, v.* 2.0 (published Jun. 1, 2001) standard 306-1 Sampled Uniformity and Color of White. Nine sampling points were used as defined in the Standard. The luminance or color at each sample point was determined from the recorded image by averaging the luminance or u' and v' values of the pixels falling within an approximately circular region around the sample point location. The approximately circular region had a diameter of 3% of the diagonal of the image.

The VESA 9pt luminance uniformity reported herein was determined from the 9 sample points as $$VESA\ 9pt\ \text{Luminance Uniformity} = \frac{L_{min}}{L_{max}}$$

where $L_{min}$ is the minimum value of the luminance of the 9 points and $L_{max}$ is the maximum value of the luminance of the 9 points. Higher values of VESA 9pt luminance uniformity indicate systems that are more uniform.

The VESA 9pt color nonuniformity was determined as the largest value of the color difference between any two pairs of the 9 sampled points. The color difference Δu'v' is $$\Delta u'v' = \sqrt{(u_1' - u_2')^2 + (v_1' - v_2')^2}$$

where the subscripts 1 and 2 denote the two points being compared. Lower values of VESA 9pt color nonuniformity indicate systems that are more uniform.

Hemispherical reflectivity ($R_{hemi}$) for several front and back reflectors was measured by using the following technique. A commercial six inch integrating sphere manufactured by Labsphere and made of Spectralon, with three mutually orthogonal ports, was used to illuminate samples and to determine hemispherical reflectivity. A stabilized light source illuminated the sphere through one port. A spot spectroradiometer (model PR650, available from Photo Research, Inc., Chatsworth, Calif.) was used to measure the sphere internal wall radiance through a second port. The sample was placed on the third port. Calibration of the integrating sphere wall radiance was done by using a known reflectance standard placed on the third port; sphere-wall radiance was measured with and without the calibration standard. $R_{hemi}$ was measured by placing a sample on third port. $R_{hemi}$ was then calculated by taking the ratio of the sphere wall radiance with and without sample, and employing a simple integrating sphere brightness-gain algorithm. This measurement of $R_{hemi}$ can be germane to recycling backlight cavity performance in that it is the all-angle input, all-angle output reflection, measured in a way much like that which occurs in an actual recycling cavity.

885 mm×498 mm Edge-Lit Backlight (40" Backlight Cavity)

The following examples were tested in a custom LED backlight test bed. The test bed was designed to simulate an LED-based area backlight for a 1016 mm (40") diagonal, 16:9 aspect-ratio, LCD panel. The hollow test bed backlight cavity had a bent sheet metal shell forming side walls and rear walls, with the long axis of the frame being placed horizontally. Both the top and bottom of the frame were open to allow for insertion of LED light engines. The internal cavity depth was 30 mm, with an approximately 5 mm bend radius at the back wall to side wall interface. The sheet metal used was commercial grade brushed aluminum with a thickness of 0.75 mm.

As is further described below, various front reflector films were each attached to 2.5 mm thick clear PMMA plates (Cyro Acrylite FF available from Cyro Corp., Rockaway, N.J.) by either static cling or through lamination with 3M OPT1™ optical transfer adhesive (available from 3M Company). The plates were attached to the hollow backlight cavity such that the front reflector faced into the cavity and the PMMA plate formed the outermost emissive surface of the test bed. The outer surface of the plate serves as the output surface for the test bed (i.e., the output surface of the backlight).

Five LED bars ("engines") were affixed to the bottom edge of the backlight frame. The bars along the bottom edge were arranged in a single row spanning the width of the backplane. Each bar had 5 red, 5 blue, and 10 green Lambertian Luxeon™ 3 LEDs (available from Lumileds, San Jose, Calif.) arranged in a repeating green-red-blue-green pattern in a single line on a standard flexible printed-circuit. The center-to-center spacing between LEDs on a single bar was about 8.5 mm. The center-to-center spacing between LEDs at the interface between engines was about 16 mm. The total length of a single light engine was 174 mm. The center to center pitch between light engines was approximately 180 mm. Each flexible printed circuit was thermally mounted to a heat sink using thermally conductive adhesive. The engines were run at approximately 55° C. at the base of the heat sink. Each heat sink included a fan.

The LEDs included the LUXEON III EMITTER RED LAMB (LXHL-PD09 LML), LUXEON III EMITTER GREEN LAMB (LXHL-PM09 LML), and LUXEON III EMITTER R-BLUE LAMB (LXHL-PRO9 LML) (available from Lumileds, San Jose, Calif.).

On a single bar, the green, red, and blue LEDs were electrically connected in series by color so that the output of each color could be varied independently to allow for adjusting the color balance of the test bed. Custom 4-channel power driver boards were used to drive the LEDs. One power supply channel provided the drive current to the red LEDs, one channel provided current to the blue LEDs, and two channels provided current to the green LEDs each channel driving 5 of the green LEDs. After stabilization, the LED currents were adjusted in each engine to result in a D65 white point for the mixed light.

Five different LED bars were also affixed to the top edge of the hollow test bed. The bars along the top edge were arranged in a single row spanning the width of the backplane. Each of these bars had 3 red, 3 blue, and 12 green Lambertian Luxeon™ 3 LEDs (available from Lumileds) arranged in a green-green-red-blue-green-green pattern in a single line on a standard flexible printed-circuit board. The center-to-center spacing between LEDs on a single bar was about 8.5 mm. The spacing between LEDs at the interface between engines was about 31 mm. The total length of a single light engine was 157 mm. The center to center pitch between light engines was approximately 180 mm.

On a single bar, the green, red, and blue LEDs were electrically connected in series by color so that the output of each color could be varied independently to allow for adjusting the color balance of the test bed. Custom 4-channel power driver boards were used to drive the LEDs. One power supply channel provided the drive current to the red LEDs, one channel provided current to the blue LEDs, and two channels provided current to the green LEDs each channel driving 6 of the green LEDs. The LED currents were adjusted in each engine to result in a D65 white point for the mixed light after the LCD panel, using an asymmetric reflective film having an average on-axis transmission of 11% to seal the cavity, and having bead-coated ESR as the back reflector. The engines were run at an approximately 55° C. temperature at the base of the heat sink. The approximate currents at which each light engine was run was red at 1.1 A, blue at 1.1 A, and each green at 0.44 A.

An aluminum wedge reflector was used to direct the light from each LED light engine into the hollow recycling cavity. The wedge included a taper that tapered from 7.8 mm at the base to 15.6 mm at the entrance to the backlight cavity. The length of the wedge was 47.3 mm. The central axis of the wedge was slightly tilted toward the back reflector.

The proximal edge of the wedge plate had holes to allow the LED lenses to extend through the plate. When mounted, the top surface of the plate was aligned with the bottom of the LED lenses. ESR was laminated to the inside of the wedge. Thus mounted, the film layer was substantially flat on each face of the wedge and acted as a focusing reflector directing the LED light into the cavity.

The performance of the test bed was measured using a colorimetric camera (model PM 1613F-1 available from Radiant Imaging, Inc., Duvall, Wash.). The camera was fitted with a 105 mm lens (Sigma EX 105 mm 1:2.8D DG Macro) and a ND2 neutral density filter. Unless specified, an absorptive polarizer (Sanritz 5516) was used in front of the camera lens with the pass axis of the polarizer aligned to match the pass axis of the front films. The software supplied by Radiant Imaging was used to calibrate the camera and take the measurements. Color and luminance calibration was done with the aid of a spot spectroradiometer (model PR650 available from Photo Research, Inc., Chatsworth, Calif. or a Minolta CS-100 from Konica Minolta Sensing Americas, Inc., Ramsey, N.J.). The test bed was placed in the vertical orientation, 5 meters in front of the camera. The test bed was aligned to the camera such that the axis of the camera lens was normal to the front plate and aimed approximately at the center of the test bed.

Measurement data was analyzed according to the Video Electronics Standards Association Flat Panel Display Measurements Standard Version 2.0. For cases with LCD backlight, section 306-1 "Sampled Uniformity & Color of White" was used. When no LCD was present on the backlight, a variant on the section 306-1 standard measurement coordinates and procedures were used, wherein the LCD panel was omitted.

Backlight constructions were measured by mounting the appropriate films (back reflector and front reflector) in the test bed and selecting which LED banks were turned on.

The LEDs were turned on and warmed up for at least 30 minutes prior to recording any measurements. Measurements were carried out by configuring the test bed with the films to be tested, and then using the colorimetric camera to take pictures of the test bed. The results were inspected visually and analyzed for properties such as total luminance, luminance uniformity, and color uniformity across the surface of the front plate.

Comparative Example 1

BGD Front Reflector

The 40" backlight cavity was configured having an Opalus BS-702 gain diffuser (available from Keiwa Corp., Tokyo, Japan) as the front reflector and ESR as the back reflector. The beaded gain diffuser was oriented so that the structured surface was external to the hollow cavity. The display was lit with only the bottom banks of LEDs.

The appearance of the output surface, i.e., the top of the diffuser sheet, was highly non-uniform. Horizontal bright and dark bands corresponding to the output of the injection wedge were observed about 3 to 8 inches from the injection edge. The overall brightness across the display decreased substantially with increasing distance from the injection wedge. A colorimetric image of the backlight was recorded using the PM 1613F-1 colorimetric camera as described above. The average luminance was 704 cd/m$^2$ and the VESA 9pt luminance uniformity was 37%. This display configuration is of limited usefulness because of the banding artifacts and the rapid brightness drop-off.

Example 1

ARF-89 Front Reflector and Brushed Aluminum Back Reflector

In this example, the 40" recycling cavity was formed from a front reflector that included ARF-89. The back reflector included brushed aluminum. The cavity depth was 30 mm. The sidewalls were also brushed aluminum. Only the bottom banks of LEDs were lit.

In appearance, this example was dark and demonstrated substantial vertical streaking of the image, with each streak imaging each individual LED. Individual red, green, and blue LEDs could be distinguished. A colorimetric image of the backlight was recorded using the PM 1613F-1 colorimetric camera as described above. The average luminance was 127 cd/m$^2$ and the VESA 9pt luminance uniformity was 65%. This display configuration would not be suitable for backlighting applications because of the color streaking and the brightness nonuniformity.

Example 2

ARF-89 Front Reflector and ESR Back Reflector

In this example, the 40" recycling cavity was formed from a front reflector formed from ARF-89 and a back reflector formed from ESR. No diffuser or diffuser film was included in the cavity or on the outside of the emitting surface. The cavity depth was 30 mm. The sidewalls were also ESR. Only the bottom banks of LEDs were lit.

A colorimetric image of the backlight was recorded using the PM 1613F-1 colorimetric camera as described above. The average luminance was 382 cd/m$^2$ and the VESA 9pt luminance uniformity was 17%. In appearance, this example demonstrated substantially the "hall of mirrors" effect, where the LEDs and the edges of the display were repeatedly imaged. This display configuration would not be suitable for backlighting applications because of the numerous artifacts.

Example 3

ARF-89 Front Reflector and BESR Back Reflector

The 40" recycling cavity was formed from a front reflector that included ARF-89 and a back reflector that included BESR. The cavity depth was 30 mm. The sidewalls were also covered with BESR. Only the bottom banks of LEDs were lit.

In appearance, this example demonstrated substantial uniformity improvement over the Comparative Examples. The bright banding seen in Comparative Example 1 was greatly diminished, nor were the color streaks seen that were observed in Example 1. The overall brightness across the display decreased by about a factor of 2 with increasing distance from the injection wedge; this decrease was gradual and smooth in appearance. A colorimetric image of the backlight was recorded using the PM 1613F-1 colorimetric camera as described above. The average luminance was 1492 cd/m$^2$ and the VESA 9pt luminance uniformity was 55%. This backlight configuration could be suitable for some lower performance backlight applications because of the smoothness of the decrease in brightness.

Example 4

ARF-89 Front Reflector and LEF Back Reflector

In this example, the 40" recycling cavity was formed from a front reflector that included ARF-89 and a back reflector that included LEF. The cavity depth was 30 mm. Only the bottom banks of LEDs were lit.

In appearance, this example demonstrated substantial uniformity improvement over the Comparative Examples. The bright banding was greatly diminished. The overall brightness across the display smoothly decreased by about a factor of 2 with increasing distance from the injection wedge. A colorimetric image of the backlight was recorded using the PM 1613F-1 colorimetric camera as described above. The average luminance was 1299 cd/m$^2$ and the VESA 9pt luminance uniformity was 46%. This backlight configuration could be suitable for some lower performance backlighting applications because of the smoothness of the decrease in brightness.

Example 5

ARF-89/BGD Front Reflector, ESR Back Reflector

The 40" recycling cavity was formed from a front reflector that included ARF-89 and a back reflector including ESR. A beaded gain diffuser film (Opalus BS-702) was included in the cavity with the beaded surface facing into the cavity and the back of the film contacting the front reflector. The cavity depth was 30 mm. The sidewalls were also ESR. Only the bottom banks of LEDs were lit.

In appearance, this example demonstrated substantial uniformity improvement over the Comparative Examples. The bright banding was greatly diminished. The overall brightness across the display decreased with increasing distance from the injection wedge. A colorimetric image of the backlight was recorded using the PM 1613F-1 colorimetric camera as described above. The average luminance was 1562 cd/m$^2$ and the VESA 9pt luminance uniformity was 75%. This backlight configuration could be suitable for some medium to high performance backlighting applications because of the smoothness of the decrease in brightness.

Examples 6a-f

Various Front Reflectors and BESR Back Reflector

In this example, the 40" recycling cavity was formed from a back reflector that included BESR and several different front reflectors that included the asymmetric reflective films shown in the following Table 3. The cavity depth was 30 mm. The sidewalls were also covered with BESR. Only the bottom banks of LEDs were lit.

TABLE 3

Front Reflectors

| Example | Front Reflector | VESA 9 pt. Luminance Uniformity (%) | Average Luminance (cd/m$^2$) |
|---|---|---|---|
| 6a | ESR | 46 | 52 |
| 6b | ARF-89 | 55 | 1492 |
| 6c | ARF-84 | 49 | 1872 |
| 6d | ARF-68 | 33 | 2474 |
| 6e | ARF-37 | 23 | 2419 |
| 6f | APF | 15 | 1921 |

In appearance, examples 6a-e demonstrated substantial uniformity improvement over the Comparative Examples. The following are visual observations for each of these examples:

6a. Negligible brightness banding, but very dim and colors were highly nonuniform, ranging from magenta at the bottom to blue at the top of the display.

6b. Slight amount of horizontal brightness banding observed. Substantially higher brightness than Example 6a. A slight color shift was observed between the bottom of the display and the top. This could make an acceptable backlight for lower performance applications because of the gradual brightness change.

6c. Somewhat noticeable amount of banding observed. This could make an acceptable backlight for lower performance applications because of the smoothness of the brightness change.

6d. Noticeable banding observed. This could make an acceptable backlight for very low performance applications because of the smoothness of the brightness change.

6e. Very noticeable amount of banding observed. Substantially higher brightness than Example 6a. This is unlikely to make a suitable backlight for any but the least demanding applications.

6f. Very noticeable amount of banding observed. Substantially higher brightness than Example 6a. This could make an acceptable backlight for lower performance applications because of the smoothness of the brightness change.

Example 7

ARF-89 Front Reflector and BESR Back Reflector

The 40" recycling cavity was set up in similar fashion to Example 3. In this case, however, both the bottom banks and top banks of LEDs were lit.

In appearance, this example demonstrated substantial uniformity improvement over the Comparative Examples. The bright banding was greatly diminished. The uniformity was improved over Example 3 as well. A colorimetric image of the backlight was recorded using the PM 1613F-1 colorimetric camera as described above. The average luminance was 2764 cd/m$^2$ and the VESA 9pt luminance uniformity was 84%. This backlight would be suitable for high performance applications.

Example 8

ARF-89 Front Reflector and BESR Back Reflector

In this example, the 40" recycling cavity was set up in similar fashion to Example 7. In this case, however, the Sanritz 5516 absorptive polarizer was removed from the image path.

In appearance, this example demonstrated substantial uniformity improvement over the Comparative Examples. The bright banding was greatly diminished. The uniformity was similar to that of Example 7. A colorimetric image of the backlight was recorded using the PM 1613F-1 colorimetric camera as described above. The average luminance was 3462 cd/m$^2$ and the VESA 9pt luminance uniformity was 84%. The average brightness was only 25% greater than Example 7; however, the brightness of the backlight of Example 8 would be expected to be 100% brighter than Example 7 if the backlight of Example 8 were unpolarized. That Example 8 exhibits only 25% greater brightness demonstrates that the backlight selectively polarizes light.

Example 9

ARF-89 Front Reflector and BESR Back Reflector

The 40" recycling cavity was set up in similar fashion to Example 7. In this case, however, a single set of 20 LEDs (1 engine) from the center bottom were turned off.

In appearance, this example demonstrated substantial uniformity improvement over the Comparative Examples. Visually, the region around the turned-off engine was somewhat dimmer, but not objectionable. A colorimetric image of the backlight was recorded using the PM 1613F-1 colorimetric camera as described above. The average luminance was 2677 cd/m$^2$ and the VESA 9pt luminance uniformity was 69%. This backlight would be suitable for many conventional applications.

Examples 10a-b

ARF-89/BGD Front Reflector and ESR Back Reflector

In Example 10a, the 40" recycling cavity was formed from a front reflector that included ARF-89 and a back reflector that included ESR. A beaded gain diffuser film (Opalus BS-702) was included in the cavity with the beaded surface facing into the cavity and the back of the film contacting the front reflector. The cavity depth was 30 mm. The sidewalls were also ESR. Both top and bottom banks of LEDs were lit.

A colorimetric image of the backlight was recorded using the PM 1613F-1 colorimetric camera as described above. The average luminance was 4605 cd/m$^2$ and the VESA 9pt luminance uniformity was 86%. This backlight would be suitable for high performance applications. No visual artifacts were observed.

For Example 10b, a 40" diagonal LCD panel was placed in front of the emitting surface of the backlight of Example 10a.

The LCD panel was from a Samsung model LNR-408D television (available from Samsung Electronics America, Inc., Ridgefield Park, N.J.), which, according to Samsung's literature, uses Samsung's Patterned Vertical Alignment (PVA) technology. The original LCD television was disassembled and the LCD panel and necessary drive electronics were extracted for independent use over the LED backlight of Example 10A.

The LCD panel was turned on and driven in the fully on white state. A colorimetric image of the display was recorded using the PM 1613F-1 colorimetric camera as described above. The average luminance was 567 cd/m² and the VESA 9pt luminance uniformity was 84%. This backlight would be suitable for high performance applications. Again, no obvious visual artifacts were detected.

Examples 11a-b

ARF-68/BGD Front Reflector and ESR Back Reflector with CCFL Light Sources

For Example 11a, a 19" diagonal recycling cavity was formed from a front reflector that included ARF-68 and a back reflector that included ESR. A beaded gain diffuser film (Opalus BS-702) was included in the cavity with the beaded surface facing into the cavity and the back of the film contacting the front reflector. The cavity depth was 0.4 inches (10 mm). The sidewalls were also ESR. Both top and bottom pairs of CCFL bulbs were lit.

A colorimetric image of the backlight was recorded using the PM 1613F-1 colorimetric camera as described above. The average luminance was 1394 cd/m² and the VESA 9pt luminance uniformity was 39%. In this case, visual artifacts due to film nonuniformities were seen. These consisted of diagonal striations across the display and a greenish hue in one half of the display. As a consequence of these defects and the brightness nonuniformity, this would not make a suitable high performance display. However, it does demonstrate that the films can be used with CCFL backlights.

For Example 11b, a 19" diagonal LCD panel was placed in front of the emitting surface of the backlight of Example 11a. The LCD panel was from a Samsung model 940BW (available from Samsung Electronics America, Inc.), which, according to their literature, is a TFT-LCD. The original LCD display was disassembled and the LCD panel and necessary drive electronics were extracted for independent use over the LED backlight of Example 11a.

The LCD panel was turned on and driven in the fully on white state. A colorimetric image of the display was recorded using the PM 1613F-1 colorimetric camera as described above. The average luminance was 217 cd/m² and the VESA 9pt luminance uniformity was 38%. The backlight looked very much like that of Example 11a; however, the backlight appeared to be more dim than that of Example 11a.

Examples 12a-f

Examples 6a-f with Two Sided Illumination

Examples 6a-f were tested with both the top and bottom banks of LEDs lit. Table 4 is a summary of the resulting data.

TABLE 4

| Example | Front Reflector | VESA 9 pt Luminance Uniformity (%) | Average Luminance (cd/m²) |
|---|---|---|---|
| 12a | ESR | 56 | 92 |
| 12b | ARF-89 | 84 | 3402 |
| 12c | ARF-84 | 84 | 4361 |
| 12d | ARF-68 | 62 | 4340 |
| 12e | ARF-37 | 50 | 3385 |
| 12f | APF | 38 | 1010 |

In appearance, 12a-e demonstrated substantial uniformity improvement over the Comparative Examples. The following are visual observations for each of these examples:

12a. Negligible brightness banding, but very dim and colors were highly nonuniform, ranging from magenta at the bottom to blue at the top of the display.

12b. No horizontal brightness banding observed. Example exhibited substantially higher brightness than Example 12a. A slight color shift was observed between the bottom of the display and the top. This could make an acceptable backlight for higher performance applications because of the gradual brightness change and its overall brightness uniformity.

12c. No horizontal brightness banding observed. Colors appear uniform. This could make an acceptable backlight for higher performance applications because of the gradual brightness change and its overall brightness uniformity.

12d. Slightly noticeable horizontal brightness banding observed. This could make an acceptable backlight for medium performance applications because of the gradual brightness change and its overall brightness uniformity.

12e. Some horizontal brightness banding observed. This could make an acceptable backlight for very low performance applications because of the smoothness of the brightness change.

12e. Noticeable amount of horizontal brightness banding observed. This could make an acceptable backlight for very low performance applications because of the smoothness of the brightness change.

Comparative Example 2

APF/BGD Front Reflector and ESR Back Reflector

In this example, a 40" backlight was formed in a manner similar to that of Example 5. The backlight included a front reflector that included APF and a back reflector that included ESR. A beaded gain diffuser (Opalus BS-702) was included in the cavity with the structured surface facing into the cavity and the back of the film contacting the APF. The cavity depth was 30 mm. The sidewalls were also ESR. Both the top and bottom banks of LEDs were lit.

In appearance, this example demonstrated substantial uniformity improvement over the Comparative Example 1. Moderate bright banding was still observed. A colorimetric image of the backlight was recorded using the PM 1613F-1 colorimetric camera as described above. The average luminance was 3844 cd/m² and the VESA 9pt luminance uniformity was 78%. The color uniformity appeared to be very good. This backlight would be suitable for moderate performance backlighting applications. The brightness banding would likely make it unsuitable for high-performance applications.

Example 13

708 mm×398 mm Edge-Lit Backlight

The following example was tested in a custom LED backlight test bed. The test bed was designed as an LED-based area backlight for a 813 mm (32") diagonal, 16:9 aspect-ratio, LCD television. The hollow test bed backlight cavity had a bent sheet metal shell forming side walls and rear walls, with the long axis of the frame being placed horizontally. Slots were cut into the back reflector to allow for insertion of LED light engines. The internal cavity depth was 19 mm, with an approximately 5 mm bend radius at the back wall to side wall interface. The sheet metal used was commercial grade brushed aluminum with a thickness of 1 mm.

The front reflectors included 5×ARF laminated to a 0.005" (0.127 mm) thick 12% Haze PC sheet using 3M OPT1™ optical transfer adhesive (available from 3M Company). The final layer on the laminate stack was an Opalus™ BS-702 beaded gain diffuser.

The low-birefringence, low haze, polycarbonate film used was 0.005" thick (0.127 mm) with a 12% haze level (Iupilon™ Film, Grade FE-2000 MOS, Mitsubishi Engineering-Plastics Corp., Tokyo, Japan). In all cases it was laminated to the front reflector with the textured surface facing in towards the adhesive.

The plates were attached to the hollow backlight cavity such that the beaded gain diffuser faced into the hollow cavity and the polycarbonate surface formed the outermost emissive surface of the test bed. The outer surface of the plate served as the output surface for the test bed (i.e., the output area of the backlight).

Four LED bars ("engines") were affixed to the backside, bottom edge of the sheet metal shell. The bars along the bottom edge were arranged in a single row spanning the width of the backplane. Each bar had 4 red, 2 blue, 6 green, and 6 white Lambertian Cree XR-E LEDs (Cree Inc., Durham, N.C.) arranged in a GRGBGR-WWWWWW-RGBGRG pattern in a single line on a standard flexible printed-circuit. Model numbers for the LEDs were as follows: Red (XR7090RD-L1-0001), Green (XR7090GR-L1-0001), Blue (royal blue, XR7090RY-L1-0001), and White (XREWHT-L1-0802).

The center-to-center spacing between LEDs on a single bar was about 9.5 mm. The total length of a single light engine (bar) was 170 mm. The center to center pitch between light engines was approximately 175 mm.

On a single bar, the red, green, blue, and white LEDs were electrically connected in a single series. Each bar was run at 700 mA current using a current regulated power supply. Each flexible printed circuit was thermally mounted to a heat sink using thermally conductive adhesive. Fans were used to cool the heat sinks to an approximate 50 C operating temperature at the base of the heat sink.

An aluminum "reverse" wedge reflector was used to direct the light from each LED light engine into the hollow recycling cavity. (See PCT Publication No. WO2008/144650.

The LED engines were mounted on the backside of the cavity, with the LEDs protruding somewhat into the cavity through drilled holes. The back reflector plate had holes to allow the LED lenses to extend through the plate. When mounted, the top surface of the plate was aligned with the bottom of the LED lenses.

ESR was laminated to all inner surfaces of the hollow cavity including the inside of the wedge and the redirector mirrors.

Thus mounted, the film layer was substantially flat on each face of the wedge and acted as a focusing reflector directing the LED light into the cavity.

The cavity was inserted behind an LCD panel from a Samsung 32 inch diagonal TV.

The LCD panel was turned on and driven in the fully on white state. A colorimetric image of the display was recorded using the PM 1613F-1 colorimetric camera as described above. The average luminance was 432 cd/m$^2$ and the VESA 9pt luminance uniformity was 70%. The color uniformity was very good and no bright banding was observed.

Example 14

708 mm×398 mm Edge-Lit Backlight

An additional display was constructed in a similar fashion to Example 13. In this example a 23 inch diagonal monitor was retrofitted with a hollow edge-lit LED light guide. Width and height dimensions were adjusted to fit the 23 inch diagonal monitor; however, the thickness remained 19 mm. The monitor was a Apple Cinema Display made by Apple Computer, Cupertino, Calif., and was originally backlit by CCFL bulbs. The CCFL backlight was removed as were all optical films behind the LCD.

The LEDs used in this case were OSRAM G6-SP series RGB LEDs. Configuration was GRGBGRG with 6 repeat units per engine.

The reverse wedge construction of Example 13 was used. The reverse wedge had the same dimensions as in Example 13.

The LCD panel was turned on and driven in a fully on white state. An image was collected with the Prometric camera. A colorimetric image of the backlight was recorded using the PM 1613F-1 colorimetric camera as described above. The average luminance was 150 cd/m$^2$ and the VESA 9pt luminance uniformity was 84%. The color uniformity was very good, and no bright banding was observed.

Example 15

7 inch DVD Player with ARF-68 Front Reflector and BESR Back Reflector

A 7 inch diagonal wide format Zenith DVD player was retrofitted with a hollow edge-lit light guide. A Zenith Model DVP615 Portable DVD Player (distributed by LG Electronics USA, Englewood Cliffs, N.J.) was disassembled and the solid light guide removed. A 4 mm deep hollow cavity was made by lining the inside of the gutted light guide metal housing with BESR (only tacked with adhesive in the corners). All remaining inside surfaces were covered with ESR so as to make side wall reflectors as well. No injection wedge was used.

The original 27 Lambertian white LEDs were domed using 3M photocurable silicone PSE-002. The LED circuit board strip, which included 27 Lambertian white LEDs, was adhered to the bottom edge of the metal frame using double-stick tape. A second set of 27 LEDs was installed along the upper edge of the metal frame using parts removed from an identical model DVD player. The two LED strips were wired in parallel.

Black tape was used on the top and bottom ⅓ inch (8.5 mm) of the LCD panel to mask the LED punch-through. ARF-68 was laminated to the back surface of the LCD panel using OPT1™ adhesive; the film was aligned such that the pass axis of the film was aligned with the pass axis of the LCD rear polarizer. The portable DVD player was reassembled.

The LCD panel was turned on and driven in the fully on white state. The color uniformity was very good, and no bright banding was observed.

273 mm×151 mm Edge-Lit Backlights

The following examples were measured using an edge-lit backlight that was a rectangular box about 273 mm by 151 mm with an internal thickness of about 25.4 mm.

The backlight was illuminated by 4 red LEDs (Luxeon III LXHL-PD09), 8 green LEDs (Luxeon III LXHL-PM09), and 4 blue LEDS (Luxeon III LXHL-PR09) for a total of 16 LEDs. The LEDs were linearly arranged on a circuit board in red-green-blue-green clusters with 8.5 mm center-to-center spacing between the LEDs. The LEDs were powered by a custom constant-current drive circuit. All of the LEDs of a given color were driven at approximately the same current. The white point of the backlight is approximately u'=0.21 and v'=0.45. The currents used were 1.4 A for red, 700 mA for green and 700 mA for blue.

The LED light source was attached to one of the short sides of the box. The LEDs were oriented with the central axis pointing into the cavity (parallel to the output face of the backlight). Light injection from the LEDs into the backlight cavity was facilitated by a wedge tapering from 18.6 mm at the base to 25.3 mm at the entrance to the backlight cavity. The length of the wedge was 25.4 mm.

The inside of the distal-end side reflector (sidewall opposite the light sources) of the backlight was covered with BESR. The inside of all the other sidewalls of the backlight, including the inside of the wedge, was covered with ESR. The back reflector included either 2×TIPS, ESR, or BESR. These materials served as the back reflectors for the cavity and were extended to touch the sidewalls to minimize light leaks.

Uniformity measurements were conducted using the PM-9913E colorimetric camera. The backlight was mounted vertically at a distance of 5 m from the camera. A Nikon 300 mm lens at f/4 was used along with the internal ND2 filter to collect the images.

Comparative Example 3

APF Front Reflector BESR Back Reflector

The front reflector included APF that was held in place against the rim of the backlight with double-stick tape. The back of the backlight was covered with bead-coated ESR to form the back reflector.

Figure 19:
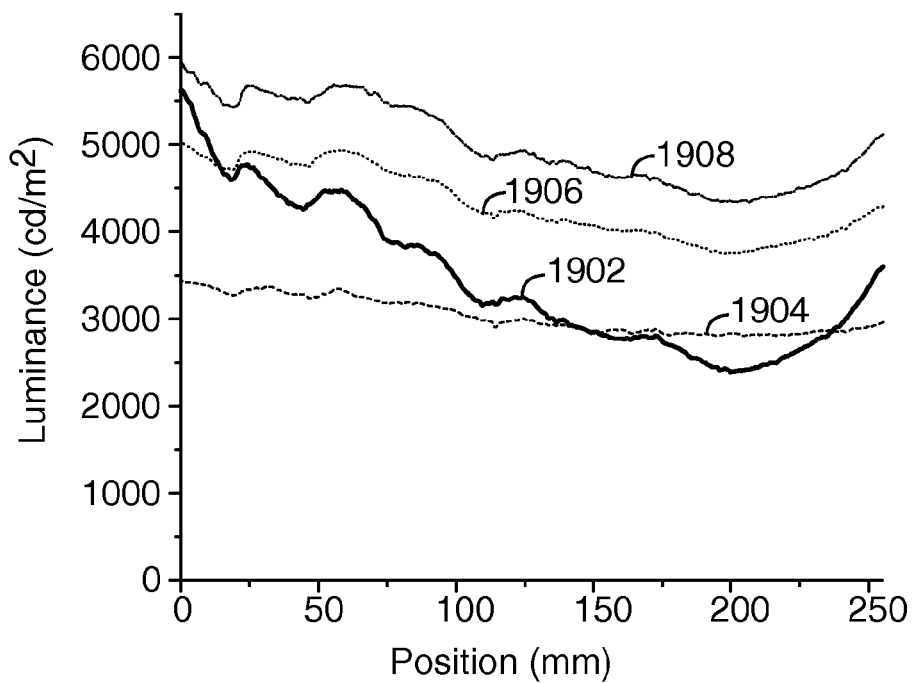
FIG. 19 is a graph of luminance versus position for several embodiments of front reflectors in an edge-lit backlight.

All of the LEDs were powered and the luminance was measured. The illumination was not uniform and appeared brighter at the end closest to the LEDs. Near the LEDs the color also appeared to vary across the backlight with one side appearing more blue and the other side appearing more red relative to the center. A colorimetric image of the backlight was recorded using the PM 9913E-1 colorimetric camera as described above. The average luminance was 3395 cd/m$^2$; the VESA 9pt luminance uniformity for the entire system was approximately 54%; and the VESA 9pt color nonuniformity was 0.0287. The luminance cross section at the lateral line along the long-direction of the backlight is shown in FIG. 19 as curve 1902. For the graph, the data has been smoothed by applying a 2 mm diameter averaging filter. On this graph, the light source is located at 0 mm.

Example 16

ARF-89 Front Reflector and BESR Back Reflector

The output surface of the backlight was covered by an ARF-89 film as the front reflector, which was held in place against the rim of the backlight with double-stick tape. For the back reflector, the back of the backlight was covered with BESR.

All of the LEDs were powered and the luminance was measured. The illumination appeared very uniform across the width and the length of the backlight. The color also appeared uniform across the backlight. A colorimetric image of the backlight was recorded using the PM 9913E-1 colorimetric camera as described above. The average luminance was 3007 cd/m$^2$; the VESA 9pt luminance uniformity for the entire system was approximately 83%; and the VESA 9pt color nonuniformity was 0.0161. The luminance cross section at the lateral line along the long-direction of the backlight is shown in FIG. 19 as curve 1904. For the graph, the data has been smoothed by applying a 2 mm diameter averaging filter. On this graph, the light source is located at 0 mm.

Example 17

ARF-68 Front Reflector and BESR Back Reflector

The output surface of the backlight was covered by an ARF-68 film to form the front reflector, which was held in place against the rim of the backlight with double-stick tape. The back reflector included BESR.

All of the LEDs were powered and the luminance was measured. The illumination appeared uniform across the width and the length of the backlight, as did the color. A colorimetric image of the backlight was recorded using the PM 9913E-1 colorimetric camera as described above. The average luminance was 4225 cd/m$^2$; the VESA 9pt luminance uniformity for the entire system was approximately 80%; and the VESA 9pt color nonuniformity was 0.0180. The luminance cross section at the lateral line along the long-direction of the backlight is shown in FIG. 19 as curve 1906. For the graph, the data has been smoothed by applying a 2 mm diameter averaging filter. On this graph, the light source is located at 0 mm.

Example 18

4×ARF Front Reflector and BESR Back Reflector

The front reflector included 4×ARF that was held in place against the rim of the backlight with double-stick tape. The back reflector included BESR.

All of the LEDs were powered and the luminance was measured. The illumination appeared uniform across the width and the length of the backlight, as did the color. A colorimetric image of the backlight was recorded using the PM 9913E-1 colorimetric camera as described above. The average luminance was 4921 cd/m$^2$; the VESA 9pt luminance uniformity for the entire system was approximately 79%; and the VESA 9pt color nonuniformity was 0.0143. The luminance cross section along the lateral line along the long-direction of the backlight is shown in FIG. 19 as curve 1908. For the graph, the data has been smoothed by applying a 2 mm diameter averaging filter. On this graph, the light source is located at 0 mm.

Example 19

4×ARF Front Reflector and 2×TIPS Back Reflector

The output surface of the backlight was covered by 4×ARF, which was held in place against the rim of the backlight with double-stick tape to form the front reflector. The back of the backlight was covered with a 2×TIPS to form the back reflector.

All of the LEDs were powered and the luminance was measured. The illumination was not uniform and appeared brighter at the end closest to the LEDs. The color appeared uniform across most of the backlight except for a few narrow stripes of color observed along one side of the backlight near the LEDs. A colorimetric image of the backlight was recorded using the PM 9913E-1 colorimetric camera as described above. The average luminance was 5398 cd/m$^2$; the VESA 9pt luminance uniformity for the entire system was approximately 63%; and the VESA 9pt color nonuniformity was 0.0163.

Example 20

ARF-89 Front Reflector and BESR Back Reflector

The output region of the backlight was covered by ARF-89. The film was held in place against the rim of the backlight with double-stick tape to form the front reflector. The back of the backlight was covered with BESR to form the back reflector.

The green LEDs in the backlight were divided into two independent banks that could be powered separately. All of the green LEDs on one side of the lateral line of the backlight were connected to one power circuit and all of the green LEDs on the other side of the lateral line of the backlight were connected to a different power circuit. For this Example, both banks of green LEDs were powered and the luminance was measured. The entire output area appeared uniformly illuminated. A colorimetric image of the backlight was recorded using the PM 9913E-1 colorimetric camera as described above. The average luminance was 1985 cd/m$^2$ and the VESA 9pt luminance uniformity for the entire system was approximately 79%.

Example 21

ARF-89 Front Reflector and BESR Back Reflector

The output region of the backlight was covered by ARF-89. The film was held in place against the rim of the backlight with double-stick tape to form the front reflector. The back of the backlight was covered with BESR to form the back reflector.

One bank of green LEDs was powered and the other was left off. A colorimetric image of the backlight was recorded using the PM 9913E-1 colorimetric camera as described above. The luminance was measured. The average luminance was 963 cd/m$^2$ and the VESA 9pt luminance uniformity for the entire system was approximately 74%. The luminance decreased by 50% because only half of the light sources were on, yet the uniformity barely changed. This indicates that the backlight provided excellent light spreading.

Comparative Example 4

APF/BGD Front Reflector and ESR Back Reflector

The output region of the backlight was covered with two films that formed the front reflector. The first film was BGD with the beaded surface facing the back reflector of the backlight. The second film was APF that was held in place against the rim of the backlight with double-stick tape. The back of the backlight was covered with ESR to form the back reflector.

All of the LEDs were powered and the luminance was measured. The backlight output was more uniform than Comparative Example 2 but still appeared brighter at the end closest to the LEDs, getting dimmer near the middle and then brighter again at the distal end. The color variation observed in Comparative Example 2 was still visible. A colorimetric image of the backlight was recorded using the PM 9913E-1 colorimetric camera as described above. The average luminance was 3415 cd/m$^2$; the VESA 9pt luminance uniformity for the entire system was approximately 74%; and the VESA 9pt color nonuniformity was 0.0271. Note that the luminance uniformity was improved relative to Comparative Example 2, but the color uniformity did not improve.

Example 22

ARF-68/BGD Front Reflector and ESR Back Reflector

The output region of the backlight was covered with two films that formed the front reflector. The first film was BGD with the beaded surface facing the back reflector of the backlight. The second film was ARF-68. The beaded gain diffuser and the asymmetric reflective film were held in place against the rim of the backlight with double-stick tape. The back of the backlight was covered with ESR to form the back reflector.

All of the LEDs were powered and the luminance was measured. The illumination appeared uniform across the length and width of the backlight, as did the color. A colorimetric image of the backlight was recorded using the PM 9913E-1 colorimetric camera as described above. The average luminance was 3881 cd/m$^2$; the VESA 9pt luminance uniformity for the entire system was approximately 83%; and the VESA 9pt color nonuniformity was 0.0159.

Example 23

ARF-68/BGD Front Reflector and ESR Back Reflector

The output surface of the backlight was covered with two films. The first film was BGD with the beaded surface facing away from the back reflector (toward the second film). The second film was ARF-68, which was held in place against the rim of the backlight with double-stick tape to form the front reflector. The back of the backlight was covered with ESR to form the back reflector.

All of the LEDs were powered and the luminance was measured. The illumination appeared uniform across the length and width of the backlight, as did the color. A colorimetric image of the backlight was recorded using the PM 9913E-1 colorimetric camera as described above. The average luminance was 3868 cd/m$^2$; the VESA 9pt luminance uniformity for the entire system was approximately 83%; and the VESA 9pt color nonuniformity was 0.0164.

Example 24

ARF-68 Front Reflector and ESR/BGD Back Reflector

The output region of the backlight was covered with ARF-68, which was held in place against the rim of the backlight with double-stick tape to form the front reflector. The back of the backlight was covered with ESR, and a sheet of beaded gain diffuser (Opalus BS-702) was placed on top of the specular mirror with the beaded surface facing the front reflector. The ESR and the BGD formed the back reflector.

All of the LEDs were powered and the luminance was measured. The illumination was not uniform and appeared brighter at the end closest to the LEDs; however, the color appeared uniform across the backlight. A colorimetric image of the backlight was recorded using the PM 9913E-1 colorimetric camera as described above. The average luminance was 3871 cd/m$^2$; the VESA 9pt luminance uniformity for the entire system was approximately 60.7%; and the VESA 9pt color nonuniformity was 0.0163.

304 mm×152 mm Zoned Direct-Lit Backlight

The direct-lit backlight of the following examples was a rectangular box about 304 mm×152 mm and having an internal thickness of about 40 mm.

The backlight was illuminated by 2 red LEDs (Lumileds LXHL-PD09), 4 green LEDs (Lumileds LXHL-PM09), and 2 blue LEDs (Lumileds LXHL-PR09) for a total of 8 LEDs. The LEDs were arranged in two separate clusters on small circuit boards. Each cluster used one red, two green, and one blue LED arranged in a diamond pattern with the red and blue LEDs separated by about 10 mm and the green LEDs separated by about 16 mm. One cluster of LEDs was centered between the long sides and 76 mm from one of the short sides. The other cluster was centered between the long sides and 229 mm from the same short side. The circuit boards were affixed to an aluminum support plate and the sidewalls were attached to this same plate.

The LEDs were powered by a custom constant-current drive circuit. Each cluster was driven by a separate circuit so that they could be powered independently. The circuit allowed for the current to each of the LEDs to be adjusted to achieve a desired color point. The current through each color of LEDs was adjusted to set the overall light output at a white point of approximately u'=0.210 and v'=0.473.

The LED circuit board was mounted to a metal plate to which the sidewalls of the cavity were also attached. The inner sidewalls of the backlight were covered with ESR. A partition was placed between the long sides of the cavity to divide the backlight into two halves. Each half was roughly square and had inside dimensions of 152 mm×152 mm. The partition was made from BESR. The film was folded in half with the beaded side facing out. Double stick tape was used to hold the partition in the folded position. The partition was trimmed to be 40 mm tall and 154 mm wide. The long sidewalls had slots cut in them to hold the partition in the proper place.

The back reflector was formed by laminating 2×TIPS to a thin polycarbonate plate to provide support. Holes in the back reflector allowed the lens portion of the LEDs to protrude and the polycarbonate side of the reflector was affixed to the aluminum support plate with double-stick tape. The highly reflective diffuse material of the back reflector extended beyond the edge of the polycarbonate plate and curved slightly up on to the sidewalls to minimize light leaks.

The top of the backlight cavity was open. The thickness of the cavity was determined as the distance from the inside surface of the back reflector to the top edge of the sidewalls.

Uniformity measurements were conducted using the PM-9913E colorimetric camera in the manner described above. The backlight was mounted horizontally at a distance of 0.5 m from the camera. A Sigma 50 mm lens at f/11 was used to collect the images.

Comparative Example 5

Diffuser Plate and 2×TIPS Back Reflector

The output surface of the backlight was covered by a diffuser plate (DR-65C, available from Astra Products, Baldwin, N.Y.).

The two halves of the backlight were divided by a partition as described above; however, the partition was only 35 mm high and positioned to touch the back reflector.

Figure 20:
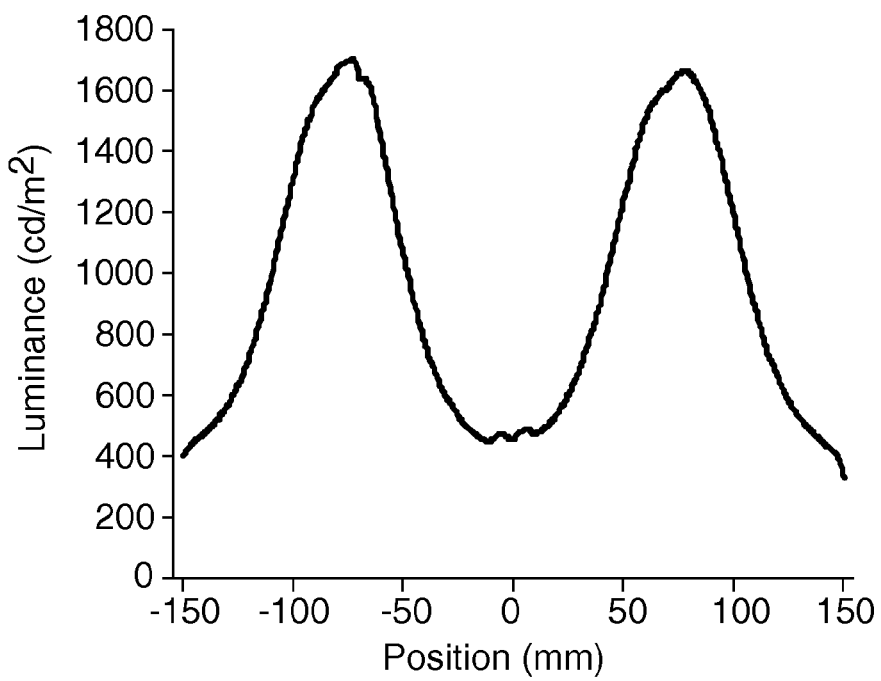
FIGS. 20-27 are graphs of luminance versus position for several embodiments of front reflectors in an edge-lit backlight.

Both clusters were powered and the luminance was measured. A large variation in luminance was observed across the output area. The VESA 9pt luminance uniformity for the entire system was approximately 53%. The VESA 9pt luminance uniformity was also calculated for the two halves individually (e.g., the 9 pts were all located within the square region formed by the sidewalls and the partition). The VESA 9pt luminance uniformity for one side was approximately 21% and for the other side was approximately 23%. The luminance cross section is shown in FIG. 20. For the graph, the data has been smoothed by applying a 2 mm wide averaging filter. On this graph, the partition is located at 0 mm.

Example 25

Bead-Coated ARF-84 Front Reflector and 2×TIPS Back Reflector

The diffuser plate used in Comparative Example 5 was removed and the output surface of the backlight was covered by ARF-84. The film also included a bead coating on the output side of the film that was formed using the techniques described herein. Double-stick tape was used around the top of the sidewalls to hold the film in place, thereby forming the front reflector.

A circle of APF was placed over each cluster of LEDs in the backlight. The circle was slightly larger than the cluster diameter (approximately 20 mm) and the pass axis was oriented so that it was orthogonal to the pass axis of the front reflector.

Figure 21:
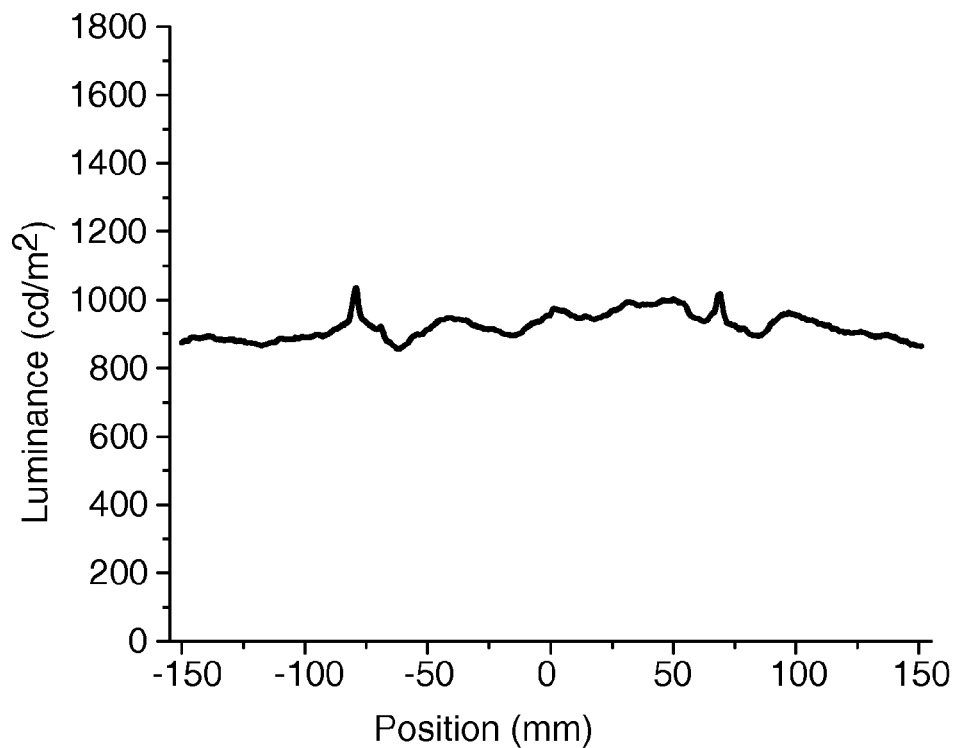

Both clusters were powered and the luminance was measured. The entire output area appeared uniformly illuminated. The VESA 9pt luminance uniformity for the entire system was approximately 88%. The VESA 9pt luminance uniformity was also calculated for the two halves individually (e.g., the 9 pts were all located within the square region formed by the sidewalls and the partition). The VESA 9pt luminance uniformity for one side was approximately 89% and for the other side was approximately 88%. The luminance cross section is shown in FIG. 21. For the graph, the data has been smoothed by applying a 2 mm wide averaging filter. On this graph, the partition is located at 0 mm.

Example 26

Bead-Coated ARF-84 Front Reflector and 2×TIPS Back Reflector

Figure 22:
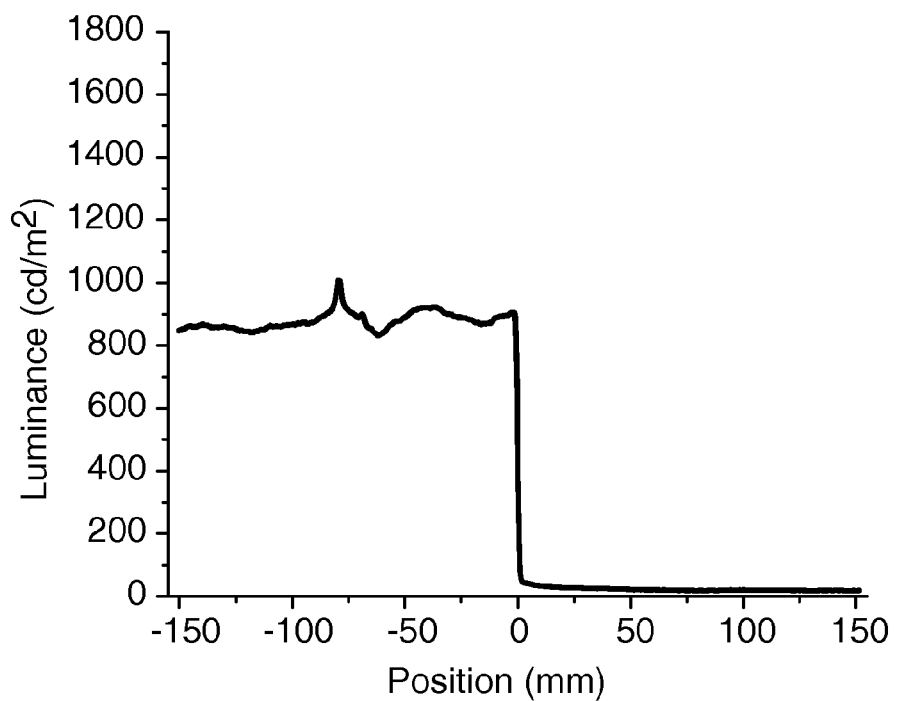

The system from Example 25 was used. One cluster of LEDs was turned on and the other one was turned off. The lit side of the backlight appeared uniformly illuminated and the other side appeared uniformly dark. The lit side had an average luminance of approximately 869 cd/m$^2$ and the dark side had an average luminance of approximately 22 cd/m$^2$. Within the lit region (applying the analysis to only the lit half of the backlight), the VESA 9 pt luminance uniformity was approximately 87%. Within the dark region (applying the analysis to only the dark half of the backlight), the VESA 9 pt luminance uniformity was approximately 62%. The luminance cross section is shown in FIG. 22. For the graph, the data has been smoothed by applying a 2 mm wide averaging filter. On this graph, the partition is located at 0 mm.

263 mm×147 mm Direct-Lit Backlight

The direct-lit backlight for the following examples included a rectangular box about 263 mm×147 mm and had an internal thickness of about 18 mm.

The backlight was illuminated by 66 red LEDs (Nichia Rigel NESR036C), 66 green LEDs (Nichia Rigel NFSG036B), and 66 blue LEDs (Nichia Rigel NFSB036B) for a total of 198 LEDs. The LEDs were arranged on a circuit board in red-green-blue clusters on a square lattice with 25 mm center-to-center spacing between the clusters. The LEDs were powered by a custom constant-current drive circuit. All of the LEDs of a given color were driven at approximately the same current. The current through each color of LEDs was adjusted to set the overall light output at a white point of approximately u'=0.209 and v'=0.476. The currents used (after 30 minutes to reach thermal equilibrium) were 29.5 mA for red, 28.8 mA for green and 7.4 mA for blue.

The LED circuit board was mounted to a metal plate to which the sidewalls of the cavity were also attached. The inner sidewalls of the backlight were covered with ESR. The portion of the circuit board that faced the inside of the backlight cavity was covered with 2×TIPS. This material served as the back reflector for the cavity and extended to touch the sidewalls to minimize light leaks.

The top of the backlight cavity was covered with a diffuser plate (DR-55C, 2.0 mm thick, available from Astra Products, Baldwin, N.Y.). The thickness of the backlight cavity was determined as the distance from the inside surface of the back reflector to the bottom of the diffuser plate.

Uniformity measurements were conducted using the PM-9913E colorimetric camera in the manner described above. The backlight was mounted vertically at a distance of 5 m from the camera. A Nikon 300 mm lens at f/4 was used along with the internal ND2 filter to collect the images.

Comparative Example 6

Diffuser Plate and 2×TIPS Back Reflector

The illumination output area of the direct-lit backlight was covered by a diffuser plate (DR-55C). The backlight was not uniform and showed a periodic variation in brightness with the same pattern as the LEDs.

Figure 23:
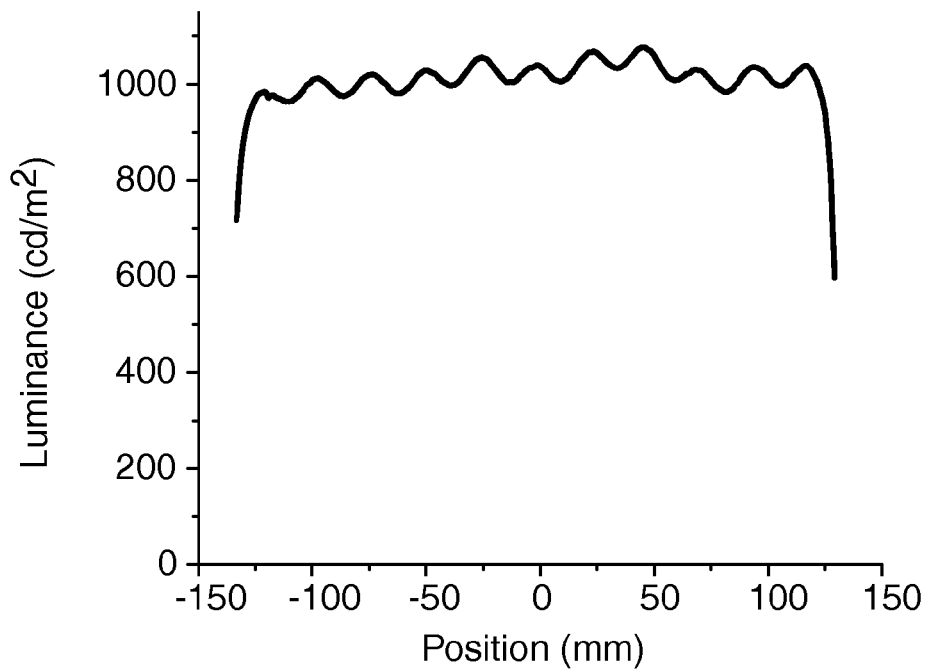

The average luminance (measured through the absorbing polarizer) was 969 cd/m². The VESA 9pt luminance uniformity was not a useful measure for capturing the periodic nonuniformity. The luminance cross section is shown in FIG. 23 taken at a position directly over a row of LEDs. For the graph, the data has been smoothed by applying a 2 mm wide averaging filter.

Comparative Example 7

DBEF with Diffuser Plate

The output surface of the direct-lit backlight was covered by a diffuser plate (DR-55C). A layer of DBEF-D400 (available from 3M Company) was placed over the diffuser plate. The backlight was more uniform than in Comparative Example 6, but still showed a periodic variation in brightness with the same pattern as the LEDs.

Figure 24:
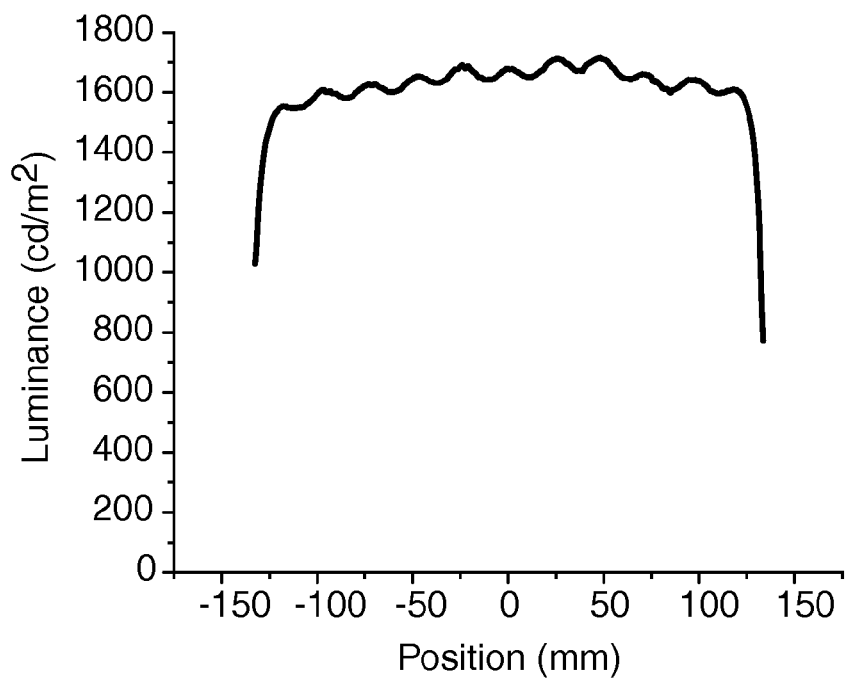

The average luminance (measured through the absorbing polarizer) was 1543 cd/m², representing a gain of 1.59 over the diffuser plate only backlight in Comparative Example 6. The VESA 9pt luminance uniformity was not a useful measure for capturing the periodic nonuniformity. The luminance cross section is shown in FIG. 24 taken at a position directly over a row of LEDs. For the graph, the data has been smoothed by applying a 2 mm wide averaging filter.

Example 27

Diffuser Plate and ARF-37 Front Reflector and 2×TIPS Back Reflector

The output surface of the direct-lit backlight was covered by a diffuser plate (DR-55C). ARF-37 laminate between 2 layers of polycarbonate (one side used 5 mil PC with 12% haze facing out and the other side used 5 mil PC with 20% haze facing out) was placed over the diffuser plate to form the front reflector. The back reflector was formed from 2×TIPS. The backlight was more uniform than in Comparative Example 6, and the periodic variation in brightness was less visible.

Figure 25:
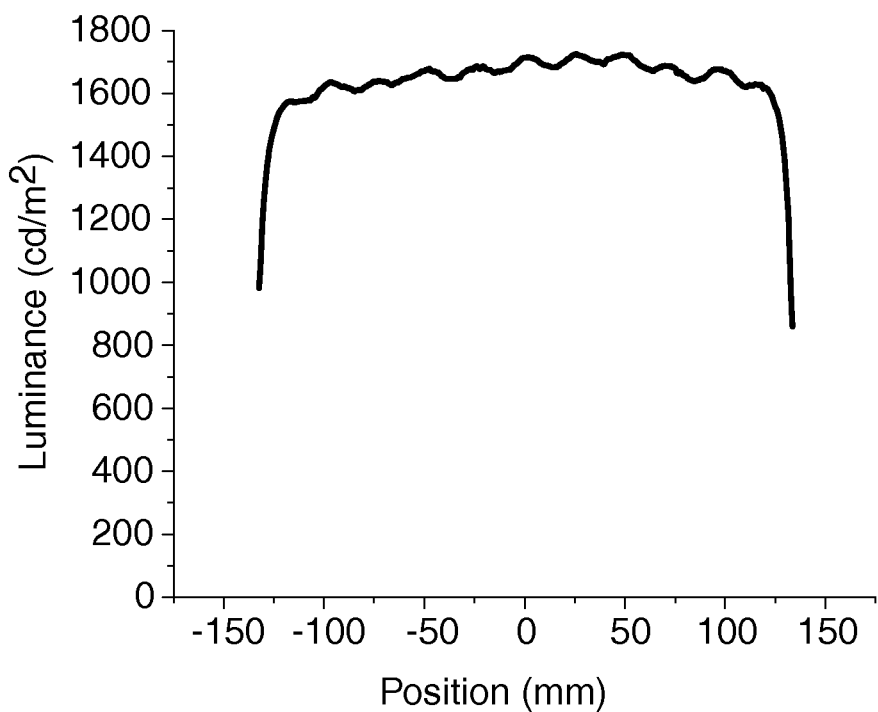

The average luminance (measured through the absorbing polarizer) was 1555 cd/m², representing a gain of 1.60 over the diffuser plate only in Comparative Example 6. The VESA 9pt luminance uniformity was not a useful measure for capturing the periodic nonuniformity. The luminance cross section is shown in FIG. 25 taken at a position directly over a row of LEDs. For the graph, the data has been smoothed by applying a 2 mm wide averaging filter.

Example 28

Diffuser Plate and 3×ARF Front Reflector and 2×TIPS Back Reflector

The output surface of the direct-lit backlight was covered by a diffuser plate (DR-55C). 3×ARF was placed over the diffuser plate to form the front reflector. The back reflector was formed from 2×TIPS. The backlight was more uniform than in Example 25, and the periodic variation in brightness was difficult to see.

Figure 26:
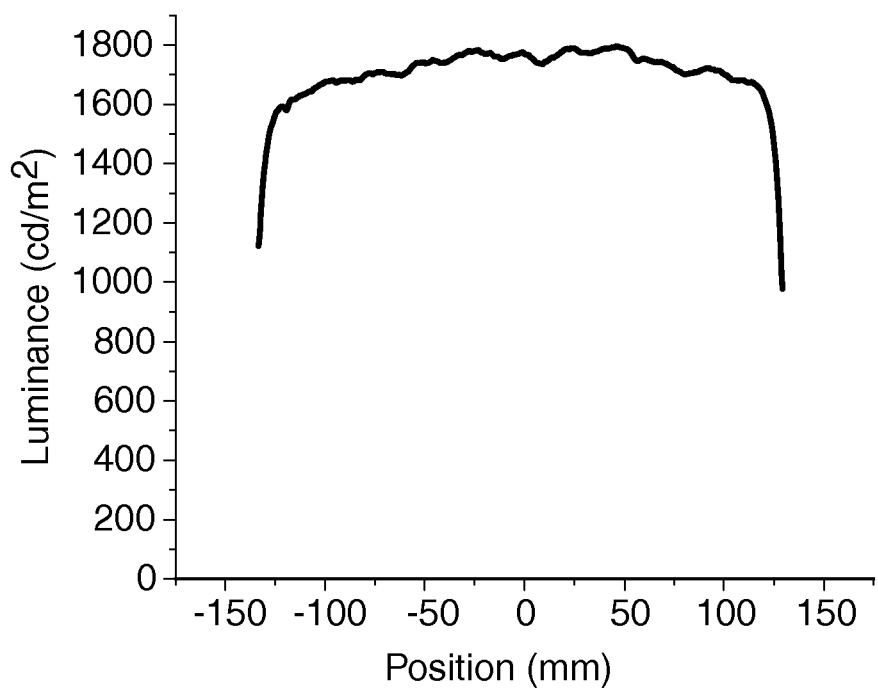

The average luminance (measured through the absorbing polarizer) was 1628 cd/m², representing a gain of 1.68 over the diffuser plate only in Comparative Example 6. The VESA 9pt luminance uniformity was not a useful measure for capturing the periodic nonuniformity. The luminance cross section is shown in FIG. 26 taken at a position directly over a row of LEDs. For the graph, the data has been smoothed by applying a 2 mm wide averaging filter.

Comparative Example 8

Diffuser Plate, BGD/BEF/APF Front Reflector and 2×TIPS Back Reflector

The output surface of the backlight was covered by a diffuser plate (DR-55C). A three-film stack was placed on top of the diffuser plate. The stack included (in order from the diffuser plate out toward the viewer) BGD, a prism film (BEF III-10T, available from 3M Company), and APF. The APF was laminated between 2 layers of polycarbonate (one side used 5 mil PC with 12% haze facing out and the other side used 5 mil PC with 20% haze facing out).

Figure 27:
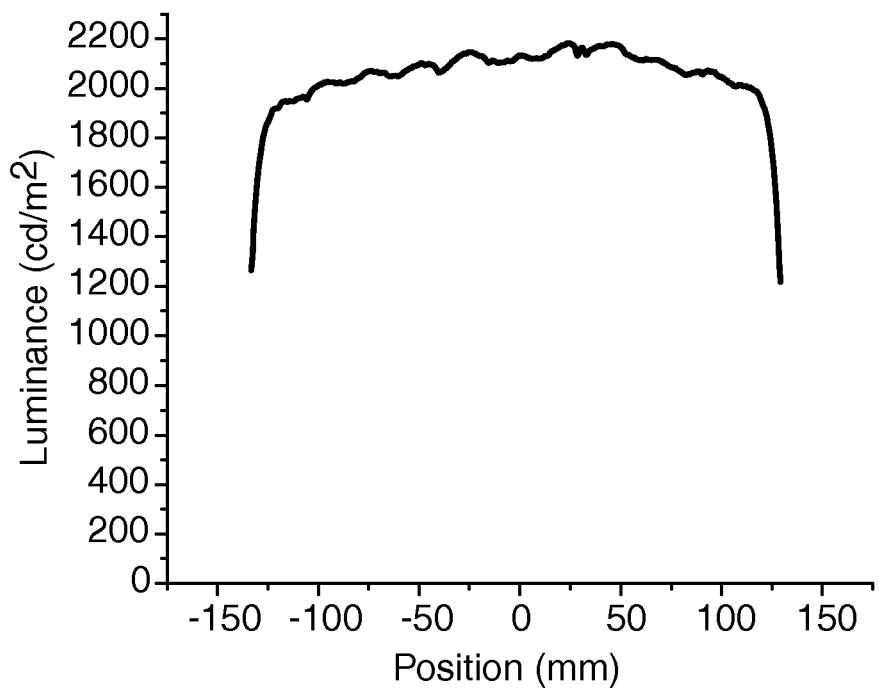

The average luminance (measured through the absorbing polarizer) was 1951 cd/m², representing a gain of 2.01 over the diffuser plate only in Comparative Example 6. The VESA 9pt luminance uniformity was not a useful measure for capturing the periodic nonuniformity. The luminance cross section is shown in FIG. 27 taken at a position directly over a row of LEDs. For the graph, the data has been smoothed by applying a 2 mm wide averaging filter.

Example 29

23" LCD-TV

A commercial, CCFL-backlit 23" LCD-TV (model LNS2341 WX/XAA from Samsung) was modified to include an LED backlight.

The backlight was illuminated by 264 red LEDs (Osram LR G6SP-CADB), 264 green LEDs (Osram LT G6SP-CBEB), and 264 blue LEDS (Osram LB G6SP-V2BB) for a total of 792 LEDs. The LEDs were modified by forming a dome of encapsulant over the output area of the LEDs. The dome was made using photocurable silicone (3M PSE-002, available from 3M Company). A controlled amount of the silicone was dispensed from a syringe onto the LED to form a hemispherical drop. The drop was then quickly cured using a high-power UV lamp to retain the high dome shape. The dome shape increases the efficiency of the LEDs without much change in the emission pattern.

The LEDs were arranged on circuit boards in red-green-blue clusters on a square lattice with approximately 25 mm center-to-center spacing between the clusters. Each circuit board had 6 rows of 11 clusters and four of these boards were used to cover the area of the backlight. The TV was disassembled and the CCFL bulbs and associated circuits were removed. The boards were assembled into the metal backlight housing. ESR was placed over the circuit board with holes provided for the LEDs to form the back reflector. The sidewalls of the backlight housing were covered with 2×TIPS. The diffuser plate from the original TV was placed over the backlight. A second diffuser plate (DR-55C, 2.0 mm thick) was placed on the first diffuser.

The film stack was BGD, BEF III-10T, and ARF-68 (with polycarbonate laminated to both sides (0.127 mm thick Iupilon™ Film, Grade FE-2000 M05 from Mitsubishi Engineering-Plastics Corp., Tokyo, Japan, with the textured surface facing the film). The LED backlight had a internal thickness (space between the back reflector and the bottom of the first diffuser plate) of about 16 mm. The backlight was replaced and the TV was reassembled.

All of the LEDs of one color were connected in a series-parallel configuration with 11 LEDs in series strings and 24 strings of LEDs (6 from each of 4 boards) connected in parallel. The LEDs were powered using external laboratory power supplies (Tenma 72-6615) in constant-current control. The circuit of red LEDs was driven at 0.60 A, 20.1 V (for an average current of 25 mA per red LED), the circuit of green LEDs was driven at 1.06 A, 31.6V (for an average current of 44 mA per green LED), and the circuit of blue LEDs was driven at 0.50 A, 30.3V (for an average current of 21 mA per blue LED). These currents were measured after the fully assembled TV was powered for about 1.5 hours to warm up.

Uniformity measurements were conducted using the Prometric camera in the manner described herein. The display was mounted vertically at a distance of 5 m from the camera. A Sigma 105 mm lens at f/11 was used to collect the images. For the uniformity measurement, a white screen was displayed on the TV using a personal computer attached to the PC input port of the TV.

The display appeared uniform in luminance and color. The average luminance (measured through the panel) was 428 cd/m$^2$; the VESA 9pt luminance uniformity was approximately 83%; and the VESA 9pt color nonuniformity was 0.0097.

Example 30

300 mm×300 mm zoned Direct-Lit Backlight

A 12"×12" zoned Backlight included a rectangular box about 300 mm×300 mm and had an internal thickness of about 25 mm.

The backlight was illuminated by 4 red LEDs (Lumileds LXHL-DD09), 8 green LEDs (Lumileds LXHL-DM09), and 4 blue LEDs (Lumileds LXHL-DR09) for a total of 16 LEDs. The LEDs were arranged in four separate clusters on small circuit boards. Each cluster used one red, two green, and one blue LED arranged in a diamond pattern with the red and blue LEDs separated by about 10 mm and the green LEDs separated by about 16 mm.

A cluster of LEDs was located at the center of each of the four 150 mm×150 mm quadrants of the backlight. The circuit boards were affixed to an aluminum support plate and the sidewalls were attached to this same plate.

The LEDs were powered by a custom constant-current drive circuit. Each cluster was driven by a separate circuit so that they could be powered independently. The circuit allowed for the current to each of the LEDs to be adjusted to achieve a desired color point. The current through each color of LEDs was adjusted to set the overall light output at a white point of approximately u'=0.179 and v'=0.438.

The LED circuit board was mounted to a metal plate to which the sidewalls of the cavity were also attached. The inside of the sidewalls of the backlight was covered with ESR. The backlight was separated into four quadrants by two orthogonal partitions. The partitions were made from aluminum sheet about (about 1/16" thick) that was covered on both sides with BESR. The partitions were notched halfway through at the middle of the span to allow them to interlock at the intersection in the middle of the backlight. The long sidewalls had slots cut in them to hold the partition in the proper place. There was a small gap (about 2 mm) between the top of the partition and the top film stack.

The back reflector was formed using 2×TIPS attached to a thin polycarbonate plate to provide support. Holes in the back reflector allowed the lens portion of the LEDs to protrude and the polycarbonate side of the reflector was affixed to the aluminum support plate with double-stick tape. The 2×TIPS extended beyond the edge of the polycarbonate plate and curved slightly up on to the sidewalls to minimize light leaks.

A partial reflector layer was placed over the top of the backlight cavity. The partial reflector was two sheets of ARF-84/BGD laminated (on the non-coated side) to 5 mil PC with 20% haze. Both sheets were oriented so that the bead coatings faced away from the light sources. The two sheets were placed in physical contact, but were not laminated to one another with the polarization axes aligned. A clear acrylic plate (approximately 2 mm thick) was placed over the films to help hold them in place.

A circle of APF was placed over each cluster of LEDs. The circle was slightly larger than the cluster diameter (approximately 25 mm) and the polarization axis was oriented so that it was perpendicular to the polarization axis of the partial reflector layer.

The thickness of the backlight cavity (the distance from the inside surface of the back reflector to the top edge of the sidewalls) was approximately 25 mm.

Uniformity measurements were conducted using the PR-9913E colorimetric camera in the manner described above. The display was mounted vertically at a distance of 5 m from the camera. A Nikon 300 mm lens at f/11 was used to collect the images. No absorbing polarizer was used for these measurements.

All four clusters were powered and the luminance was measured. The entire output area appeared uniformly illuminated. The average luminance was 659 cd/m$^2$. The VESA 9pt luminance uniformity for the entire system was approximately 86%. The VESA 9pt luminance uniformity was also calculated for each of the four quadrants individually (e.g., each of the 9 pts were all located within the square regions formed by the sidewalls and the partition). The VESA 9pt luminance uniformity for each quadrant was 88%, 94%, 86%, and 90%.

Example 31

150 mm×150 mm Direct-Lit Backlight

The following example utilized a 150 mm×150 mm backlight that had an internal thickness of about 30 mm.

The backlight was illuminated by 13 red LEDs (Nichia NSSR100B), 26 green LEDs (Nichia NSSG100B), and 13 blue LEDS (Nichia NSSB 100B) for a total of 52 LEDs. The LEDs were arranged on circuit boards in red-green-green-blue clusters in five rows. Within a row the clusters were spaced approximately 50 mm apart and the rows were separated by about 25 mm. The first row had three clusters, the second row had two clusters, the third row had three clusters, the fourth row had two clusters and the fifth row had three clusters. The clusters within each row were uniformly distributed about the centerline of the circuit board.

The LED circuit board was mounted to a metal plate to which the sidewalls of the cavity were also attached. MCPET was placed over the circuit board with holes provided for the LEDs. The inside of the sidewalls of the backlight were covered with 2×TIPS.

The LEDs were powered by a custom constant-current drive circuit. Each cluster was driven by a separate circuit so that they could be powered independently. The circuit allowed for the current to each of the LEDs to be adjusted to achieve a desired color point. The current through each color of LED was adjusted to set the overall light output at a white point of approximately u'=0.181 and v'=0.461.

A diffuser plate (DR-55C, 2.0 mm thick) was placed over the top of the backlight cavity. 2×ARF (laminated between two layers of 5 mil PC) was placed over the diffuser plate to form the front reflector.

Uniformity measurements were conducted using the Prometric camera in the manner described above. The display was mounted vertically at a distance of 5 m from the camera. A Nikon 300 mm lens at f/11 was used to collect the images. No absorbing polarizer was used for these measurements.

The backlight appeared uniform in luminance and color. The average luminance was 559 cd/m$^2$; the VESA 9pt luminance uniformity was approximately 90%; and the VESA 9pt color nonuniformity was 0.0068.

Unless otherwise indicated, references to "backlights" are also intended to apply to other extended area lighting devices that provide nominally uniform illumination in their intended application. Such other devices may provide either polarized or unpolarized outputs. Examples include light boxes, signs, channel letters, and general illumination devices designed for indoor (e.g. home or office) or outdoor use, sometimes referred to as "luminaires."

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A luminaire, comprising:
a front reflector and a back reflector that form a light recycling cavity comprising at least one output surface; and
one or more light sources disposed to emit light into the light recycling cavity;
wherein the front reflector comprises an asymmetric reflective film, a diffuser on a first major surface of the asymmetric reflective film, and a plurality of microspheres positioned proximate a second major surface of the asymmetric reflective film;
wherein the front reflector comprises an on-axis average reflectivity of at least 90% for visible light polarized in a first plane, and an on-axis average reflectivity of at least 25% but less than 90% for visible light polarized in a second plane perpendicular to the first plane; wherein the on-axis average reflectivity for visible light polarized in the first plane is always larger than the on-axis reflectivity for visible light polarized in the second plane.

2. The luminaire of claim 1, wherein the one or more light sources comprise one or more LEDs.

3. The luminaire of claim 1, wherein the light recycling cavity is hollow.

4. The luminaire of claim 1, wherein the diffuser comprises a bulk diffuser.

5. The luminaire of claim 1, wherein the back reflector comprises a specular reflector.

6. The luminaire of claim 1, wherein the asymmetric reflective film comprises multilayer optical film.

7. The luminaire of claim 1, wherein the diffuser is attached to the asymmetric reflective film by an optically clear adhesive.

8. The luminaire of claim 1, wherein the front reflector and back reflector are substantially coextensive.

9. The luminaire of claim 1, wherein the back reflector comprises an on-axis average reflectivity of at least 95% for visible light of any polarization.

10. The luminaire of claim 1, wherein p-polarized visible light that is polarized in the second plane exhibits a substantially constant average reflectivity as angle of incidence with the front reflector increases from near zero degrees to 60 degrees.

11. The luminaire of claim 1, wherein p-polarized visible light that is polarized in the second plane exhibits an increasing average reflectivity as angle of incidence with the front reflector increases from near zero degrees to 60 degrees.

12. The luminaire of claim 1, wherein the second major surface faces the back reflector.

13. The luminaire of claim 1, wherein the plurality of microspheres are disposed on a substrate that is attached to the second major surface of the asymmetric reflecting film such that the microspheres face the back reflector.

* * * * *

UNITED STATES PATENT AND TRADEMARK OFFICE
CERTIFICATE OF CORRECTION

PATENT NO. : 8,740,442 B2
APPLICATION NO. : 13/741716
DATED : June 3, 2014
INVENTOR(S) : Michael F. Weber It is certified that error appears in the above-identified patent and that said Letters Patent is hereby corrected as shown below:

Title page

Page 3, Col. 2 (Other Publications)
Line 35, delete "Intergrated" and insert -- Integrated --, therefor.

Specification

Column 13
Line 62, delete "HIGHT" and insert -- HIGH --, therefor.

Column 14
Line 57, delete "to" and insert -- to a --, therefor.

Column 17
Line 7, delete "$\Delta n_z\ 0.5*\Delta n_x.$" and insert -- $\Delta n_z \leq 0.5*\Delta n_x.$ --, therefor.

Column 18
Line 54, delete "$\Delta n_y$" and insert -- $\Delta n_y \geq$ --, therefor.

Column 37
Line 53, delete "minimized" and insert -- minimized. --, therefor.

Column 38
Line 2, delete "area" and insert -- area. --, therefor.

Column 49
Line 22, delete "p.m." and insert -- μm. --, therefor.

Signed and Sealed this
Ninth Day of February, 2016

Michelle K. Lee
*Director of the United States Patent and Trademark Office*

CERTIFICATE OF CORRECTION (continued)
U.S. Pat. No. 8,740,442 B2

Specification

Column 50
Line 21, delete "Iragacure" and insert -- Irgacure --, therefor.

Column 53
Line 50, delete "PRO9" and insert -- PR09 --, therefor.

Column 60
Line 41 (Approx.), delete "12e." and insert -- 12f. --, therefor.

Column 61
Line 24, delete "MOS," and insert -- M05, --, therefor.

Column 69
Line 10, delete "NESR036C)," and insert -- NFSR036C), --, therefor.